(12) United States Patent
Oberoi et al.

(10) Patent No.: US 11,203,054 B2
(45) Date of Patent: Dec. 21, 2021

(54) CLAMPING FEET FOR AN END EFFECTOR

(71) Applicant: The Boeing Company, Chicago, IL (US)

(72) Inventors: Harinder S. Oberoi, Snohomish, WA (US); Melissa Ann Findlay, Snohomish, WA (US); Jorge Alberto Arriaga, Kirkland, WA (US); Branko Sarh, Huntington Beach, CA (US); Alan S. Draper, Everett, WA (US); Jeffrey Lawrence Miller, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 16/272,916

(22) Filed: Feb. 11, 2019

(65) Prior Publication Data

US 2019/0176213 A1 Jun. 13, 2019

Related U.S. Application Data

(62) Division of application No. 14/559,191, filed on Dec. 3, 2014, now Pat. No. 10,201,847.

(51) Int. Cl.
*B21J 15/28* (2006.01)
*B21J 15/02* (2006.01)
(Continued)

(52) U.S. Cl.
CPC .............. *B21J 15/28* (2013.01); *B21J 15/02* (2013.01); *B21J 15/10* (2013.01); *B21J 15/142* (2013.01); *B21J 15/32* (2013.01); *B21J 15/40* (2013.01); *B23P 19/10* (2013.01); *B25B 5/163* (2013.01); *B25J 5/007* (2013.01); *B25J 9/1682* (2013.01); *B25J 9/1687* (2013.01); *B25J 9/1697* (2013.01);
(Continued)

(58) Field of Classification Search
CPC ........... Y10T 403/472; Y10T 403/7045; Y10S 901/30; Y10S 901/31; Y10S 901/41; Y10S 901/42
See application file for complete search history.

(56) References Cited

U.S. PATENT DOCUMENTS

| 1,128,634 A | 2/1915 | Talbot |
| 1,533,099 A | 4/1925 | Carroll |

(Continued)

FOREIGN PATENT DOCUMENTS

| CN | 1221500 A | 6/1999 |
| CN | 1252754 A | 5/2000 |

(Continued)

OTHER PUBLICATIONS

Chinese National Intellectual Property Administration 4th Notification of Office Action and English Translation dated Dec. 3, 2019, regarding Application No. 201501400526.3, 11 pages.

(Continued)

*Primary Examiner* — Tyrone V Hall, Jr.
(74) *Attorney, Agent, or Firm* — Yee & Associates, P.C.

(57) ABSTRACT

An attachment for an end effector. The attachment may include a clamp and a foot adhesively bonded to an edge of the clamp and having a set of interlocking features that form a mechanical interlock with the clamp.

20 Claims, 18 Drawing Sheets

Related U.S. Application Data

(60) Provisional application No. 62/022,641, filed on Jul. 9, 2014.

(51) Int. Cl.

| | | |
|---|---|---|
| *B21J 15/10* | (2006.01) | |
| *B21J 15/14* | (2006.01) | |
| *B25J 5/00* | (2006.01) | |
| *B29C 65/70* | (2006.01) | |
| *B25J 9/16* | (2006.01) | |
| *B25J 11/00* | (2006.01) | |
| *B23P 19/10* | (2006.01) | |
| *B21J 15/32* | (2006.01) | |
| *B21J 15/40* | (2006.01) | |
| *B25B 5/16* | (2006.01) | |
| *B29C 39/12* | (2006.01) | |
| *B29C 39/22* | (2006.01) | |
| *B64F 5/10* | (2017.01) | |
| *B60G 3/14* | (2006.01) | |
| *F16B 19/06* | (2006.01) | |
| *B60G 7/00* | (2006.01) | |
| *B64C 1/06* | (2006.01) | |
| *G05B 19/418* | (2006.01) | |
| *G05D 1/00* | (2006.01) | |
| *G05D 3/12* | (2006.01) | |
| *B29C 45/14* | (2006.01) | |
| *B29C 39/02* | (2006.01) | |
| *B29C 39/10* | (2006.01) | |
| *B64F 5/50* | (2017.01) | |
| *B23P 21/00* | (2006.01) | |
| *B29L 31/00* | (2006.01) | |
| *B60P 3/025* | (2006.01) | |

(52) U.S. Cl.
CPC ............ *B25J 11/005* (2013.01); *B25J 11/007* (2013.01); *B29C 39/026* (2013.01); *B29C 39/10* (2013.01); *B29C 39/123* (2013.01); *B29C 39/22* (2013.01); *B29C 45/14336* (2013.01); *B29C 65/70* (2013.01); *B60G 3/145* (2013.01); *B60G 7/001* (2013.01); *B60G 7/008* (2013.01); *B64C 1/06* (2013.01); *B64F 5/10* (2017.01); *B64F 5/50* (2017.01); *F16B 19/06* (2013.01); *G05B 19/41805* (2013.01); *G05D 1/0088* (2013.01); *G05D 3/12* (2013.01); *B23P 21/002* (2013.01); *B23P 2700/00* (2013.01); *B23P 2700/01* (2013.01); *B29C 2045/14368* (2013.01); *B29C 2793/0081* (2013.01); *B29K 2715/00* (2013.01); *B29L 2031/748* (2013.01); *B60G 2204/143* (2013.01); *B60G 2204/418* (2013.01); *B60G 2206/8207* (2013.01); *B60G 2300/60* (2013.01); *B60P 3/025* (2013.01); *G05B 2219/45071* (2013.01); *Y02P 90/80* (2015.11); *Y10S 901/01* (2013.01); *Y10S 901/02* (2013.01); *Y10S 901/41* (2013.01)

(56) References Cited

U.S. PATENT DOCUMENTS

| | | |
|---|---|---|
| 2,505,245 A | 4/1950 | Hollerith |
| 2,712,874 A | 7/1955 | Murray |
| 2,714,321 A | 8/1955 | Roy |
| 2,896,909 A | 7/1959 | Taylor |
| 3,253,842 A | 5/1966 | Rabe |
| 3,348,572 A | 10/1967 | Hall |
| 3,355,346 A | 11/1967 | Black et al. |
| 3,774,636 A | 11/1973 | Arita |
| 3,865,203 A | 2/1975 | Hibma |
| 3,952,401 A | 4/1976 | Wagner |
| 4,172,591 A | 10/1979 | Craig |
| 4,310,958 A | 1/1982 | Balaud et al. |
| 4,424,741 A | 1/1984 | Moldestad |
| 4,440,265 A | 4/1984 | Spagnoli |
| 4,461,455 A | 7/1984 | Mills et al. |
| 4,575,934 A | 3/1986 | Kitmura et al. |
| 4,599,033 A | 7/1986 | Raz |
| 4,685,368 A | 8/1987 | Gardener |
| 4,714,339 A | 12/1987 | Lau et al. |
| 4,740,025 A | 4/1988 | Nelson |
| 4,798,371 A | 1/1989 | Wallisser |
| 4,864,702 A | 9/1989 | Speller et al. |
| 4,885,836 A | 12/1989 | Bonomi et al. |
| 4,943,202 A | 7/1990 | Galloway |
| 4,995,148 A | 2/1991 | Bonomi et al. |
| 5,005,912 A | 4/1991 | Pipes |
| 5,145,276 A | 9/1992 | Demange |
| 5,248,341 A | 9/1993 | Berry et al. |
| 5,408,219 A | 4/1995 | Newman et al. |
| 5,477,597 A | 12/1995 | Catania et al. |
| 5,857,713 A * | 1/1999 | Horimoto ............ F16L 37/252 285/81 |
| 5,896,637 A | 4/1999 | Sarh |
| 5,903,459 A | 11/1999 | Greenwood et al. |
| 6,030,244 A | 2/2000 | Buckheit et al. |
| 6,098,260 A | 8/2000 | Sarh |
| 6,108,896 A | 8/2000 | Gignac et al. |
| 6,113,343 A | 9/2000 | Goldenberg et al. |
| 6,158,666 A | 12/2000 | Banks et al. |
| 6,282,036 B1 | 8/2001 | Woytassek |
| 6,295,710 B1 | 10/2001 | Roberts et al. |
| 6,357,194 B1 | 3/2002 | Jones |
| 6,415,476 B1 | 7/2002 | McCoy |
| 6,447,073 B1 | 9/2002 | Goettker |
| 6,470,820 B1 | 10/2002 | Wilkins |
| 6,481,096 B2 | 11/2002 | Lehmker et al. |
| 6,505,393 B2 | 1/2003 | Stoewer et al. |
| 6,513,231 B1 | 2/2003 | Hafenrichter et al. |
| 6,691,392 B2 | 2/2004 | Savoy et al. |
| 7,111,854 B1 | 9/2006 | Tuthill et al. |
| 7,237,789 B1 | 7/2007 | Herman |
| 7,344,109 B1 | 3/2008 | Rezai |
| 7,367,973 B2 | 5/2008 | Manzo et al. |
| 7,402,009 B2 | 7/2008 | Hamann et al. |
| 7,416,363 B2 | 8/2008 | Kozhuev |
| 7,421,886 B1 | 9/2008 | Fox et al. |
| 7,527,759 B2 | 5/2009 | Lee et al. |
| 7,530,607 B2 | 5/2009 | Luft |
| RE41,821 E | 10/2010 | Ross et al. |
| 7,940,685 B1 | 5/2011 | Breslau et al. |
| 7,966,729 B2 | 6/2011 | Frauen et al. |
| 8,266,778 B2 | 9/2012 | Neuhaus et al. |
| 8,602,713 B1 | 12/2013 | Davis et al. |
| 8,634,950 B2 | 1/2014 | Simonetti et al. |
| 8,989,053 B1 | 3/2015 | Skaaksrud et al. |
| 9,063,525 B2 | 6/2015 | Sanders et al. |
| 9,096,331 B2 | 8/2015 | Gehlsen |
| 9,309,008 B2 | 4/2016 | Boulanger et al. |
| 9,315,137 B1 | 4/2016 | Davis et al. |
| 9,327,751 B2 | 5/2016 | Nou et al. |
| 9,505,051 B2 | 11/2016 | Oberoi et al. |
| 9,751,435 B1 | 9/2017 | Davis et al. |
| 9,782,822 B2 | 10/2017 | Oberoi et al. |
| 9,895,741 B2 | 2/2018 | Oberoi et al. |
| 9,937,549 B2 | 4/2018 | Oberoi et al. |
| 10,016,805 B2 | 7/2018 | Oberoi et al. |
| 10,046,381 B2 | 8/2018 | Oberoi et al. |
| 10,201,847 B2 | 2/2019 | Oberoi et al. |
| 10,213,823 B2 | 2/2019 | Oberoi et al. |
| 2001/0054228 A1 | 12/2001 | Lehmker et al. |
| 2002/0087587 A1 | 7/2002 | Vos et al. |
| 2002/0092149 A1 | 7/2002 | Wolf et al. |
| 2002/0124377 A1 | 9/2002 | Nakamura |
| 2002/0170160 A1 | 11/2002 | Savoy et al. |
| 2003/0009867 A1 | 1/2003 | Whiten et al. |
| 2003/0023540 A2 | 1/2003 | Johnson et al. |
| 2003/0229900 A1 | 12/2003 | Reisman |

(56) References Cited

U.S. PATENT DOCUMENTS

| | | |
|---|---|---|
| 2004/0022379 A1 | 2/2004 | Klos et al. |
| 2004/0110483 A1 | 6/2004 | Mollenkopf |
| 2004/0113756 A1 | 6/2004 | Mollenkopf |
| 2004/0113757 A1 | 6/2004 | White et al. |
| 2004/0135676 A1 | 7/2004 | Berkman et al. |
| 2004/0267254 A1 | 12/2004 | Manzo et al. |
| 2005/0015962 A1 | 1/2005 | Sturm, Jr. et al. |
| 2005/0023052 A1 | 2/2005 | Beck et al. |
| 2005/0041048 A1 | 2/2005 | Hillman et al. |
| 2005/0275181 A1 | 12/2005 | MacIsaac |
| 2006/0032702 A1 | 2/2006 | Linsmeier et al. |
| 2006/0117547 A1 | 6/2006 | Ffield et al. |
| 2006/0118235 A1 | 6/2006 | Lum et al. |
| 2006/0167587 A1 | 7/2006 | Read |
| 2006/0171776 A1 | 8/2006 | Luft |
| 2006/0218780 A1 | 10/2006 | Lewis et al. |
| 2006/0284047 A1 | 12/2006 | Spishak et al. |
| 2007/0001432 A1 | 1/2007 | Thurm |
| 2007/0001868 A1 | 1/2007 | Hillan |
| 2007/0051852 A1 | 3/2007 | McCoskey et al. |
| 2007/0061811 A1 | 3/2007 | Rumelhart et al. |
| 2007/0080001 A1 | 4/2007 | Beck et al. |
| 2007/0143398 A1 | 6/2007 | Graham |
| 2007/0200379 A1 | 8/2007 | Key et al. |
| 2007/0220341 A1 | 9/2007 | Apostoloui et al. |
| 2007/0266423 A1 | 11/2007 | Tehee |
| 2007/0276538 A1 | 11/2007 | Kjellsson |
| 2008/0025790 A1 | 1/2008 | Kozhuev |
| 2008/0099612 A1 | 5/2008 | Plude et al. |
| 2008/0113557 A1 | 5/2008 | Cox et al. |
| 2008/0160253 A1 | 7/2008 | Liu et al. |
| 2008/0162956 A1 | 7/2008 | Bozek et al. |
| 2008/0162958 A1 | 7/2008 | Bozek et al. |
| 2008/0178537 A1 | 7/2008 | Spangler et al. |
| 2008/0205763 A1 | 8/2008 | Marsh et al. |
| 2008/0250626 A1 | 10/2008 | Frankenberger et al. |
| 2008/0255899 A1 | 10/2008 | McConnell et al. |
| 2008/0256776 A1 | 10/2008 | Neuhaus et al. |
| 2008/0307630 A1 | 12/2008 | Hasegawa et al. |
| 2009/0022556 A1 | 1/2009 | Clark |
| 2009/0044655 A1 | 2/2009 | DeLouis et al. |
| 2009/0067973 A1 | 3/2009 | Eliuk et al. |
| 2009/0083589 A1 | 3/2009 | Fulton et al. |
| 2009/0100096 A1 | 4/2009 | Erlichson et al. |
| 2009/0139375 A1 | 6/2009 | Hathaway |
| 2009/0313363 A1 | 12/2009 | Parsons et al. |
| 2010/0031509 A1 | 2/2010 | Frauen et al. |
| 2010/0077810 A1 | 4/2010 | De Franceschi et al. |
| 2010/0156632 A1 | 6/2010 | Hyland et al. |
| 2010/0235037 A1 | 6/2010 | Vian et al. |
| 2010/0259931 A1 | 10/2010 | Chemel et al. |
| 2010/0264846 A1 | 10/2010 | Chemel et al. |
| 2010/0270933 A1 | 10/2010 | Chemel et al. |
| 2010/0295473 A1 | 11/2010 | Chemel et al. |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0295672 A1 | 11/2010 | Hyland et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301774 A1 | 12/2010 | Chemel et al. |
| 2010/0307279 A1 | 12/2010 | Campagna et al. |
| 2011/0001436 A1 | 1/2011 | Chemel et al. |
| 2011/0001438 A1 | 1/2011 | Chemel et al. |
| 2011/0010007 A1 | 1/2011 | Sarh et al. |
| 2011/0046775 A1 | 2/2011 | Bailey et al. |
| 2011/0054694 A1 | 3/2011 | Munk |
| 2011/0063417 A1 | 3/2011 | Peters et al. |
| 2011/0066297 A1 | 3/2011 | Saberi et al. |
| 2011/0138601 A1 | 6/2011 | Kilibarda |
| 2011/0189440 A1 | 8/2011 | Appleby et al. |
| 2011/0308638 A1 | 12/2011 | Hyland et al. |
| 2012/0007374 A1 | 1/2012 | Nakasugi et al. |
| 2012/0197449 A1 | 8/2012 | Sanders |
| 2012/0235579 A1 | 9/2012 | Chemel et al. |
| 2012/0240381 A1 | 9/2012 | Carey |
| 2012/0300093 A1 | 11/2012 | Laudrain et al. |
| 2013/0008977 A1 | 1/2013 | Pfrenger et al. |
| 2013/0009469 A1 | 1/2013 | Gillett |
| 2013/0035783 A1 | 2/2013 | Scheuerman et al. |
| 2013/0152397 A1 | 6/2013 | Oberoi et al. |
| 2013/0167610 A1 | 7/2013 | Sarh et al. |
| 2013/0176141 A1 | 7/2013 | LaFrance et al. |
| 2013/0185925 A1 | 7/2013 | Sarh et al. |
| 2014/0096365 A1 | 4/2014 | Sarh et al. |
| 2014/0156905 A1 | 6/2014 | Butcher et al. |
| 2014/0165388 A1 | 6/2014 | Kim et al. |
| 2014/0223490 A1 | 8/2014 | Pan et al. |
| 2014/0292538 A1 | 10/2014 | Pathi et al. |
| 2014/0312581 A1 | 10/2014 | Anderson |
| 2015/0005939 A1 | 1/2015 | DiStefano |
| 2015/0052596 A1 | 2/2015 | Ayanam et al. |
| 2015/0060231 A1 | 3/2015 | Bosgoed |
| 2015/0082593 A1 | 3/2015 | Courtier |
| 2015/0128394 A1 | 5/2015 | Sarh et al. |
| 2015/0135206 A1 | 5/2015 | Reisman |
| 2015/0135214 A1 | 5/2015 | Reisman |
| 2015/0244306 A1 | 8/2015 | Estes |
| 2015/0306967 A1 | 10/2015 | Cohen |
| 2015/0363481 A1 | 12/2015 | Haynes |
| 2015/0375390 A1 | 12/2015 | Becroft et al. |
| 2016/0009416 A1 | 1/2016 | Oberoi et al. |
| 2016/0009417 A1 | 1/2016 | Oberoi et al. |
| 2016/0009419 A1 | 1/2016 | Oberoi et al. |
| 2016/0009420 A1 | 1/2016 | Oberoi et al. |
| 2016/0009421 A1 | 1/2016 | Oberoi et al. |
| 2016/0068210 A1 | 3/2016 | Sakamoto |
| 2016/0075347 A1 | 3/2016 | Thompson et al. |
| 2016/0087432 A1 | 3/2016 | Matan et al. |
| 2016/0130017 A1 | 5/2016 | Best et al. |
| 2016/0163177 A1 | 6/2016 | Klicpera |
| 2016/0204606 A1 | 7/2016 | Matan et al. |
| 2016/0217093 A1 | 7/2016 | Whittington et al. |
| 2016/0311284 A1 | 10/2016 | Osborne et al. |
| 2016/0319855 A1 | 11/2016 | Watanabe |
| 2016/0381181 A1 | 12/2016 | Cohan |
| 2018/0126447 A1 | 5/2018 | Oberoi et al. |

FOREIGN PATENT DOCUMENTS

| | | |
|---|---|---|
| CN | 2779207 Y | 5/2006 |
| CN | 101212875 A | 7/2008 |
| CN | 101357687 A | 2/2009 |
| CN | 101462595 A | 6/2009 |
| CN | 101583536 A | 11/2009 |
| CN | 201442654 U | 4/2010 |
| CN | 102519441 A | 6/2010 |
| CN | 101898301 A | 12/2010 |
| CN | 102001451 A | 4/2011 |
| CN | 102765489 A | 11/2012 |
| CN | 102795011 A | 11/2012 |
| CN | 103158890 A | 6/2013 |
| CN | 103228536 A | 7/2013 |
| CN | 103303491 A | 9/2013 |
| CN | 103434653 A | 12/2013 |
| CN | 103889664 A | 6/2014 |
| CN | 204624973 U | 9/2015 |
| DE | 10134852 A1 | 8/2002 |
| DE | 102008062026 A1 | 6/2010 |
| DE | 102009018991 A1 | 11/2010 |
| DE | 102011053800 A1 | 3/2013 |
| EP | 1063166 A1 | 12/2000 |
| EP | 1961514 A2 | 8/2008 |
| EP | 2166646 A1 | 3/2010 |
| EP | 2221151 A2 | 8/2010 |
| EP | 2527257 A1 | 11/2012 |
| EP | 2527527 A2 | 11/2012 |
| EP | 2604523 A2 | 6/2013 |
| EP | 2617536 A1 | 7/2013 |
| EP | 2965832 A3 | 1/2016 |
| EP | 2965871 A2 | 1/2016 |
| FR | 2153221 A1 | 5/1973 |

(56) References Cited

FOREIGN PATENT DOCUMENTS

| | | |
|---|---|---|
| FR | 2457151 A1 | 12/1980 |
| FR | 2706369 A1 | 12/1994 |
| FR | 2841809 A1 | 1/2004 |
| GB | 2473100 A | 3/2011 |
| JP | S54163169 A | 12/1979 |
| JP | S59197672 A | 11/1984 |
| JP | S62114713 A | 5/1987 |
| JP | S62204489 A | 9/1987 |
| JP | H09110394 A | 4/1997 |
| JP | H10113948 A | 5/1998 |
| JP | H10320880 A | 12/1998 |
| JP | 2002028745 A | 1/2002 |
| JP | 2013154464 A | 8/2013 |
| JP | 5352568 | 11/2013 |
| JP | 2006123027 A | 5/2016 |
| WO | WO9636461 A1 | 11/1996 |
| WO | WO2014023284 A2 | 2/2014 |
| WO | WO2014163921 A1 | 10/2014 |

OTHER PUBLICATIONS

Chinese Office Action with English translation, dated Jun. 1, 2020, regarding Application No. 20150400526.3, 11 pages.
European Office Action, dated Jun. 5, 2020, regarding Application No. 14196581.4, 4 pages.
Japanese Patent Office Notice of Reasons for Rejection with English Translation, dated Apr. 22, 2019, regarding Application No. 2015-118133, 18 pages.
Extended European Search Report, dated Nov. 5, 2015, regarding Application No. EP14196476.7, 6 pages.
Partial European Search Report, dated Nov. 17, 2015, regarding Application No. EP14196497.3, 5 pages.
Extended European Search Report, dated Nov. 26, 2015, regarding Application No. EP14196544.2, 8 pages.
Extended European Search Report, dated Dec. 2, 2015, regarding Application No. EP14196574.9, 8 pages.
Extended European Search Report, dated Feb. 8, 2016, regarding Application No. EP14196497.3, 13 pages.
Partial European Search Report, dated Jan. 28, 2016, regarding Application No. EP14196608.5, 10 pages.
Partial European Search Report, dated Jun. 20, 2016, regarding Application No. EP14196485.8, 129 pages.
Extended European Search Report, dated Feb. 18, 2016, regarding Application No. EP14196581.4, 9 pages.
Extended European Search Report, dated May 4, 2016, regarding Application No. EP14196469.2, 8 pages.
Extended European Search Report, dated Apr. 8, 2016, regarding Application No. EP14196472.6, 6 pages.
Extended European Search Report, dated May 9, 2016, regarding Application No. EP14196474.2, 8 pages.
Extended European Search Report, dated May 10, 2016, regarding Application No. EP14196491.6, 7 pages.
Canadian Search Report, dated Jun. 1, 2016, regarding Application No. 2894206, 4 pages.
Canadian Search Report, dated Jun. 28, 2016, regarding Application No. 2895735, 4 pages.
Canadian Search Report, dated Aug. 3, 2016, regarding Application No. 2895704, 4 pages.
Canadian Search Report, dated Sep. 8, 2016, regarding Application No. 2,894,299, 5 pages.
Extended European Search Report, dated Jul. 11, 2016, regarding Application No. 14196608.5, 15 pages.
Canadian Intellectual Property Office Examination Search Report, dated Jan. 30, 2017, regarding Application No. 2,895,739, 3 pages.
Extended European Search Report, dated Mar. 15, 2017, regarding Application No. EP14196485.8, 9 pages.
Canadian Intellectual Property Office Examination Search Report, dated Feb. 23, 2017, regarding Application No. 2,896,059, 3 pages.
Canadian Intellectual Property Office Office Action, dated Apr. 10, 2017, regarding Application No. 2,895,735, 3 pages.
Canadian Intellectual Property Office Office Action, dated May 2, 2017, regarding Application No. 2,894,311, 17 pages.
Canadian Intellectual Property Office Office Action, dated Apr. 27, 2017, regarding Application No. 2,895,737, 10 pages.
Canadian Intellectual Property Office Office Action, dated Apr. 6, 2017, regarding Application No. 2,894,306, 12 pages.
Decker et al. "Dynamic Measurement of Position and Orientation of Robots",IEEE Transactions on Instrumentation and Measurement, vol. 41, No. 6, Dec. 1992, 5 pages.
Canadian Intellectual Property Office Office Action, dated May 29, 2017, regarding Application No. 2,895,704, 7 pages.
Canadian Intellectual Property Office Office Action, dated Jun. 9, 2017, regarding Application No. 2,895,824, 5 pages.
Canadian Intellectual Property Office Office Action, dated Jul. 5, 2017, regarding Application No. 2,894,299, 18 pages.
Extended European Search Report, dated Jul. 25, 2017, regarding Application No. EP17168019.2, 8 pages.
Canadian Intellectual Property Office, Office Action, dated Jan. 25, 2018, regarding Application No. 2,895,737, 11 pages.
Canadian Intellectual Property Office Examination Report, dated Jan. 31, 2018, regarding Application No. 2,894,308, 19 pages.
The State Intellectual Property Office of China First Notification of Office Action, dated Feb. 9, 2018, regarding Application No. 201510394630.6, 10 pages.
The Korean Intellectual Property Office, Notice of Office Action, dated Mar. 23, 2018, regarding Application No. 10-2015-0096358, 10 pages.
Canadian Intellectual Property Office Office Action, dated May 18, 2018, regarding Application No. 2,894,299, 25 pages.
The State Intellectual Property Office of China First Notification of Office Action, Search Report, and English Translation, dated May 28, 2018, regarding Application No. 201510400526.3, 15 pages.
The State Intellectual Property Office of China First Notification of Office Action, Search Report, and English translation, dated May 28, 2018, regarding Application No. 201510389151.5, 19 pages.
The State Intellectual Property Office of China First Notification of Office Action, Search Report, and English Translation, dated Jun. 22, 2018, regarding Application No. 201510370020.2, 18 pages.
The State Intellectual Property Office of China First Notification of Office Action, Search Report, and English Translation, dated Jun. 26, 2018, regarding Application No. 201510387516.0, 18 pages.
Chinese National Intellectual Property Administration First Notification of Office Action with English Translation, dated Sep. 19, 2018, regarding Application No. 201510397579.4, 17 pages.
Chinese National Intellectual Property Administration First Notification of Office Action with English Translation, dated Sep. 26, 2018, regarding Application No. 201510400529.7, 11 pages.
Chinese National Intellectual Property Administration First Notification of Office Action with English Translation, dated Oct. 26, 2018, regarding Application No. 201510394571.2, 13 pages.
Chinese National Intellectual Property Administralion First Notification of Office Action with English Translation, dated Oct. 29, 2018, regarding Application No. 201510400460.8, 13 pages.
Canadian Intellectual Property Office Examination Search Report, dated Nov. 8, 2018, regarding Application No. 2894308, 3 pages.
European Patent Office Communication Report, dated Nov. 16, 2018, regarding Application No. 14196574.9, 7 pages.
European Patent Office Communication Report, dated Dec. 6, 2018, regarding Application No. 14196608.5, 4 pages.
Office Action, dated Mar. 4, 2016, regarding U.S. Appl. No. 14/558,933, 22 pages.
Notice of Allowance, dated Jul. 20, 2016, regarding U.S. Appl. No. 14/558,933, 18 pages.
Office Action, dated Sep. 25, 2017, regarding U.S. Appl. No. 15/352,524, 49 pages.
Office Action, dated Jan. 27, 2017, U.S. Appl. No. 14/559,073, 53 pages.
Final Office Action, dated Jun. 8, 2017, regarding U.S. Appl. No. 14/559,073, 22 pages.
European Office Action, dated Aug. 16, 2019, regarding Application No. 14196581.4, 4 pages.
Office Action, dated Nov. 29, 2016, U.S. Appl. No. 14/559,115, 48 pages.

(56) References Cited

OTHER PUBLICATIONS

Notice of Allowance, dated Jun. 2, 2017, regarding U.S. Appl. No. 14/559,115, 15 pages.
Office Action, dated Apr. 6, 2017, regarding U.S. Appl. No. 14/559,153, 42 pages.
Final Office Action, dated Oct. 18, 2017, regarding U.S. Appl. No. 14/559,153, 20 pages.
Office Action, dated Feb. 10, 2017, regarding U.S. Appl. No. 14/559,855, 45 pages.
Final Office Action, dated Aug. 9, 2017, regarding U.S. Appl. No. 14/559,855, 38 pages.
Office Action, dated Feb. 1, 2017, regarding U.S. Appl. No. 14/559,234, 47 pages.
Final Office Action, dated Jun. 8, 2017, regarding U.S. Appl. No. 14/559,234, 22 pages.
Office Action, dated Nov. 22, 2017, regarding U.S. Appl. No. 14/559,234, 25 pages.
Office Action, dated Nov. 17, 2017, regarding U.S. Appl. No. 14/559,277, 73 pages.
Office Action, dated Nov. 16, 2016, regarding U.S. Appl. No. 14/559,303, 48 pages.
Office Action, dated Jun. 30, 2017, regarding U.S. Appl. No. 14/559,303, 25 pages.
Office Action, dated Jan. 18, 2017, regarding U.S. Appl. No. 14/559,371, 46 pages.
Final Office Action, dated May 16, 2017, regarding U.S. Appl. No. 14/559,371, 27 pages.
Notice of Allowance, dated Sep. 6, 2017, regarding U.S. Appl. No. 14/559,371, 20 pages.
Office Action, dated Jun. 30, 2017, regarding U.S. Appl. No. 14/559,483, 42 pages.
Notice of Allowance, dated Nov. 22, 2017, regarding U.S. Appl. No. 12/559,483, 17 pages.
Office Action, dated Apr. 5, 2017, regarding U.S. Appl. No. 14/559,518, 64 pages.
Final Office Action, dated Aug. 28, 2017, regarding U.S. Appl. No. 14/559,518, 29 pages.
Final Office Action, dated Jun. 7, 2018, regarding U.S. Appl. No. 14/559,277, 29 pages.
Final Office Action, dated Jun. 15, 2018, regarding U.S. Appl. No. 14/559,073, 11 pages.
Final Office Action, dated Jun. 20, 2018, regarding U.S. Appl. No. 14/559,234, 30 pages.
Tower, "U.S. Pat. No. 530733—VISE", dated Dec. 11, 1894, Application filed Aug. 27, 1894, serial No. 521407, 3 pages.
Dobson, "U.S. Pat. No. 819866 Sheet Metal Joint.", dated May 8, 1906, Application filed Jan. 24, 1905, serial No. 242,554, 2 pages.
Japanese Patent Office Notice of Reasons for Rejection with English Translation, dated Jul. 29, 2021, regarding Application No. 2015-118133, 11 pages.
Korean Patent Office Notice of Office Action with English Translation, dated Jul. 29, 2021, regarding Application No. 10-2015-0095166, 11 pages.

* cited by examiner

CLAMPING FEET FOR AN END EFFECTOR

This application is a divisional of U.S. patent application Ser. No. 14/559,191, filed Dec. 3, 2014, now U.S. Pat. No. 10,201,847, which claims the benefit of U.S. Provisional Patent Application No. 62/022,641, filed Jul. 9, 2014, and entitled "Automated Flexible Manufacturing System for Building a Fuselage."

CROSS-REFERENCE TO RELATED APPLICATIONS

This application is related to the following patent applications: entitled "Mobile Platforms For Performing Operations Along An Exterior Of A Fuselage Assembly," Ser. No. 14/558,933, now U.S. Pat. No. 9,505,051; entitled "Mobile Platforms for Performing Operations Inside a Fuselage Assembly," Ser. No. 14/559,073, now U.S. Pat. No. 10,960,458; entitled "Wheel Mounting System," Ser. No. 14/559,115, now U.S. Pat. No. 9,782,822; entitled "Dual-Interface Coupler," Ser. No. 14/559,153, now U.S. Pat. No. 10,525,524; entitled "Metrology-Based System for Operating a Flexible Manufacturing System," Ser. No. 14/559,855, now U.S. Pat. No. 10,046,381; entitled "Towers for Accessing an Interior of a Fuselage Assembly," Ser. No. 14/559,234, now U.S. Pat. No. 10,406,593; entitled "Assembly Fixture for Supporting a Fuselage Assembly," Ser. No. 14/559,277 now U.S. Pat. No. 10,835,947; entitled "Adjustable Retaining Structure for a Cradle Fixture," Ser. No. 14/559,303, now U.S. Pat. No. 10,835,948; entitled "Utility Fixture for Creating a Distributed Utility Network," Ser. No. 14/559,371, now U.S. Pat. No. 9,895,741; entitled "Two-Stage Riveting," Ser. No. 14/559,483, now U.S. Pat. No. 9,937,549; and entitled "Autonomous Flexible Manufacturing System for Building a Fuselage," Ser. No. 14/559,518, now U.S. Pat. No. 10,213,823, filed of even date herewith, each of which claims the benefit of U.S. Provisional Patent Application Ser. No. 62/022,641, filed Jul. 9, 2014 and entitled "Automated Flexible Manufacturing System for Building a Fuselage," each assigned to the same assignee, and each incorporated herein by reference in its entirety.

BACKGROUND INFORMATION

1. Field

The present disclosure relates generally to clamps and, in particular, to clamps attached to end effectors associated with robotic devices. Still more particularly, the present disclosure relates to a method and apparatus for attaching elastomeric clamping feet to the edges of clamps.

2. Background

Building a fuselage may include assembling skin panels and a support structure for the fuselage. The skin panels and support structure may be joined together to form a fuselage assembly. For example, without limitation, the skin panels may have support members, such as frames and stringers, attached to the surface of the skin panels that will face the interior of the fuselage assembly. These support members may be used to form the support structure for the fuselage assembly. The skin panels may be positioned relative to each other and the support members may be tied together to form this support structure.

Fastening operations may then be performed to join the skin panels and the support members together to form the fuselage assembly. These fastening operations may include, for example, riveting operations, interference-fit bolting operations, other types of attachment operations, or some combination thereof. The fuselage assembly may need to be assembled in a manner that meets outer mold line (OML) requirements and inner mold line (IML) requirements for the fuselage assembly.

With some currently available methods for building a fuselage assembly, the fastening operations performed to assemble the skin panels and the support members together may be performed manually. For example, without limitation, a first human operator positioned at an exterior of the fuselage assembly and a second human operator positioned at an interior of the fuselage assembly may use handheld tools to perform these fastening operations. In some cases, this type of manual fastening process may be more labor-intensive, time-consuming, ergonomically challenging, or expensive than desired. Further, some current assembly methods used to build fuselages that involve manual fastening processes may not allow fuselages to be built in the desired assembly facilities or factories at desired assembly rates or desired assembly costs.

Some current assembly methods may use clamps to perform certain types of fastening processes. For example, without limitation, clamps may be used to hold two parts in place relative to each other such that the two parts may be fastened together. In some cases, a clamp may be comprised of a material that may have an undesired effect on the surface of a part when the clamp is used to apply a clamping force on the part. For example, the clamp may be comprised of a material, such as a metallic material, that may scratch, mar, bend, or otherwise affect the surface of a part in an undesired manner. Consequently, it may be desirable to have a clamp that can apply a clamping force to a part without having an undesired effect on the surface of the part. Therefore, it would be desirable to have a method and apparatus that take into account at least some of the issues discussed above, as well as other possible issues.

SUMMARY

In one illustrative embodiment, an apparatus may comprise a clamp and a foot adhesively bonded to an edge of the clamp and having a set of interlocking features that form a mechanical interlock with the clamp.

In another illustrative embodiment, an apparatus may comprise an interface between a first element and a second element. The second element may have a set of interlocking features that mechanically interlock the second element with the first element to form the interface.

In another illustrative embodiment, an attachment for an end effector may comprise a first element and a second element. The first element may have a complementary set of interlocking features along an edge of the first element. The second element may be adhesively bonded to the first element such that a set of interlocking features of the second element mate with the complementary set of interlocking features along the edge of the first element to form a mechanical interlock between the first element and the second element.

In another illustrative embodiment, a method for mating a first element with a second element may be presented. An edge of the first element may be shaped to have a complementary set of interlocking features. A second element may be shaped to have a set of interlocking features. The set of interlocking features of the second element may be interfaced with the complementary set of interlocking features along the edge of the first element.

In another illustrative embodiment, a method for attaching a foot to a clamp may be presented. An edge of the clamp may be shaped to have a complementary set of interlocking features. A mold may be positioned relative to the edge of the clamp. A plastic material may be poured in liquid form into the mold such that the plastic material contacts the mold and the complementary set of interlocking features. The plastic material may be hardened to form the foot having a set of interlocking features that are adhesively bonded and mechanically interlocked with the complementary set of interlocking features along the edge of the clamp.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
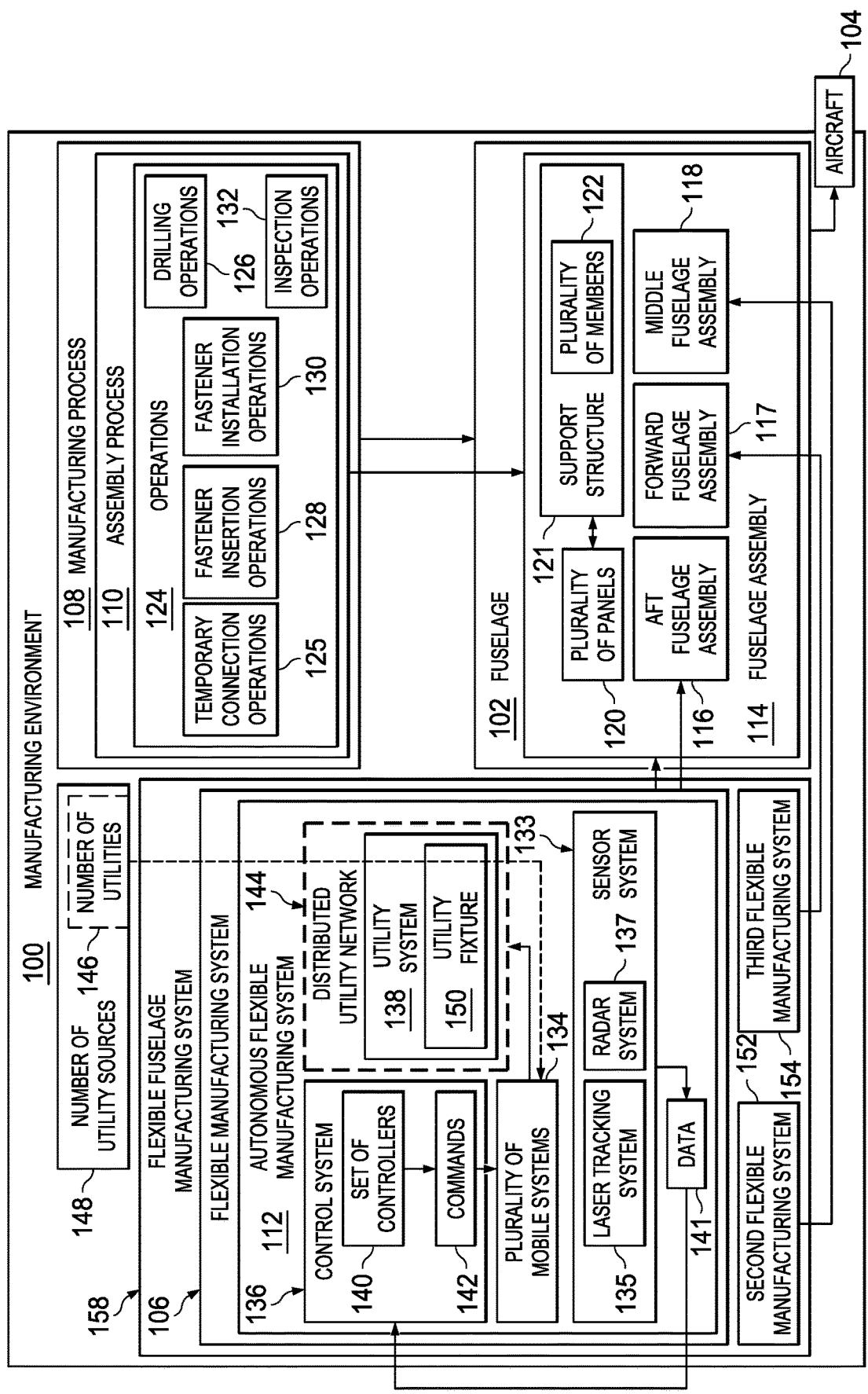
FIG. 1 is an illustration of a manufacturing environment in the form of a block diagram in accordance with an illustrative embodiment.

The illustrative embodiments recognize and take into account different considerations. For example, the illustrative embodiments recognize and take into account that it may be desirable to automate the process of building a fuselage assembly for an aircraft. Automating the process of building a fuselage assembly for an aircraft may improve build efficiency, improve build quality, and reduce costs associated with building the fuselage assembly. The illustrative embodiments also recognize and take into account that automating the process of building a fuselage assembly may improve the accuracy and precision with which assembly operations are performed, thereby ensuring improved compliance with outer mold line (OML) requirements and inner mold line (IML) requirements for the fuselage assembly.

Further, the illustrative embodiments recognize and take into account that automating the process used to build a fuselage assembly for an aircraft may significantly reduce the amount of time needed for the build cycle. For example, without limitation, automating fastening operations may reduce and, in some cases, eliminate, the need for human operators to perform these fastening operations as well as other types of assembly operations.

Further, this type of automation of the process for building a fuselage assembly for an aircraft may be less labor-intensive, time-consuming, ergonomically challenging, and expensive than performing this process primarily manually. Reduced manual labor may have a desired benefit for the human laborer. Additionally, automating the fuselage assembly process may allow fuselage assemblies to be built in desired assembly facilities and factories at desired assembly rates and desired assembly costs.

The illustrative embodiments also recognize and take into account that it may be desirable to use equipment that can be autonomously driven and operated to automate the process of building a fuselage assembly. In particular, it may be desirable to have an autonomous flexible manufacturing system comprised of mobile systems that may be autonomously driven across a factory floor, autonomously positioned relative to the factory floor as needed for building the fuselage assembly, autonomously operated to build the fuselage assembly, and then autonomously driven away when building of the fuselage assembly has been completed.

As used herein, performing any operation, action, or step autonomously may mean performing that operation substantially without any human input. For example, without limitation, a platform that may be autonomously driven is a platform that may be driven substantially independently of any human input. In this manner, an autonomously drivable platform may be a platform that is capable of driving or being driven substantially independently of human input.

Thus, the illustrative embodiments provide a method, apparatus, and system for building a fuselage assembly for an aircraft. In particular, the illustrative embodiments provide an autonomous flexible manufacturing system that automates most, if not all, of the process of building a fuselage assembly. For example, without limitation, the autonomous flexible manufacturing system may automate the process of installing fasteners to join fuselage skin panels and a fuselage support structure together to build the fuselage assembly.

However, the illustrative embodiments recognize and take into account that automating the process for building a fuselage assembly using an autonomous flexible manufacturing system may present unique technical challenges that require unique technical solutions. For example, the illustrative embodiments recognize and take into account that it may be desirable to provide utilities to all of the various systems within the autonomous flexible manufacturing system. In particular, it may be desirable to provide these utilities in a manner that will not disrupt or delay the process of building the fuselage assembly or restrict the movement of various mobile systems within the autonomous flexible manufacturing system over a factory floor.

For example, without limitation, it may be desirable to provide a set of utilities, such as power, communications, and air, to the autonomous flexible manufacturing system using an infrastructure that includes only a single direct connection to each of a set of utility sources providing the set of utilities. These direct connections may be above-ground, in-ground, or embedded. These direct connections may be established using, for example, without limitation, a utility fixture. Thus, the infrastructure may include a utility fixture that provides a direct connection to each of the set of utility sources and an assembly area with a floor space sufficiently large to allow the various systems of an autonomous flexible manufacturing system to be coupled to the utility fixture and each other in series. In this manner, the set of utilities may flow from the set of utility sources to the utility fixture and then downstream to the various systems of the autonomous flexible manufacturing system within the assembly area.

Thus, the illustrative embodiments provide a distributed utility network that may be used to provide utilities to the various systems of the autonomous flexible manufacturing system. The distributed utility network may provide these utilities in a manner that does not restrict or impede movement of the various mobile systems of the autonomous flexible manufacturing system. The different mobile systems of the autonomous flexible manufacturing system may be autonomously coupled to each other to create this distributed utility network.

Referring now to the figures and, in particular, with reference to FIGS. 1-6, illustrations of a manufacturing environment are depicted in the form of block diagrams in accordance with an illustrative embodiment. In particular, in FIGS. 1-6, a fuselage assembly, a flexible manufacturing system, the various systems within the flexible manufacturing system that may be used to build the fuselage assembly, and a distributed utility network are described.

Turning now to FIG. 1, an illustration of a manufacturing environment is depicted in the form of a block diagram in accordance with an illustrative embodiment. In this illustrative example, manufacturing environment 100 may be an example of one environment in which at least a portion of fuselage 102 may be manufactured for aircraft 104.

Manufacturing environment 100 may take a number of different forms. For example, without limitation, manufacturing environment 100 may take the form of a factory, a manufacturing facility, an outdoor factory area, an enclosed manufacturing area, an offshore platform, or some other type of manufacturing environment 100 suitable for building at least a portion of fuselage 102.

Fuselage 102 may be built using manufacturing process 108. Flexible manufacturing system 106 may be used to implement at least a portion of manufacturing process 108. In one illustrative example, manufacturing process 108 may be substantially automated using flexible manufacturing system 106. In other illustrative examples, only one or more stages of manufacturing process 108 may be substantially automated.

Flexible manufacturing system 106 may be configured to perform at least a portion of manufacturing process 108 autonomously. In this manner, flexible manufacturing system 106 may be referred to as autonomous flexible manufacturing system 112. In other illustrative examples, flexible manufacturing system 106 may be referred to as an automated flexible manufacturing system.

As depicted, manufacturing process 108 may include assembly process 110 for building fuselage assembly 114. Flexible manufacturing system 106 may be configured to perform at least a portion of assembly process 110 autonomously.

Fuselage assembly 114 may be fuselage 102 at any stage during manufacturing process 108 prior to the completion of manufacturing process 108. In some cases, fuselage assembly 114 may be used to refer to a partially assembled fuselage 102. Depending on the implementation, one or more other components may need to be attached to fuselage assembly 114 to fully complete the assembly of fuselage 102. In other cases, fuselage assembly 114 may be used to refer to the fully assembled fuselage 102. Flexible manufacturing system 106 may build fuselage assembly 114 up to the point needed to move fuselage assembly 114 to a next stage in the manufacturing process for building aircraft 104. In some cases, at least a portion of flexible manufacturing system 106 may be used at one or more later stages in the manufacturing process for building aircraft 104.

In one illustrative example, fuselage assembly 114 may be an assembly for forming a particular section of fuselage 102. As one example, fuselage assembly 114 may take the form of aft fuselage assembly 116 for forming an aft section of fuselage 102. In another example, fuselage assembly 114 may take the form of forward fuselage assembly 117 for forming a forward section of fuselage 102. In yet another example, fuselage assembly 114 may take the form of middle fuselage assembly 118 for forming a center section of fuselage 102 or some other middle section of fuselage 102 between the aft and forward sections of fuselage 102.

As depicted, fuselage assembly 114 may include plurality of panels 120 and support structure 121. Support structure 121 may be comprised of plurality of members 122. Plurality of members 122 may be used to both support plurality of panels 120 and connect plurality of panels 120 to each other. Support structure 121 may help provide strength, stiffness, and load support for fuselage assembly 114.

Plurality of members 122 may be associated with plurality of panels 120. As used herein, when one component or structure is "associated" with another component or structure, the association is a physical association in the depicted examples.

For example, a first component, such as one of plurality of members 122, may be considered to be associated with a second component, such as one of plurality of panels 120, by being at least one of secured to the second component, bonded to the second component, mounted to the second component, attached to the component, coupled to the component, welded to the second component, fastened to the second component, adhered to the second component, glued to the second component, or connected to the second component in some other suitable manner. The first component also may be connected to the second component using one or more other components. For example, the first component may be connected to the second component using a third component. Further, the first component may be considered to be associated with the second component by being formed as part of the second component, an extension of the second component, or both. In another example, the first component may be considered part of the second component by being co-cured with the second component.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" or "at least one of item A, item B, or item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In these illustrative examples, a member of plurality of members 122 may be associated with at least one of plurality of panels 120 in a number of different ways. For example, without limitation, a member of plurality of members 122 may be attached directly to a single panel, attached to two or more panels, attached to another member that is directly attached to at least one panel, attached to at least one member that is directly or indirectly attached to at least one panel, or associated with at least one of plurality of panels 120 in some other way.

In one illustrative example, substantially all or all of plurality of members 122 may be associated with plurality of panels 120 prior to the beginning of assembly process 110 for building fuselage assembly 114. For example, a corresponding portion of plurality of members 122 may be associated with each panel of plurality of panels 120 prior to plurality of panels 120 being joined to each other through assembly process 110.

In another illustrative example, only a first portion of plurality of members 122 may be associated with plurality of panels 120 prior to the beginning of assembly process 110. Assembly process 110 may include attaching a remaining portion of plurality of members 122 to plurality of panels 120 for at least one of providing support to plurality of panels 120 or connecting plurality of panels 120 together. The first portion of plurality of members 122 attached to plurality of panels 120 prior to assembly process 110 and the remaining portion of plurality of members 122 attached to plurality of panels 120 during assembly process 110 may together form support structure 121.

In yet another illustrative example, all of plurality of members 122 may be associated with plurality of panels 120 during assembly process 110. For example, each of plurality of panels 120 may be "naked" without any members attached to or otherwise associated with the panel prior to assembly process 110. During assembly process 110, plurality of members 122 may then be associated with plurality of panels 120.

In this manner, support structure 121 for fuselage assembly 114 may be built up in a number of different ways. Fuselage assembly 114 comprising plurality of panels 120 and support structure 121 is described in greater detail in FIG. 2 below.

Building fuselage assembly 114 may include joining plurality of panels 120 together. Joining plurality of panels 120 may be performed in a number of different ways. Depending on the implementation, joining plurality of panels 120 together may include joining one or more of plurality of members 122 to one or more of plurality of panels 120 or to other members of plurality of members 122.

In particular, joining plurality of panels 120 may include joining at least one panel to at least one other panel, joining at least one member to at least one other member, or joining at least one member to at least one panel, or some combination thereof. As one illustrative example, joining a first panel and a second panel together may include at least one of the following: fastening the first panel directly to the second panel, joining a first member associated with the first panel to a second member associated with the second panel, joining a member associated with the first panel directly to the second panel, joining one member associated with both the first panel and the second panel to another member, joining a selected member to both the first panel and the second panel, or some other type of joining operation.

Assembly process 110 may include operations 124 that may be performed to join plurality of panels 120 together to build fuselage assembly 114. In this illustrative example, flexible manufacturing system 106 may be used to perform at least a portion of operations 124 autonomously.

Operations 124 may include, for example, but are not limited to, temporary connection operations 125, drilling operations 126, fastener insertion operations 128, fastener installation operations 130, inspection operations 132, other types of assembly operations, or some combination thereof. Temporary connection operations 125 may be performed to temporarily connect plurality of panels 120 together. For example, without limitation, temporary connection operations 125 may include temporarily tacking plurality of panels 120 together using tack fasteners.

Drilling operations 126 may include drilling holes through one or more of plurality of panels 120 and, in some cases, through one or more of plurality of members 122. Fastener insertion operations 128 may include inserting fasteners into the holes drilled by drilling operations 126.

Fastener installation operations 130 may include fully installing each of the fasteners that have been inserted into the holes. Fastener installation operations 130 may include, for example, without limitation, riveting operations, interference-fit bolting operations, other types of fastener installation operations, or some combination thereof. Inspection operations 132 may include inspecting the fully installed fasteners. Depending on the implementation, flexible manufacturing system 106 may be used to perform any number of these different types of operations 124 substantially autonomously.

As depicted, flexible manufacturing system 106 may include plurality of mobile systems 134, control system 136, and utility system 138. Each of plurality of mobile systems 134 may be a drivable mobile system. In some cases, each of plurality of mobile systems 134 may be an autonomously drivable mobile system. For example, without limitation, each of plurality of mobile systems 134 may include one or more components that may be autonomously driven within manufacturing environment 100 from one location to another location. Plurality of mobile systems 134 are described in greater detail in FIG. 3 below.

In this illustrative example, control system 136 may be used to control the operation of flexible manufacturing system 106. For example, without limitation, control system 136 may be used to control plurality of mobile systems 134. In particular, control system 136 may be used to direct the movement of each of plurality of mobile systems 134 within manufacturing environment 100. Control system 136 may be at least partially associated with plurality of mobile systems 134.

In one illustrative example, control system 136 may include set of controllers 140. As used herein, a "set of" items may include one or more items. In this manner, set of controllers 140 may include one or more controllers.

Each of set of controllers 140 may be implemented using hardware, firmware, software, or some combination thereof. In one illustrative example, set of controllers 140 may be associated with plurality of mobile systems 134. For example, without limitation, one or more of set of controllers 140 may be implemented as part of plurality of mobile systems 134. In other examples, one or more of set of controllers 140 may be implemented independently of plurality of mobile systems 134.

Set of controllers 140 may generate commands 142 to control the operation of plurality of mobile systems 134 of flexible manufacturing system 106. Set of controllers 140 may communicate with plurality of mobile systems 134 using at least one of a wireless communications link, a wired communications link, an optical communications link, or other type of communications link. In this manner, any number of different types of communications links may be used for communication with and between set of controllers 140.

In these illustrative examples, control system 136 may control the operation of plurality of mobile systems 134 using data 141 received from sensor system 133. Sensor system 133 may be comprised of any number of individual sensor systems, sensor devices, controllers, other types of components, or combination thereof. In one illustrative example, sensor system 133 may include laser tracking system 135 and radar system 137. Laser tracking system 135 may be comprised of any number of laser tracking devices, laser targets, or combination thereof. Radar system 137 may be comprised of any number of radar sensors, radar targets, or combination thereof.

Sensor system 133 may be used to coordinate the movement and operation of the various mobile systems in plurality of mobile systems 134 within manufacturing environment 100. As one illustrative example, radar system 137 may be used for macro-positioning mobile systems, systems within mobile systems, components within mobile systems, or some combination thereof. Further, laser tracking system 135 may be used for micro-positioning mobile systems, systems within mobile systems, components within mobile systems, or some combination thereof.

Plurality of mobile systems 134 may be used to form distributed utility network 144. Depending on the implementation, one or more of plurality of mobile systems 134 may form distributed utility network 144. Number of utilities 146 may flow from number of utility sources 148 to the various mobile systems of plurality of mobile systems 134 that make up distributed utility network 144.

In this illustrative example, each of number of utility sources 148 may be located with manufacturing environment 100. In other illustrative examples, one or more of number of utility sources 148 may be located outside of manufacturing environment 100. The corresponding utility provided by these one or more utility sources may then be carried into manufacturing environment 100 using, for example, without limitation, one or more utility cables.

In one illustrative example, distributed utility network 144 may allow number of utilities 146 to flow directly from number of utility sources 148 to one mobile system in plurality of mobile systems 134 over some number of utility cables. This one mobile system may then distribute number of utilities 146 to other mobile systems of plurality of mobile systems 134 such that these other mobile systems do not need to directly receive number of utilities 146 from number of utility sources 148.

As depicted, distributed utility network 144 may be formed using utility system 138. Utility system 138 may include utility fixture 150. Utility system 138 may be configured to connect to number of utility sources 148 such that number of utilities 146 may flow from number of utility sources 148 to utility fixture 150. Utility fixture 150 may be above-ground or in-ground, depending on the implementation. For example, without limitation, utility fixture 150 may be embedded in a floor within manufacturing environment 100.

Utility fixture 150 may then distribute number of utilities 146 to one or more of plurality of mobile systems 134. In particular, one autonomous coupling of one of plurality of mobile systems 134 to utility fixture 150 may be followed by any number of autonomous couplings of mobile systems to each other in series to form distributed utility network 144. Utility fixture 150 may distribute number of utilities 146 to each of plurality of mobile systems 134 downstream of utility fixture 150 in the series of autonomous couplings of the mobile systems.

Depending on the implementation, distributed utility network 144 may have a chain-like configuration or a tree-like configuration. In one illustrative example, plurality of mobile systems 134 may include mobile systems A, B, C, and D (not shown in figure) with mobile system A autonomously coupled to utility fixture 150 and mobile systems B, C, and D autonomously coupled to mobile system A and each other in series. An example of a chain-like configuration for distributed utility network 144 may include number of utilities 146 flowing from number of utility sources 148 over some number of utility cables to utility fixture 150, from utility fixture 150 to mobile system A, from mobile system A to mobile system B, from mobile system B to mobile system C, and from mobile system C to mobile system D. An example of a tree-like configuration for distributed utility network 144 may include number of utilities 146 flowing from number of utility sources 148 over some number of utility cables to utility fixture 150, from utility fixture 150 to mobile system A, from mobile system A to both mobile system B and mobile system C, and from mobile system C to mobile system D. An example of one manner in which distributed utility network 144 may be implemented using plurality of mobile systems 134 is described in greater detail in FIG. 5 below.

In some illustrative examples, multiple flexible manufacturing systems may be used to build multiple fuselage assemblies concurrently. For example, flexible manufacturing system 106 may be a first flexible manufacturing system of many flexible manufacturing systems.

In one illustrative example, flexible manufacturing system 106, second flexible manufacturing system 152, and third flexible manufacturing system 154 may be used to build aft fuselage assembly 116, middle fuselage assembly 118, and forward fuselage assembly 117, respectively. Aft fuselage assembly 116, middle fuselage assembly 118, and forward fuselage assembly 117 may then be joined together to form a fully assembled fuselage 102. In this manner, in this example, flexible manufacturing system 106, second flexible manufacturing system 152, and third flexible manufacturing system 154 may together form flexible fuselage manufacturing system 158.

Thus, any number of fuselage assemblies, such as fuselage assembly 114, may be built within manufacturing environment 100 using any number of flexible manufacturing systems implemented in a manner similar to flexible manufacturing system 106. Similarly, any number of full fuselages, such as fuselage 102, may be built within manufacturing environment 100 using any number of flexible fuselage manufacturing systems implemented in a manner similar to flexible fuselage manufacturing system 158.

Figure 2:
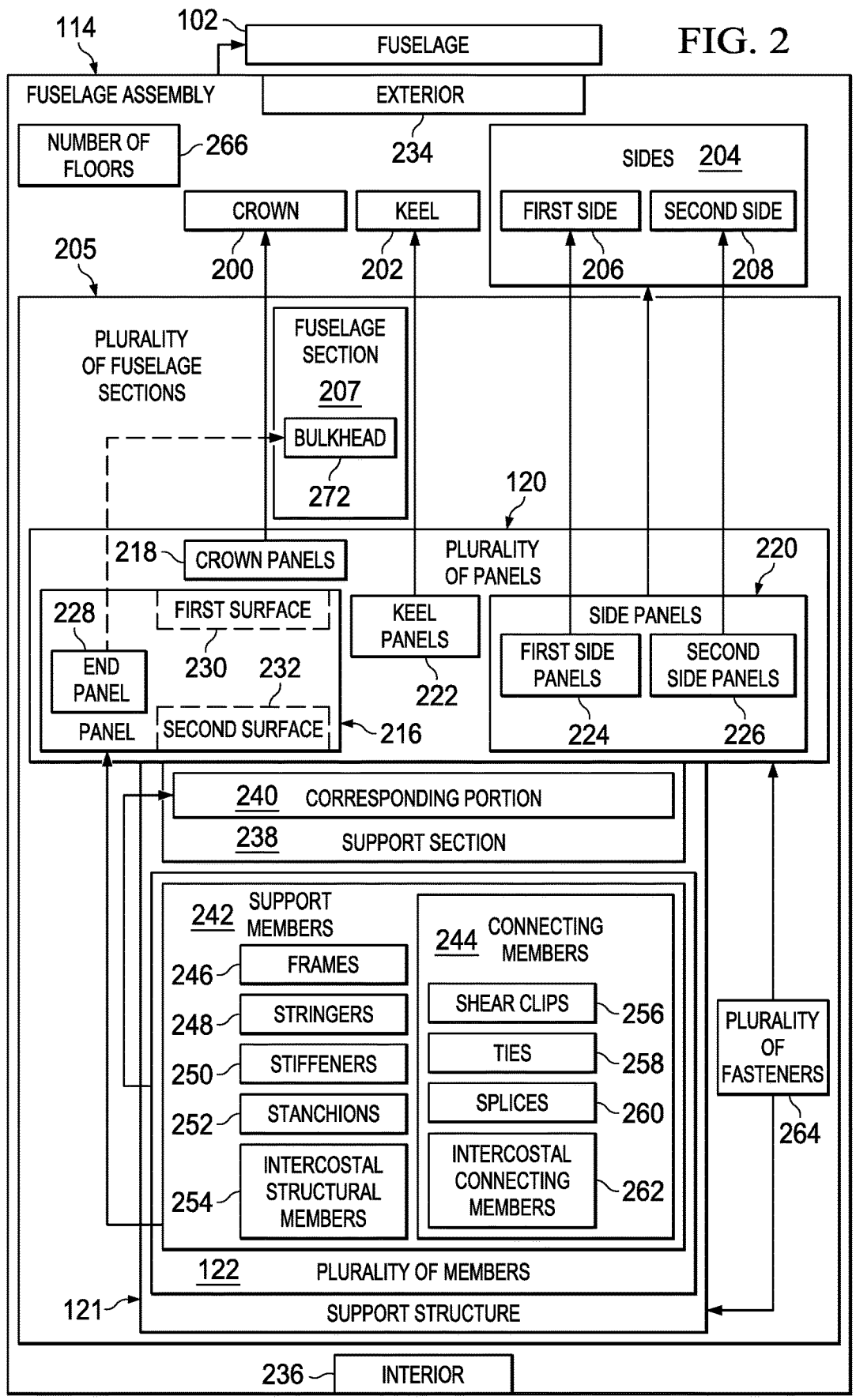
FIG. 2 is an illustration of a fuselage assembly in the form of a block diagram in accordance with an illustrative embodiment.

With reference now to FIG. 2, an illustration of fuselage assembly 114 from FIG. 1 is depicted in the form of a block diagram in accordance with an illustrative embodiment. As described above, fuselage assembly 114 may include plurality of panels 120 and support structure 121. Fuselage assembly 114 may be used to refer to any stage in the building of fuselage assembly 114. For example, fuselage assembly 114 may be used to refer to a single one of plurality of panels 120, multiple ones of plurality of panels 120 that have been or are being joined together, a partially built fuselage assembly, or a fully built fuselage assembly.

As depicted, fuselage assembly 114 may be built such that fuselage assembly 114 has plurality of fuselage sections 205. Each of plurality of fuselage sections 205 may include one or more of plurality of panels 120. In this illustrative example, each of plurality of fuselage sections 205 may take the form of a cylindrically-shaped fuselage section, a barrel-shaped fuselage section, a tapered cylindrical fuselage section, a cone-shaped fuselage section, a dome-shaped fuselage section, or a section having some other type of shape. Depending on the implementation, a fuselage section of plurality of fuselage sections 205 may have a shape that has a substantially circular cross-sectional shape, elliptical cross-sectional shape, oval cross-sectional shape, polygon with rounded corners cross-sectional shape, or otherwise closed-curve cross-sectional shape.

As one specific illustrative example, each of plurality of fuselage sections 205 may be a portion of fuselage assembly 114 defined between two radial cross-sections of fuselage assembly 114 that are taken substantially perpendicular to a center axis or longitudinal axis through fuselage assembly 114. In this manner, plurality of fuselage sections 205 may be arranged along the longitudinal axis of fuselage assembly 114. In other words, plurality of fuselage sections 205 may be arranged longitudinally.

Fuselage section 207 may be an example of one of plurality of fuselage sections 205. Fuselage section 207 may be comprised of one or more of plurality of panels 120. In one illustrative example, multiple panel sections may be arranged circumferentially around fuselage section 207 to form the skin of fuselage section 207. In some cases, multiple rows of two or more longitudinally adjacent panels may be arranged circumferentially around fuselage section 207 to form the skin of fuselage section 207.

In one illustrative example, fuselage assembly 114 may have crown 200, keel 202, and sides 204. Sides 204 may include first side 206 and second side 208.

Crown 200 may be the top portion of fuselage assembly 114. Keel 202 may be the bottom portion of fuselage assembly 114. Sides 204 of fuselage assembly 114 may be the portions of fuselage assembly 114 between crown 200 and keel 202. In one illustrative example, each of crown 200, keel 202, first side 206, and second side 208 of fuselage assembly 114 may be formed by at least a portion of at least one of plurality of panels 120. Further, a portion of each of plurality of fuselage sections 205 may form each of crown 200, keel 202, first side 206, and second side 208.

Panel 216 may be an example of one of plurality of panels 120. Panel 216 may also be referred to as a skin panel, a fuselage panel, or a fuselage skin panel, depending on the implementation. In some illustrative examples, panel 216 may take the form of a mega-panel comprised of multiple smaller panels, which may be referred to as sub-panels. A mega-panel may also be referred to as a super panel. In these illustrative examples, panel 216 may be comprised of at least one of a metal, a metal alloy, some other type of metallic material, a composite material, or some other type of material. As one illustrative example, panel 216 may be comprised of an aluminum alloy, steel, titanium, a ceramic material, a composite material, some other type of material, or some combination thereof.

When used to form keel 202 of fuselage assembly 114, panel 216 may be referred to as a keel panel or a bottom panel. When used to form one of sides 204 of fuselage assembly 114, panel 216 may be referred to as a side panel. When used to form crown 200 of fuselage assembly 114, panel 216 may be referred to as a crown panel or a top panel. As one illustrative example, plurality of panels 120 may include crown panels 218 for forming crown 200, side panels 220 for forming sides 204, and keel panels 222 for forming keel 202. Side panels 220 may include first side panels 224 for forming first side 206 and second side panels 226 for forming second side 208.

In one illustrative example, fuselage section 207 of plurality of fuselage sections 205 of fuselage assembly 114 may include one of crown panels 218, two of side panels 220, and one of keel panels 222. In another illustrative example, fuselage section 207 may form an end of fuselage assembly 114.

In some cases, fuselage section 207 may be comprised solely of a single panel, such as panel 216. For example, without limitation, panel 216 may take the form of end panel 228.

End panel 228 may be used to form one end of fuselage assembly 114. For example, when fuselage assembly 114 takes the form of aft fuselage assembly 116 in FIG. 1, end panel 228 may form the aftmost end of fuselage assembly 114. When fuselage assembly 114 takes the form of forward fuselage assembly 117 in FIG. 1, end panel 228 may form the forwardmost end of fuselage assembly 114.

In one illustrative example, end panel 228 may take the form of a cylindrically-shaped panel, a cone-shaped panel, a barrel-shaped panel, or a tapered cylindrical panel. For example, end panel 228 may be a single cylindrically-shaped panel having a substantially circular cross-sectional shape that may change in diameter with respect to a center axis for fuselage assembly 114.

In this manner, as described above, fuselage section 207 may be comprised solely of end panel 228. In some illustrative examples, fuselage section 207 may be an end fuselage section that is comprised of only a single panel, which may be end panel 228. In some cases, bulkhead 272 may be associated with end panel 228 when fuselage section 207 is an end fuselage section. Bulkhead 272, which may also be referred to as a pressure bulkhead, may be considered separate from or part of end panel 228, depending on the implementation. Bulkhead 272 may have a dome-type shape in these illustrative examples.

When fuselage assembly 114 takes the form of aft fuselage assembly 116 in FIG. 1, bulkhead 272 may be part of fuselage section 207 located at the aftmost end of aft fuselage assembly 116. When fuselage assembly 114 takes the form of forward fuselage assembly 117 in FIG. 1, bulkhead 272 may be part of fuselage section 207 located at the forwardmost end of forward fuselage assembly 117. Middle fuselage assembly 118 in FIG. 1 may not include a bulkhead, such as bulkhead 272, at either end of middle fuselage assembly 118. In this manner, plurality of fuselage sections 205 may be implemented in any number of different ways.

Panel 216 may have first surface 230 and second surface 232. First surface 230 may be configured for use as an exterior-facing surface. In other words, first surface 230 may be used to form exterior 234 of fuselage assembly 114. Second surface 232 may be configured for use as an interior-facing surface. In other words, second surface 232 may be used to form interior 236 of fuselage assembly 114. Each of plurality of panels 120 may be implemented in a manner similar to panel 216.

As described earlier, support structure 121 may be associated with a corresponding one of plurality of panels 120. Support structure 121 may be comprised of plurality of members 122 that are associated with panel 216. In one illustrative example, corresponding portion 240 may be the portion of plurality of members 122 that correspond to panel 216. Corresponding portion 240 may form support section 238 corresponding to panel 216. Support section 238 may form a part of support structure 121.

Plurality of members 122 may include support members 242. Support members 242 may include, for example, without limitation, at least one of connecting members 244, frames 246, stringers 248, stiffeners 250, stanchions 252, intercostal structural members 254, or other types of structural members.

Connecting members 244 may connect other types of support members 242 together. In some cases, connecting members 244 may also connect support members 242 to plurality of panels 120. Connecting members 244 may include, for example, without limitation, shear clips 256, ties 258, splices 260, intercostal connecting members 262, other types of mechanical connecting members, or some combination thereof.

In one illustrative example, when panel 216 is comprised of multiple sub-panels, connecting members 244 may be used to, for example, without limitation, connect together complementary frames of frames 246 running in the hoop-wise direction on adjacent sub-panels and complementary stringers of stringers 248 running in the longitudinal direction on adjacent sub-panels. In other illustrative examples, connecting members 244 may be used to connect together complementary frames, stringers, or other types of support members on two or more adjacent panels in plurality of panels 120. In some cases, connecting members 244 may be used to connect together complementary support members on two or more adjacent fuselage sections.

Operations 124, as described in FIG. 1, may be performed to join plurality of panels 120 together to build fuselage assembly 114. In one illustrative example, plurality of fasteners 264 may be used to join plurality of panels 120 together.

As described above, joining plurality of panels 120 together may be performed in a number of different ways. Joining plurality of panels 120 together may include at least one of joining at least one panel in plurality of panels 120 to another one of plurality of panels 120, joining at least one panel in plurality of panels 120 to at least one of plurality of members 122, joining at least one member in plurality of members 122 to another one of plurality of members 122, or some other type of joining operation. Plurality of panels 120 may be joined together such that plurality of members 122 ultimately form support structure 121 for fuselage assembly 114.

As depicted, number of floors 266 may be associated with fuselage assembly 114. In this illustrative example, number of floors 266 may be part of fuselage assembly 114. Number of floors 266 may include, for example, without limitation, at least one of a passenger floor, a cargo floor, or some other type of floor.

Figure 3:
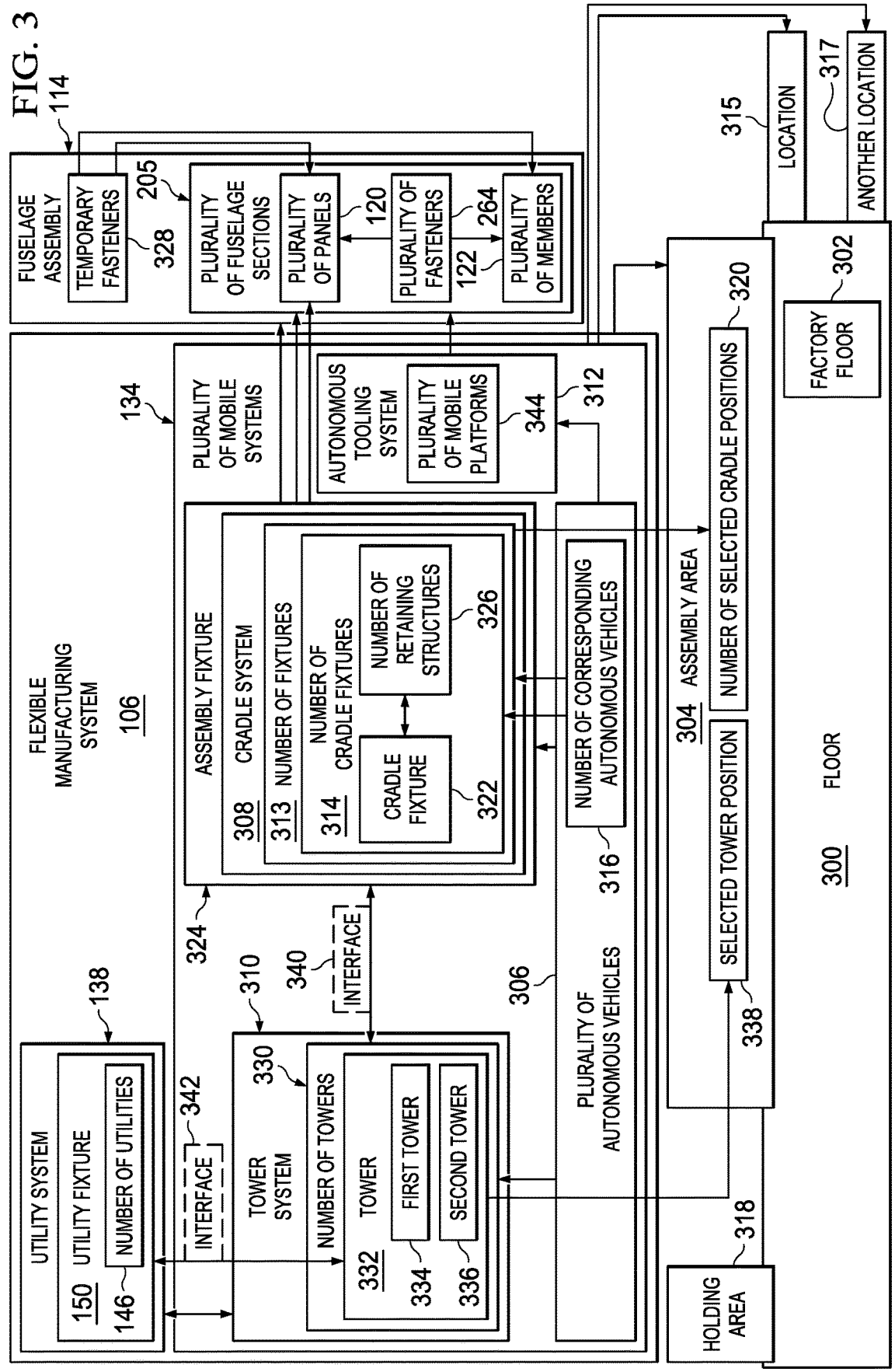
FIG. 3 is an illustration of a plurality of mobile systems of a flexible manufacturing system within a manufacturing environment in the form of a block diagram in accordance with an illustrative embodiment.

With reference now to FIG. 3, an illustration of plurality of mobile systems 134 of flexible manufacturing system 106 within manufacturing environment 100 from FIG. 1 is depicted in the form of a block diagram in accordance with an illustrative embodiment. As depicted, flexible manufacturing system 106 may be used to build fuselage assembly 114 on floor 300 of manufacturing environment 100. When manufacturing environment 100 takes the form of a factory, floor 300 may be referred to as factory floor 302.

In one illustrative example, floor 300 may be substantially smooth and substantially planar. For example, floor 300 may be substantially level. In other illustrative examples, one or more portions of floor 300 may be sloped, ramped, or otherwise uneven.

Assembly area 304 may be an area within manufacturing environment 100 designated for performing assembly process 110 in FIG. 1 to build a fuselage assembly, such as fuselage assembly 114. Assembly area 304 may also be referred to as a cell or a work cell. In this illustrative example, assembly area 304 may be a designated area on floor 300. However, in other illustrative examples, assembly area 304 may include a designated area on floor 300 as well as the area above this designated area. Any number of assembly areas may be present within manufacturing environment 100 such that any number of fuselage assemblies may be built concurrently within manufacturing environment 100.

As depicted, plurality of mobile systems 134 may include plurality of autonomous vehicles 306, cradle system 308, tower system 310, and autonomous tooling system 312. Each of plurality of mobile systems 134 may be drivable across floor 300. In other words, each of plurality of mobile systems 134 may be capable of being autonomously driven across floor 300 from one location 315 to another location 317 on floor 300.

In one illustrative example, each of plurality of autonomous vehicles 306 may take the form of an automated guided vehicle (AGV), which may be capable of operating independently without human direction or guidance. In some cases, plurality of autonomous vehicles 306 may be referred to as a plurality of automated guided vehicles (AGVs).

In this illustrative example, cradle system 308 may be used to support and hold fuselage assembly 114 during assembly process 110 in FIG. 1. In some cases, cradle system 308 may be referred to as a drivable cradle system. In still other cases, cradle system 308 may be referred to as an autonomously drivable cradle system.

Cradle system 308 may include number of fixtures 313. As used herein, a "number of" items may include one or more items. In this manner, number of fixtures 313 may include one or more fixtures. In some illustrative examples, number of fixtures 313 may be referred to as a number of drivable fixtures. In other illustrative examples, number of fixtures 313 may be referred to as a number of autonomously drivable fixtures.

Number of fixtures 313 may include number of cradle fixtures 314. In some illustrative examples, number of cradle fixtures 314 may be referred to as a number of drivable cradle fixtures. In other illustrative examples, number of cradle fixtures 314 may be referred to as a number of autonomously drivable cradle fixtures. Cradle fixture 322 may be an example of one of number of cradle fixtures 314.

Number of retaining structures 326 may be associated with each of number of cradle fixtures 314. Number of retaining structures 326 associated with each of number of cradle fixtures 314 may be engaged with and used to support fuselage assembly 114. For example, number of retaining structures 326 associated with cradle fixture 322 may be engaged with and used to support one or more of plurality of panels 120.

Number of cradle fixtures 314 may be autonomously driven across floor 300 of manufacturing environment 100 to assembly area 304. In one illustrative example, each of number of cradle fixtures 314 may be autonomously driven across floor 300 using a corresponding one of plurality of autonomous vehicles 306. In other words, without limitation, number of corresponding autonomous vehicles 316 in plurality of autonomous vehicles 306 may be used to drive number of cradle fixtures 314 across floor 300 into assembly area 304.

In this illustrative example, number of corresponding autonomous vehicles 316 may drive from, for example, without limitation, holding area 318, across floor 300, to assembly area 304. Holding area 318 may be an area in which at least one of plurality of autonomous vehicles 306, cradle system 308, tower system 310, autonomous tooling system 312, or control system 136 from FIG. 1 may be held when flexible manufacturing system 106 is not in use or when that particular device or system is not in use.

Holding area 318 may be referred to as a home area, a storage area, or a base area, depending on the implementation. Although holding area 318 is depicted as being located within manufacturing environment 100, holding area 318 may be located in some other area or environment outside of manufacturing environment 100 in other illustrative examples.

Number of corresponding autonomous vehicles 316 in plurality of autonomous vehicles 306 may drive number of cradle fixtures 314 into number of selected cradle positions 320. As used herein, a "position" may be comprised of a location, an orientation, or both. The location may be in two-dimensional coordinates or three-dimensional coordinates with respect to a reference coordinate system. The orientation may be a two-dimensional or three-dimensional orientation with respect to a reference coordinate system. This reference coordinate system may be, for example, without limitation, a fuselage coordinate system, an aircraft coordinate system, a coordinate system for manufacturing environment 100, or some other type of coordinate system.

When number of cradle fixtures 314 includes more than one cradle fixture such that number of selected cradle positions 320 includes more than one cradle position, these cradle positions may be positions selected relative to each other. In this manner, number of cradle fixtures 314 may be positioned such that number of cradle fixtures 314 are in number of selected cradle positions 320 relative to each other.

In these illustrative examples, number of corresponding autonomous vehicles 316 may be used to drive number of cradle fixtures 314 into number of selected cradle positions 320 within assembly area 304. "Driving" a component or a system across floor 300 may mean, for example, but not limited to, moving substantially the entirety of that component or system from one location to another location. For example, without limitation, driving cradle fixture 322 across floor 300 may mean moving the entirety of cradle fixture 322 from one location to another location. In other words, all or substantially all components that comprise cradle fixture 322 may be simultaneously moved together from one location to another location.

Once number of cradle fixtures 314 has been driven into number of selected cradle positions 320 in assembly area 304, number of cradle fixtures 314 may be coupled to each other and to tower system 310. Number of corresponding autonomous vehicles 316 may then drive away from number of cradle fixtures 314 to, for example, without limitation, holding area 318, once number of cradle fixtures 314 is positioned in number of selected cradle positions 320 within selected tolerances. In other illustrative examples, number of corresponding autonomous vehicles 316 may be comprised of a single autonomous vehicle that is used to drive each of number of cradle fixtures 314 into a corresponding selected position in number of selected cradle positions 320 within assembly area 304 one at a time.

In assembly area 304, number of cradle fixtures 314 may be configured to form assembly fixture 324. Assembly fixture 324 may be formed when the different cradle fixtures in number of cradle fixtures 314 have been placed in number of selected cradle positions 320 relative to each other. In some cases, assembly fixture 324 may be formed when number of cradle fixtures 314 have been coupled to each other while number of cradle fixtures 314 is in number of selected cradle positions 320 and when number of retaining structures 326 associated with each of number of cradle fixtures 314 has been adjusted to receive fuselage assembly 114.

In this manner, number of cradle fixtures 314 may form a single fixture entity, such as assembly fixture 324. Assembly fixture 324 may be used to support and hold fuselage assembly 114. In some cases, assembly fixture 324 may be referred to as an assembly fixture system or a fixture system. In some cases, assembly fixture 324 may be referred to as a drivable assembly fixture. In other cases, assembly fixture 324 may be referred to as an autonomously drivable assembly fixture.

Once assembly fixture 324 has been formed, number of cradle fixtures 314 may receive fuselage assembly 114. In other words, plurality of fuselage sections 205 may be engaged with number of cradle fixtures 314. In particular, plurality of fuselage sections 205 may be engaged with number of retaining structures 326 associated with each of number of cradle fixtures 314. Plurality of fuselage sections 205 may be engaged with number of cradle fixtures 314 in any number of ways.

When number of cradle fixtures 314 includes a single cradle fixture, that cradle fixture may be used to support and hold substantially the entire fuselage assembly 114. When number of cradle fixtures 314 includes multiple cradle fixtures, each of these cradle fixtures may be used to support and hold at least one corresponding fuselage section of plurality of fuselage sections 205.

In one illustrative example, each of plurality of fuselage sections 205 may be engaged with number of cradle fixtures 314 one at a time. For example, without limitation, all of the panels for a particular fuselage section in plurality of fuselage sections 205 may be positioned relative to each other and a corresponding cradle fixture in number of cradle fixtures 314 and then engaged with the corresponding cradle fixture. The remaining fuselage sections in plurality of fuselage sections 205 may then be formed and engaged with number of cradle fixtures 314 in a similar manner. In this manner, plurality of panels 120 may be engaged with number of cradle fixtures 314 by engaging at least a portion of plurality of panels 120 with number of retaining structures 326 associated with each of number of cradle fixtures 314 that makes up assembly fixture 324 such that plurality of panels 120 is supported by number of cradle fixtures 314.

As described in FIG. 2, plurality of panels 120 may include keel panels 222, side panels 220, and crown panels 218. In one illustrative example, all of keel panels 222 in FIG. 2 used to form keel 202 of fuselage assembly 114 in FIG. 2 may first be positioned relative to and engaged with number of cradle fixtures 314. Next, all of side panels 220 in FIG. 2 used to form sides 204 of fuselage assembly 114 in FIG. 2 may be positioned relative to and engaged with keel panels 222. Then, all of crown panels 218 in FIG. 2 used to form crown 200 of fuselage assembly 114 in FIG. 2 may be positioned relative to and engaged with side panels 220. In this manner, plurality of fuselage sections 205 may be concurrently assembled to form fuselage assembly 114.

In one illustrative example, each panel in plurality of panels 120 may have a corresponding portion of plurality of members 122 fully formed and associated with the panel prior to the panel being engaged with one of number of cradle fixtures 314. This corresponding portion of plurality of members 122 may be referred to as a support section. For example, support section 238 in FIG. 2 may be fully formed and associated with panel 216 in FIG. 2 prior to panel 216 being engaged with one of number of cradle fixtures 314 or another panel of plurality of panels 120 in FIG. 2. In other words, a corresponding portion of support members 242 in FIG. 2 may already be attached to panel 216 and a corresponding portion of connecting members 244 in FIG. 2 already installed to connect this portion of support members 242 to each other prior to panel 216 from FIG. 2 being engaged with one of number of cradle fixtures 314.

In other illustrative examples, plurality of members 122 may be associated with plurality of panels 120 after plurality of panels 120 have been engaged with each other and number of cradle fixtures 314. In still other illustrative examples, only a portion of plurality of members 122 may be associated with plurality of panels 120 prior to plurality of panels 120 being engaged with each other and number of cradle fixtures 314 and then a remaining portion of plurality of members 122 associated with plurality of panels 120 once plurality of panels 120 have been engaged with each other and number of cradle fixtures 314.

In some illustrative examples, one or more of support members 242 in FIG. 2, one or more of connecting members 244 in FIG. 2, or both may not be associated with panel 216 when panel 216 from FIG. 2 is engaged with one of number of cradle fixtures 314 or with one of the other panels in plurality of panels 120. For example, without limitation, frames 246 described in FIG. 2 may be added to panel 216 from FIG. 2 after panel 216 has been engaged with cradle fixture 322. In another example, stiffeners 250 described in FIG. 2 may be added to panel 216 from FIG. 2 after panel 216 has been engaged with cradle fixture 322.

Building fuselage assembly 114 may include engaging plurality of panels 120 with each other as plurality of panels 120 are built up on number of cradle fixtures 314 of assembly fixture 324. For example, adjacent panels in plurality of panels 120 may be connected by connecting at least a portion of the support members associated with the panels. Depending on the implementation, at least one of lap splices, butt splices, or other types of splices may be used to connect the adjacent panels in addition to or in place of connecting the corresponding support members of the adjacent panels.

As one illustrative example, the support members associated with two adjacent panels in plurality of panels 120 may be connected together using connecting members, thereby connecting the two adjacent panels. The two support members associated with these two adjacent panels may be, for example, without limitation, spliced, tied, clipped, tacked, pinned, joined, or fastened together in some other manner. When the two adjacent panels are hoop-wise adjacent, complementary frames may be connected in the hoop-wise direction. When the two adjacent panels are longitudinally adjacent, complementary stringers may be connected in the longitudinal direction.

In some cases, connecting complementary stringers, frames, or other support members on these two adjacent panels may be part of splicing these panels together. Adjacent panels may be connected together using any number of panel splices, stringer splices, frame splices, or other types of splices.

In one illustrative example, plurality of panels 120 may be temporarily connected to each other by temporarily fastening at least one of plurality of panels 120 or plurality of members 122 together using temporary fasteners or permanent fasteners. For example, without limitation, temporary clamps may be used to temporarily connect and hold in place two of plurality of panels 120 together. Temporarily connecting plurality of panels 120 together may be performed by at least one of temporarily connecting at least two plurality of panels 120 together, temporarily connecting at least two plurality of members 122 together, or temporarily connecting at least one of plurality of panels 120 to at least one of plurality of members 122 such that plurality of members 122 associated with plurality of panels 120 forms support structure 121 in FIG. 2 for fuselage assembly 114.

As one illustrative example, plurality of panels 120 may be temporarily tacked or pinned together using temporary fasteners 328 until plurality of fasteners 264 are installed to join plurality of panels 120 together to form fuselage assembly 114. Temporarily connecting plurality of panels 120 may temporarily connect together plurality of fuselage sections 205 from FIG. 2 formed by plurality of panels 120. Once plurality of fasteners 264 have been installed, temporary fasteners 328 may then be removed.

In this manner, plurality of panels 120 may be connected together in a number of different ways. Once plurality of panels 120 have been connected together, plurality of members 122 may be considered as forming support structure 121 for fuselage assembly 114. Connecting plurality of panels 120 together and forming support structure 121 may maintain desired compliance with outer mold line requirements and inner mold line requirements for fuselage assembly 114. In other words, plurality of panels 120 may be held together in place relative to each other such that fuselage assembly 114 formed using plurality of panels 120 meets outer mold line requirements and inner mold line requirements for fuselage assembly 114 within selected tolerances.

In particular, assembly fixture 324 may support plurality of panels 120 and support structure 121 associated with plurality of panels 120 such that fuselage assembly 114 built using plurality of panels 120 and support structure 121 has a shape and a configuration that is within selected tolerances. In this manner, this shape and configuration may be maintained within selected tolerances while supporting plurality of panels 120 and plurality of members 122 associated with plurality of panels 120 during the building of fuselage assembly 114. This shape may be at least partially determined by, for example, without limitation, the outer mold line requirements and inner mold line requirements for fuselage assembly 114. In some cases, the shape may be at least partially determined by the location and orientation of the frames and stringers of fuselage assembly 114.

In some cases, when the assembly of plurality of panels 120 and support structure 121 that comprise fuselage assembly 114 has reached a desired point, number of corresponding autonomous vehicles 316 may drive assembly fixture 324 out of assembly area 304. For example, fuselage assembly 114 may be driven across floor 300 into a different area within manufacturing environment 100, from floor 300 onto another floor in a different manufacturing environment, or from floor 300 onto another floor in some other area or environment.

In one illustrative example, assembly fixture 324 may be driven to some other location at which another assembly fixture is located such that the two assembly fixtures may be coupled to form a larger assembly fixture. As one illustrative example, assembly fixture 324 may be used to hold and support aft fuselage assembly 116 in FIG. 1, while another assembly fixture implemented in a manner similar to assembly fixture 324 may be used to hold and support forward fuselage assembly 117 in FIG. 1. Yet another assembly fixture implemented in a manner similar to assembly fixture 324 may be used to hold and support middle fuselage assembly 118 in FIG. 1.

Once these three fuselage assemblies have been built, the three assembly fixtures may be brought together to form a larger assembly fixture for holding aft fuselage assembly 116, middle fuselage assembly 118, and forward fuselage assembly 117 such that these three fuselage assemblies may be joined to form fuselage 102 described in FIG. 1. In particular, this larger assembly fixture may hold aft fuselage assembly 116, middle fuselage assembly 118, and forward fuselage assembly 117 in alignment with each other such that fuselage 102 may be built within selected tolerances.

In another illustrative example, a first assembly fixture and a second assembly fixture implemented in a manner similar to assembly fixture 324 may be used to hold and support aft fuselage assembly 116 and forward fuselage assembly 117, respectively, from FIG. 1. Once these two fuselage assemblies have been built, the two assembly fixtures may then be brought together to form a larger assembly fixture for holding the two fuselage assemblies such that these fuselage assemblies may be joined to form fuselage 102. The larger assembly fixture may hold aft fuselage assembly 116 and forward fuselage assembly 117 in alignment with each other such that fuselage 102 may be built within selected tolerances.

As depicted, tower system 310 includes number of towers 330. Tower 332 may be an example of one implementation for one of number of towers 330. Tower 332 may be configured to provide access to interior 236 of fuselage assembly 114 described in FIG. 2. In some illustrative examples, tower 332 may be referred to as a drivable tower. In other illustrative examples, tower 332 may be referred to as an autonomously drivable tower.

In one illustrative example, tower 332 may take the form of first tower 334. First tower 334 may also be referred to as an operator tower in some cases. In another illustrative example, tower 332 may take the form of second tower 336. Second tower 336 may also be referred to as a robotics tower in some cases. In this manner, number of towers 330 may include both first tower 334 and second tower 336.

First tower 334 may be configured substantially for use by a human operator, whereas second tower 336 may be configured substantially for use by a mobile platform having at least one robotic device associated with the mobile platform. In other words, first tower 334 may allow a human operator to access and enter interior 236 of fuselage assembly 114. Second tower 336 may allow a mobile platform to access and enter interior 236 of fuselage assembly 114.

First tower 334 and second tower 336 may be positioned relative to assembly fixture 324 at different times during assembly process 110. As one illustrative example, one of plurality of autonomous vehicles 306 may be used to move or autonomously drive first tower 334 from holding area 318 into selected tower position 338 within assembly area 304. Number of cradle fixtures 314 may then be autonomously driven, using number of corresponding autonomous vehicles 316, into number of selected cradle positions 320 relative to first tower 334, which is in selected tower position 338 within assembly area 304.

Second tower 336 may be exchanged for first tower 334 at some later stage during assembly process 110 in FIG. 1. For example, one of plurality of autonomous vehicles 306 may be used to autonomously drive first tower 334 out of assembly area 304 and back into holding area 318. The same autonomous vehicle or a different autonomous vehicle in plurality of autonomous vehicles 306 may then be used to autonomously drive second tower 336 from holding area 318 into selected tower position 338 within assembly area 304 that was previously occupied by first tower 334.

Depending on the implementation, first tower 334 may be later exchanged for second tower 336.

In other illustrative examples, first tower 334 and second tower 336 may each have an autonomous vehicle in plurality of autonomous vehicles 306 fixedly associated with the tower. In other words, one of plurality of autonomous vehicles 306 may be integrated with first tower 334 and one of plurality of autonomous vehicles 306 may be integrated with second tower 336. For example, one of plurality of autonomous vehicles 306 may be considered part of or built into first tower 334. First tower 334 may then be considered capable of autonomously driving across floor 300. In a similar manner, one of plurality of autonomous vehicles 306 may be considered part of or built into second tower 336. Second tower 336 may then be considered capable of autonomously driving across floor 300.

Tower system 310 and assembly fixture 324 may be configured to form interface 340 with each other. Interface 340 may be a physical interface between tower system 310 and assembly fixture 324. Tower system 310 may also be configured to form interface 342 with utility system 138. In one illustrative example, interface 340 and interface 342 may be autonomously formed.

Interface 342 may be a physical interface between tower system 310 and utility system 138. In these illustrative examples, in addition to being physical interfaces, interface 340 and interface 342 may also be utility interfaces. For example, with respect to the utility of power, interface 340 and interface 342 may be considered electrical interfaces.

Utility system 138 is configured to distribute number of utilities 146 to tower system 310 when tower system 310 and utility system 138 are physically and electrically coupled through interface 342. Tower system 310 may then distribute number of utilities 146 to assembly fixture 324 formed by cradle system 308 when assembly fixture 324 and tower system 310 are physically and electrically coupled through interface 340. Number of utilities 146 may include at least one of power, air, hydraulic fluid, communications, water, or some other type of utility.

As depicted, utility system 138 may include utility fixture 150. Utility fixture 150 may be configured to receive number of utilities 146 from number of utility sources 148. Number of utility sources 148 may include, for example, without limitation, at least one of a power generator, a battery system, a water system, an electrical line, a communications system, a hydraulic fluid system, an air tank, or some other type of utility source. For example, utility fixture 150 may receive power from a power generator.

In one illustrative example, utility fixture 150 may be positioned relative to assembly area 304. Depending on the implementation, utility fixture 150 may be positioned inside assembly area 304 or outside of assembly area 304.

In some illustrative examples, utility fixture 150 may be associated with floor 300. Depending on the implementation, utility fixture 150 may be permanently associated with floor 300 or temporarily associated with floor 300. In other illustrative examples, utility fixture 150 may be associated with some other surface of manufacturing environment 100, such as a ceiling, or some other structure in manufacturing environment 100. In some cases, utility fixture 150 may be embedded within floor 300.

In one illustrative example, first tower 334 may be autonomously driven into selected tower position 338 with respect to floor 300 relative to utility fixture 150 such that interface 342 may be formed between first tower 334 and utility fixture 150. Once interface 342 has been formed, number of utilities 146 may flow from utility fixture 150 to first tower 334. Assembly fixture 324 may then autonomously form interface 340 with first tower 334 to form a network of utility cables between first tower 334 and assembly fixture 324. Once both interface 342 and interface 340 have been formed, number of utilities 146 received at utility fixture 150 may flow from utility fixture 150 to first tower 334 and to each of number of cradle fixtures 314 that forms assembly fixture 324. In this manner, first tower 334 may function as a conduit or "middleman" for distributing number of utilities 146 to assembly fixture 324.

When interface 340 has been formed between second tower 336 and assembly fixture 324 and interface 342 has been formed between second tower 336 and utility fixture 150, number of utilities 146 may be provided to second tower 336 and assembly fixture 324 in a similar manner as described above. Thus, utility fixture 150 may distribute number of utilities 146 to tower system 310 and assembly fixture 324 without tower system 310 and cradle assembly fixture 324 having to separately connect to number of utility sources 148 or any other utility sources.

Autonomous tooling system 312 may be used to assemble plurality of panels 120 and support structure 121 while fuselage assembly 114 is being supported and held by assembly fixture 324. Autonomous tooling system 312 may include plurality of mobile platforms 344. Each of plurality of mobile platforms 344 may be configured to perform one or more of operations 124 in assembly process 110 described in FIG. 1. In particular, plurality of mobile platforms 344 may be autonomously driven into selected positions relative to plurality of panels 120 within selected tolerances to autonomously perform operations 124 that join plurality of panels 120 together to build fuselage assembly 114. Plurality of mobile platforms 344 are described in greater detail in FIG. 4 below.

In this illustrative example, set of controllers 140 in control system 136 may generate commands 142 as described in FIG. 1 to control the operation of at least one of cradle system 308, tower system 310, utility system 138, autonomous tooling system 312, or plurality of autonomous vehicles 306. Set of controllers 140 in FIG. 1 may communicate with at least one of cradle system 308, tower system 310, utility system 138, autonomous tooling system 312, or plurality of autonomous vehicles 306 using any number of wireless communications links, wired communications links, optical communications links, other types of communications links, or combination thereof.

In this manner, plurality of mobile systems 134 of flexible manufacturing system 106 may be used to automate the process of building fuselage assembly 114. Plurality of mobile systems 134 may enable fuselage assembly 114 to be built substantially autonomously with respect to joining together plurality of panels 120 to reduce the overall time, effort, and human resources needed.

Flexible manufacturing system 106 may build fuselage assembly 114 up to the point needed to move fuselage assembly 114 to the next stage in manufacturing process 108 for building fuselage 102 or the next stage in the manufacturing process for building aircraft 104, depending on the implementation. In some cases, cradle system 308 in the form of assembly fixture 324 may continue carrying and supporting fuselage assembly 114 during one or more of these later stages in manufacturing process 108 for building fuselage 102 and aircraft 104.

Figure 4:
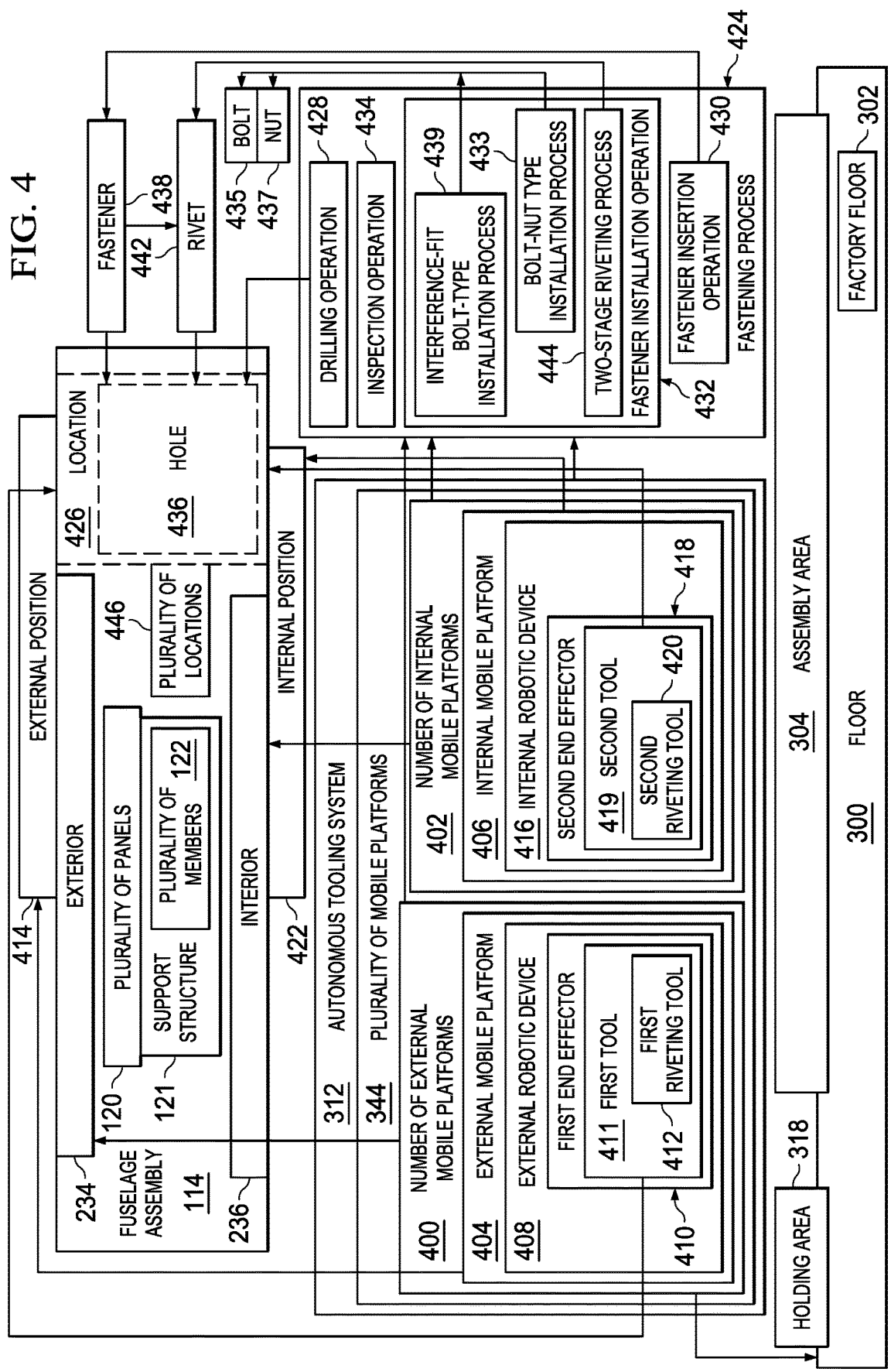
FIG. 4 is an illustration of a plurality of mobile platforms in the form of a block diagram in accordance with an illustrative embodiment.

With reference now to FIG. 4, an illustration of plurality of mobile platforms 344 from FIG. 3 is depicted in the form of a block diagram in accordance with an illustrative embodiment. As depicted, plurality of mobile platforms 344 may include number of external mobile platforms 400 and number of internal mobile platforms 402. In this manner, plurality of mobile platforms 344 may include at least one external mobile platform and at least one internal mobile platform.

In some illustrative examples, number of external mobile platforms 400 may be referred to as a number of drivable external mobile platforms. Similarly, in some cases, number of internal mobile platforms 402 may be referred to as a number of drivable internal mobile platforms. In other illustrative examples, number of external mobile platforms 400 and number of internal mobile platforms 402 may be referred to as a number of autonomously drivable external mobile platforms and a number of autonomously drivable internal mobile platforms, respectively.

External mobile platform 404 may be an example of one of number of external mobile platforms 400 and internal mobile platform 406 may be an example of one of number of internal mobile platforms 402. External mobile platform 404 and internal mobile platform 406 may be platforms that are autonomously drivable. Depending on the implementation, each of external mobile platform 404 and internal mobile platform 406 may be configured to autonomously drive across floor 300 on its own or with the assistance of one of plurality of autonomous vehicles 306 from FIG. 3.

As one illustrative example, without limitation, external mobile platform 404 may be autonomously driven across floor 300 using a corresponding one of plurality of autonomous vehicles 306. In some illustrative examples, external mobile platform 404 and this corresponding one of plurality of autonomous vehicles 306 may be integrated with each other. For example, the autonomous vehicle may be fixedly associated with external mobile platform 404. An entire load of external mobile platform 404 may be transferable to the autonomous vehicle such that driving the autonomous vehicle across floor 300 drives external mobile platform 404 across floor 300.

External mobile platform 404 may be driven from, for example, without limitation, holding area 318 to a position relative to exterior 234 of fuselage assembly 114 to perform one or more operations 124 in FIG. 1. As depicted, at least one external robotic device 408 may be associated with external mobile platform 404. In this illustrative example, external robotic device 408 may be considered part of external mobile platform 404. In other illustrative examples, external robotic device 408 may be considered a separate component that is physically attached to external mobile platform 404. External robotic device 408 may take the form of, for example, without limitation, a robotic arm.

External robotic device 408 may have first end effector 410. Any number of tools may be associated with first end effector 410. These tools may include, for example, without limitation, at least one of a drilling tool, a fastener insertion tool, a fastener installation tool, an inspection tool, or some other type of tool. In particular, any number of fastening tools may be associated with first end effector 410.

As depicted, first tool 411 may be associated with first end effector 410. In one illustrative example, first tool 411 may be any tool that is removably associated with first end effector 410. In other words, first tool 411 associated with first end effector 410 may be changed as various operations need to be performed. For example, without limitation, first tool 411 may take the form of one type of tool, such as a drilling tool, to perform one type of operation. This tool may then be exchanged with another type of tool, such as a fastener insertion tool, to become the new first tool 411 associated with first end effector 410 to perform a different type of operation.

In one illustrative example, first tool 411 may take the form of first riveting tool 412. First riveting tool 412 may be used to perform riveting operations. In some illustrative examples, a number of different tools may be exchanged with first riveting tool 412 and associated with first end effector 410. For example, without limitation, first riveting tool 412 may be exchangeable with a drilling tool, a fastener insertion tool, a fastener installation tool, an inspection tool, or some other type of tool.

External mobile platform 404 may be autonomously driven across floor 300 and positioned relative to assembly fixture 324 in FIG. 3 supporting fuselage assembly 114 to position first end effector 410 and first tool 411 associated with first end effector 410 relative to one of plurality of panels 120. For example, external mobile platform 404 may be autonomously driven across floor 300 to external position 414 relative to assembly fixture 324. In this manner, first tool 411 carried by external mobile platform 404 may be macro-positioned using external mobile platform 404.

Once in external position 414, first end effector 410 may be autonomously controlled using at least external robotic device 408 to position first tool 411 associated with first end effector 410 relative to a particular location on an exterior-facing side of one of plurality of panels 120. In this manner, first tool 411 may be micro-positioned relative to the particular location.

Internal mobile platform 406 may be located on second tower 336 in FIG. 3 when internal mobile platform 406 is not in use. When interface 342 described in FIG. 3 is formed between second tower 336 and assembly fixture 324, internal mobile platform 406 may be driven from second tower 336 into interior 236 of fuselage assembly 114 and used to perform one or more of operations 124. In one illustrative example, internal mobile platform 406 may have a movement system that allows internal mobile platform 406 to move from second tower 336 onto a floor inside fuselage assembly 114.

At least one internal robotic device 416 may be associated with internal mobile platform 406. In this illustrative example, internal robotic device 416 may be considered part of internal mobile platform 406. In other illustrative examples, internal robotic device 416 may be considered a separate component that is physically attached to internal mobile platform 406. Internal robotic device 416 may take the form of, for example, without limitation, a robotic arm.

Internal robotic device 416 may have second end effector 418. Any number of tools may be associated with second end effector 418. For example, without limitation, at least one of a drilling tool, a fastener insertion tool, a fastener installation tool, an inspection tool, or some other type of tool may be associated with second end effector 418. In particular, any number of fastening tools may be associated with second end effector 418.

As depicted, second tool 419 may be associated with second end effector 418. In one illustrative example, second tool 419 may be any tool that is removably associated with second end effector 418. In other words, second tool 419 associated with second end effector 418 may be changed as various operations need to be performed. For example, without limitation, second tool 419 may take the form of one type of tool, such as a drilling tool, to perform one type of operation. This tool may then be exchanged with another type of tool, such as a fastener insertion tool, to become the new second tool 419 associated with second end effector 418 to perform a different type of operation.

In one illustrative example, second tool 419 may take the form of second riveting tool 420. Second riveting tool 420 may be associated with second end effector 418. Second riveting tool 420 may be used to perform riveting operations. In some illustrative examples, a number of different tools may be exchanged with second riveting tool 420 and associated with second end effector 418. For example, without limitation, second riveting tool 420 may be exchangeable with a drilling tool, a fastener insertion tool, a fastener installation tool, an inspection tool, or some other type of tool.

Internal mobile platform 406 may be driven from second tower 336 into fuselage assembly 114 and positioned relative to interior 236 of fuselage assembly 114 to position second end effector 418 and second tool 419 associated with second end effector 418 relative to one of plurality of panels 120. In one illustrative example, internal mobile platform 406 may be autonomously driven onto one of number of floors 266 in FIG. 2 into internal position 422 within fuselage assembly 114 relative to fuselage assembly 114. In this manner, second tool 419 may be macro-positioned into internal position 422 using internal mobile platform 406.

Once in internal position 422, second end effector 418 may be autonomously controlled to position second tool 419 associated with second end effector 418 relative to a particular location on an interior-facing side of one of plurality of panels 120 or an interior-facing side of one of plurality of members 122 in FIG. 2 that make up support structure 121. In this manner, second tool 419 may be micro-positioned relative to the particular location.

In one illustrative example, external position 414 for external mobile platform 404 and internal position 422 for internal mobile platform 406 may be selected such that fastening process 424 may be performed at location 426 on fuselage assembly 114 using external mobile platform 404 and internal mobile platform 406. Fastening process 424 may include any number of operations. In one illustrative example, fastening process 424 may include at least one of drilling operation 428, fastener insertion operation 430, fastener installation operation 432, inspection operation 434, or some other type of operation.

As one specific example, drilling operation 428 may be performed autonomously using first tool 411 associated with first end effector 410 of external mobile platform 404 or second tool 419 associated with second end effector 418 of internal mobile platform 406. For example, without limitation, first tool 411 or second tool 419 may take the form of a drilling tool for use in performing drilling operation 428. Drilling operation 428 may be autonomously performed using first tool 411 or second tool 419 to form hole 436 at location 426. Hole 436 may pass through at least one of two panels in plurality of panels 120, two members of a plurality of members 122, or a panel and one of plurality of members 122.

Fastener insertion operation 430 may be performed autonomously using first tool 411 associated with first end effector 410 of external mobile platform 404 or second tool 419 associated with second end effector 418 of internal mobile platform 406. Fastener insertion operation 430 may result in fastener 438 being inserted into hole 436.

Fastener installation operation 432 may then be performed autonomously using at least one of first tool 411 associated with first end effector 410 of external mobile platform 404 or second tool 419 associated with second end effector 418 of internal mobile platform 406. In one illustrative example, fastener installation operation 432 may be performed autonomously using first tool 411 in the form of first riveting tool 412 and second tool 419 in the form of second riveting tool 420 such that fastener 438 becomes rivet 442 installed at location 426. Rivet 442 may be a fully installed rivet. Rivet 442 may be one of plurality of fasteners 264 described in FIG. 2.

In one illustrative example, fastener installation operation 432 may take the form of bolt-nut type installation process 433. First tool 411 associated with first end effector 410 may be used to, for example, without limitation, install bolt 435 through hole 436. Second tool 419 associated with second end effector 418 may then be used to install nut 437 over bolt 435. In some cases, installing nut 437 may include applying a torque sufficient to nut 437 such that a portion of nut 437 breaks off. In these cases, nut 437 may be referred to as a frangible collar.

In another illustrative example, fastener installation operation 432 may take the form of interference-fit bolt-type installation process 439. First tool 411 associated with first end effector 410 may be used to, for example, without limitation, install bolt 435 through hole 436 such that an interference fit is created between bolt 435 and hole 436. Second tool 419 associated with second end effector 418 may then be used to install nut 437 over bolt 435.

In yet another illustrative example, fastener installation operation 432 may take the form of two-stage riveting process 444. Two-stage riveting process 444 may be performed using, for example, without limitation, first riveting tool 412 associated with external mobile platform 404 and second riveting tool 420 associated with internal mobile platform 406.

For example, first riveting tool 412 and second riveting tool 420 may be positioned relative to each other by external mobile platform 404 and internal mobile platform 406, respectively. For example, external mobile platform 404 and external robotic device 408 may be used to position first riveting tool 412 relative to location 426 at exterior 234 of fuselage assembly 114. Internal mobile platform 406 and internal robotic device 416 may be used to position second riveting tool 420 relative to the same location 426 at interior 236 of fuselage assembly 114.

First riveting tool 412 and second riveting tool 420 may then be used to perform two-stage riveting process 444 to form rivet 442 at location 426. Rivet 442 may join at least two of plurality of panels 120 together, a panel in plurality of panels 120 to support structure 121 formed by plurality of members 122, or two panels in plurality of panels 120 to support structure 121.

In this example, two-stage riveting process 444 may be performed at each of plurality of locations 446 on fuselage assembly 114 to install plurality of fasteners 264 as described in FIG. 2. Two-stage riveting process 444 may ensure that plurality of fasteners 264 in FIG. 2 are installed at plurality of locations 446 with a desired quality and desired level of accuracy.

In this manner, internal mobile platform 406 may be autonomously driven and operated inside fuselage assembly 114 to position internal mobile platform 406 and second riveting tool 420 associated with internal mobile platform 406 relative to plurality of locations 446 on fuselage assembly 114 for performing assembly process 110 described in FIG. 1. Similarly, external mobile platform 404 may be autonomously driven and operated around fuselage assembly 114 to position external mobile platform 404 and first riveting tool 412 associated with external mobile platform 404 relative to plurality of locations 446 on fuselage assembly 114 for performing operations 124.

Figure 5:
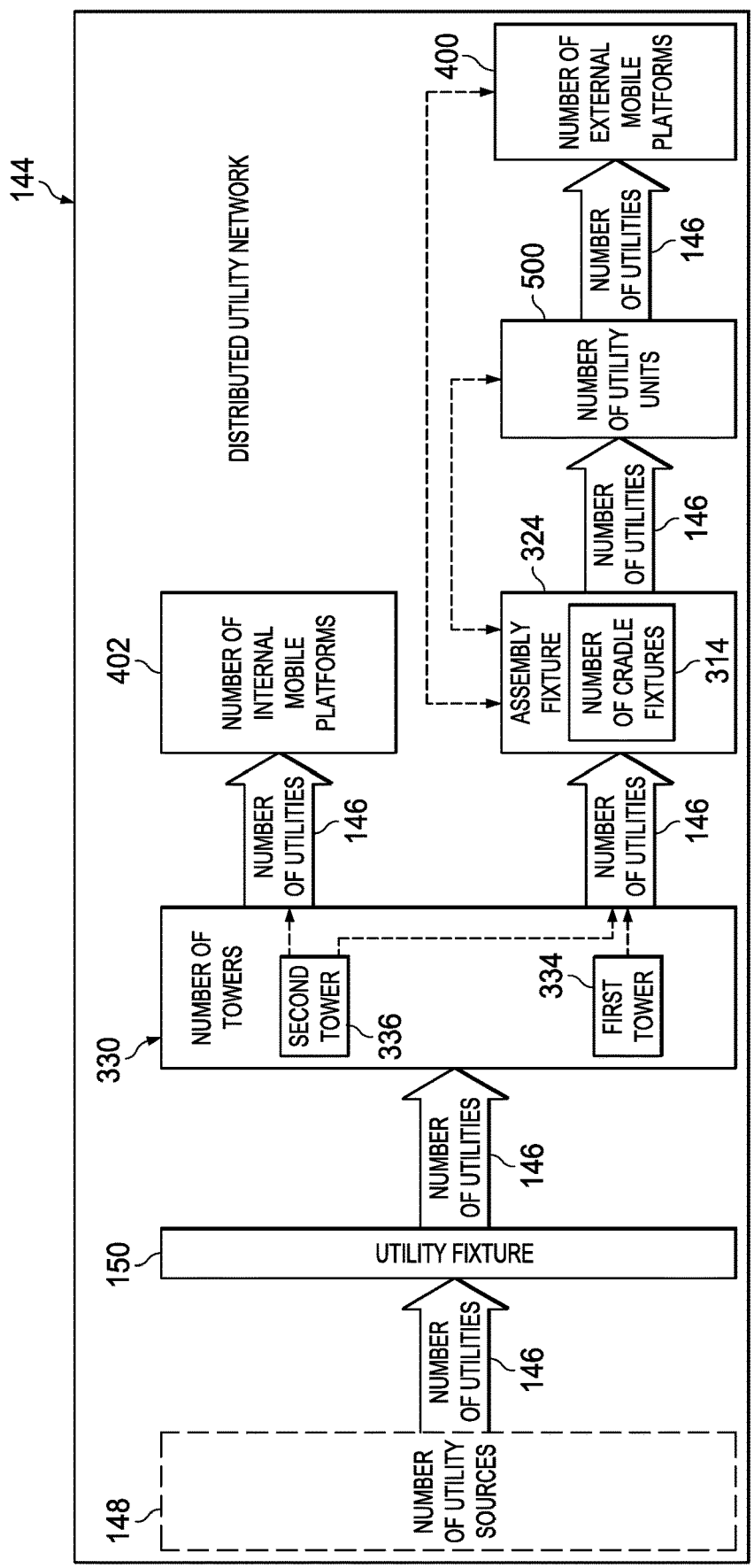
FIG. 5 is an illustration of a flow of a number of utilities across a distributed utility network in the form of a block diagram in accordance with an illustrative embodiment.

With reference now to FIG. 5, an illustration of a flow of number of utilities 146 across distributed utility network 144 from FIG. 1 is depicted in the form of a block diagram in accordance with an illustrative embodiment. As depicted, number of utilities 146 may be distributed across distributed utility network 144.

Distributed utility network 144 may include, for example, without limitation, number of utility sources 148, utility fixture 150, number of towers 330, assembly fixture 324, number of external mobile platforms 400, and number of utility units 500. In some cases, distributed utility network 144 may also include number of internal mobile platforms 402. In some illustrative examples, number of utility sources 148 may be considered separate from distributed utility network 144.

In this illustrative example, only one of number of towers 330 may be included in distributed utility network 144 at a time. When first tower 334 is used, distributed utility network 144 may be formed when utility fixture 150 is coupled to number of utility sources 148, first tower 334 is coupled to utility fixture 150, assembly fixture 324 is coupled to first tower 334, and number of external mobile platforms 400 is coupled to number of utility units 500.

Number of utility units 500 may be associated with number of cradle fixtures 314 of assembly fixture 324 or separated from number of cradle fixtures 314. For example, without limitation, a number of dual interfaces may be created between number of external mobile platforms 400, number of utility units 500, and number of cradle fixtures 314 using one or more dual-interface couplers.

When second tower 336 is used, distributed utility network 144 may be formed when utility fixture 150 is coupled to number of utility sources 148, second tower 336 is coupled to utility fixture 150, assembly fixture 324 is coupled to second tower 336, number of internal mobile platforms 402 is coupled to second tower 336, and number of external mobile platforms 400 is coupled to number of utility units 500, which may be associated with number of cradle fixtures 314 or separated from number of cradle fixtures 314. Number of internal mobile platforms 402 may receive number of utilities 146 through a number of cable management systems associated with second tower 336.

In this manner, number of utilities 146 may be distributed across distributed utility network 144 using a single utility fixture 150. This type of distributed utility network 144 may reduce the number of utility components, utility cables, and other types of devices needed to provide number of utilities 146 to the various components in distributed utility network 144. Further, with this type of distributed utility network 144, starting from at least utility fixture 150, number of utilities 146 may be provided completely above floor 300 of manufacturing environment in FIG. 1.

The illustrative embodiments recognize and take into account that it may be desirable to have a way of protecting a surface of a part, such as panel 216 in FIG. 2, from undesired positioned effects that may occur when a clamp is used on the part. In particular, the illustrative embodiments recognize and take into account that it may be desirable to attach a foot on the clamp in which the foot is comprised of a soft material that will not mar, scratch, bend, or otherwise affect the part in an undesired manner.

However, the illustrative embodiments recognize and take into account that a foot that is, for example, without limitation, adhesively bonded to a clamp may peel away, separate, or tear away from the clamp over time due to adhesive stress caused by bending forces. These bending forces may particularly occur with clamps that are attached to end effectors of robotic devices. Consequently, it may be desirable to attach the foot to the clamp in a manner that is capable of withstanding higher bending forces and holding even when the adhesive bond between the foot and the clamp has separated or become undone in some other manner.

Thus, the illustrative embodiments provide a method and apparatus for mechanically interlocking a foot with a clamp. In particular, the foot may be interlocked with the clamp through interlocking features in a manner that provides the interface between the foot and the clamp with a cohesive strength that may withstand higher levels of stress than is possible without the interlocking features.

Figure 6:
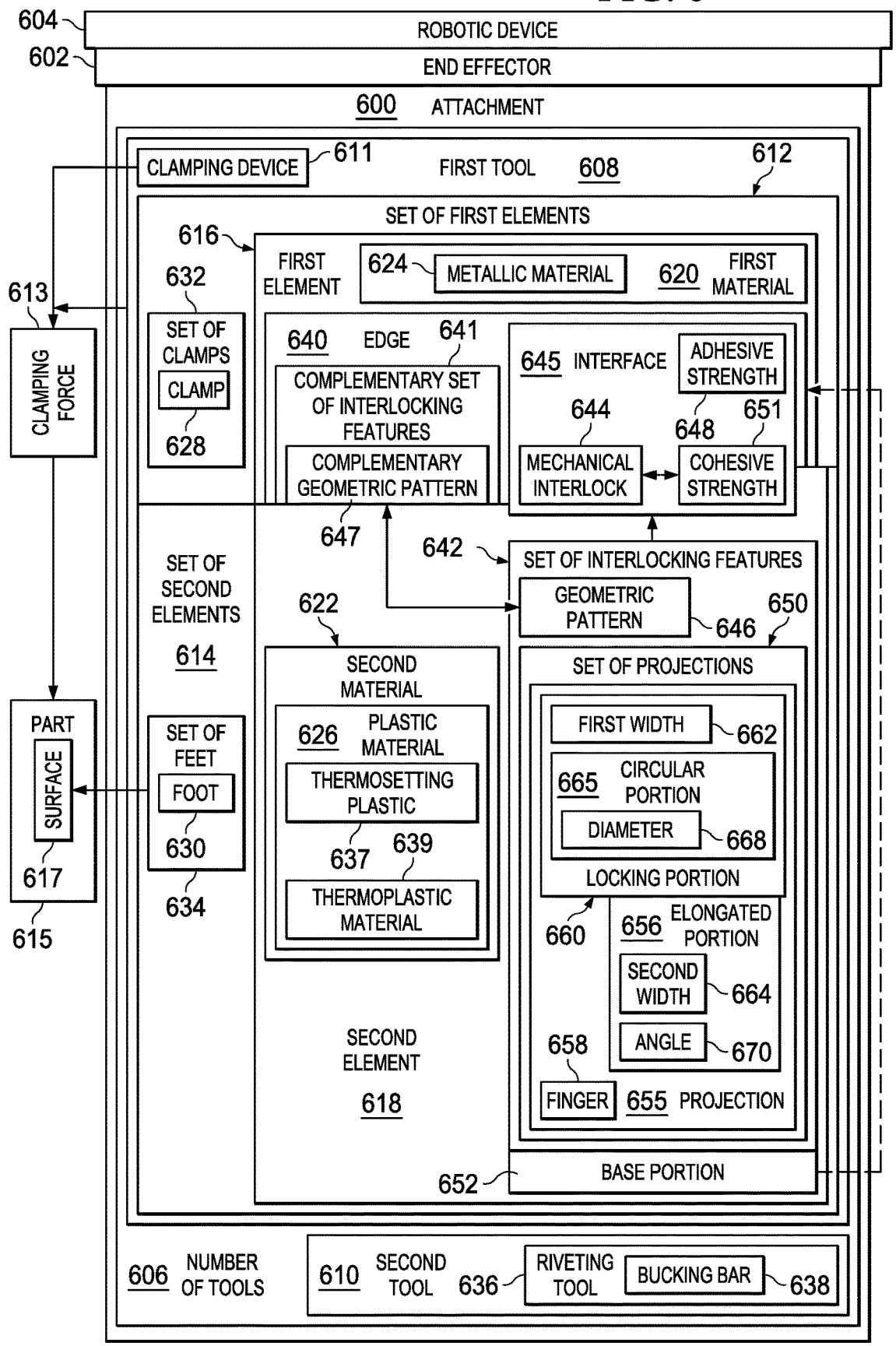
FIG. 6 is an illustration of an attachment for an end effector for a robotic device in the form of a block diagram in accordance with an illustrative embodiment.

With reference now to FIG. 6, an illustration of an attachment for an end effector for a robotic device is depicted in the form of a block diagram in accordance with an illustrative embodiment. In this illustrative example, attachment 600 may be attached to end effector 602, which may be associated with robotic device 604. Robotic device 604 may take a number of different forms. In one illustrative example, robotic device 604 may be internal robotic device 416 in FIG. 4 and end effector 602 may be second end effector 418 in FIG. 4.

As depicted, attachment 600 may include number of tools 606. Number of tools 606 may include first tool 608. In some cases, number of tools 606 may also include second tool 610. In one illustrative example, second tool 610 may be integrated with first tool 608. First tool 608 may take a number of different forms. In one illustrative example, first tool 608 may take the form of clamping device 611.

Clamping device 611 may be used to apply, for example, clamping force 613 against a part, such as part 615. Part 615 may take a number of different forms, depending on the implementation. In one illustrative example, part 615 may take the form of panel 216 in FIG. 2.

Second tool 610, which may be integrated with first tool 608 in some cases, may take the form of riveting tool 636. In one illustrative example, riveting tool 636 may take the form of bucking bar 638.

As depicted, first tool 608 may include set of first elements 612 and set of second elements 614. First element 616 may be an example of one of set of first elements 612 and second element 618 may be an example of one of set of second elements 614. First element 616 may be associated with end effector 602 directly or indirectly, depending on the implementation. Second element 618 may be associated with first element 616. When first tool 608 takes the form of clamping device 611, second element 618 may be used to contact surface 617 of part 615.

First element 616 may be comprised of first material 620. Second element 618 may be comprised of second material 622. Second material 622 may be different than first material 620 in this illustrative example. For example, without limitation, first material 620 may take the form of metallic material 624 and second material 622 may take the form of plastic material 626.

Plastic material 626 may be selected such that second element 618 does not have an undesired effect on surface 617 of part 615 when second element 618 is placed in contact with surface 617. Further, when first tool 608 takes the form of clamping device 611, plastic material 626 of second element 618 may reduce or prevent undesired effects on surface 617 of part 615 that may result from clamping force 613 being applied to part 615.

Depending on the implementation, plastic material 626 may comprise at least one of thermosetting plastic 637, thermoplastic material 639, or some other type of plastic material. In some cases, plastic material 626 may take the form of polyurethane.

In one illustrative example, first element 616 may take the form of clamp 628. In this example, second element 618 may take the form of foot 630 for clamp 628. Foot 630 may act as a shock absorber for clamp 628 when clamp 628 is placed on part 615. For example, foot 630 may act as a shock absorber when clamp 628 is used to apply clamping force 613 to part 615 during fastening operations. Further, foot 630 may function as a protective bumper that protects surface 617 of part 615.

Each of set of first elements 612 and set of second elements 614 may be implemented similarly. Consequently, set of first elements 612 may be set of clamps 632 and set of second elements 614 may be set of feet 634 in some illustrative examples.

In these illustrative examples, second element 618 may be associated with edge 640 of first element 616. Interface 645 may be formed between first element 616 and second element 618. In one example, second element 618 may be adhesively bonded with edge 640 of first element 616. In particular, at least a portion of second element 618 may be adhesively bonded with at least a portion of edge 640 of first element 616. In this manner, interface 645 may have adhesive strength 648.

Edge 640 may be shaped to have complementary set of interlocking features 641. Second element 618 may include set of interlocking features 642. Second element 618 may be mated with first element 616 to form interface 645. At least a portion of interface 645 is formed by the mating of set of interlocking features 642 with complementary set of interlocking features 641. When set of interlocking features 642 is mated with complementary set of interlocking features 641, second element 618 may be considered mechanically interlocked with first element 616.

In this manner, set of interlocking features 642 may provide mechanical interlock 644 at interface 645 between first element 616 and second element 618. Each of set of interlocking features 642 may have a geometric shape that enables a mechanical interlocking with first element 616 when engaged with first element 616.

In particular, set of interlocking features 642 may have geometric pattern 646. Geometric pattern 646 may be interfaced with complementary geometric pattern 647 of complementary set of interlocking features 641 along at least a portion of edge 640. When geometric pattern 646 and complementary geometric pattern 647 are mated, mechanical interlock 644 may be formed. Mechanical interlock 644 may have cohesive strength 651. Cohesive strength 651 may hold second element 618 together with first element 616.

In one illustrative example, complementary geometric pattern 647 may be machined into first element 616 to form complementary set of interlocking features 641. Second element 618 may then be casted to first element 616. For example, without limitation, plastic material 626 may be casted into a mold (not shown) positioned relative to first element 616 such that second element 618 may be formed. In other words, plastic material 626 may be casted in liquid form and then hardened to form second element 618 that is adhesively bonded to first element 616. This type of casting may create second element 618 having set of interlocking features 642 with geometric pattern 646.

Cohesive strength 651 provided by set of interlocking features 642 may be sufficiently high to resist bending forces within selected tolerances. Further, cohesive strength 651 may be capable of resisting bending forces within selected tolerances even when adhesive strength 648 has been reduced to substantially zero. In other words, cohesive strength 651 may keep second element 618 mechanically interlocked with first element 616 even when the adhesive bond between first element 616 and second element 618 separates.

In one illustrative example, set of interlocking features 642 may take the form of set of projections 650. Second element 618 may include set of projections 650 and base portion 652. Set of projections 650 may extend from base portion 652. In this illustrative example, base portion 652 may be adhesively bonded to edge 640 of first element 616.

Projection 655 may be an example of one of set of projections 650. Projection 655 may have elongated portion 656. When projection 655 is comprised entirely of elongated portion 656, projection 655 may be referred to as finger 658. In other illustrative examples, projection 655 may be referred to as a tab. In one illustrative example, elongated portion 656 may have angle 670 relative to base portion 652. Angle 670 may be, for example, without limitation, between about 5 degrees and about 85 degrees relative to base portion 652.

In some illustrative examples, projection 655 may have locking portion 660 that extends past elongated portion 656. In other words, elongated portion 656 may be located between locking portion 660 and base portion 652. Locking portion 660 may have first width 662 that is greater than second width 664 of elongated portion 656. By having first width 662 that is greater than second width 664 of elongated portion 656, locking portion 660 may geometrically and mechanically lock projection 655 in place relative to first element 616. In this manner, locking portion 660 may increase cohesive strength 651 of mechanical interlock 644.

As one illustrative example, locking portion 660 may take the form of circular portion 665. Circular portion 665 may have diameter 668 that is greater than second width 664 of elongated portion 656. In other illustrative examples, circular portion 665 may extend directly from base portion 652 without elongated portion 656 located between circular portion 665 and base portion 652.

Of course, in other illustrative examples, locking portion 660 or projection 655 in general may have some other type of shape. In some illustrative examples, a cross-sectional area of locking portion 660 of second element 618 taken along an axis substantially parallel to edge 640 of first element 616 may have a width that changes along a length of the cross-sectional area. As one illustrative example, a cross-sectional area of a through-thickness of locking portion 660 may appear to have at least one countersink portion.

The illustrations in FIGS. 1-6 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, more than one flexible manufacturing system may be present within manufacturing environment 100. These multiple flexible manufacturing systems may be used to build multiple fuselage assemblies within manufacturing environment 100. In other illustrative examples, flexible manufacturing system 106 may include multiple cradle systems, multiple tower systems, multiple utility systems, multiple autonomous tooling systems, and multiple pluralities of autonomous vehicles such that multiple fuselage assemblies may be built within manufacturing environment 100.

In some illustrative examples, utility system 138 may include multiple utility fixtures that are considered separate from flexible manufacturing system 106. Each of these multiple utility fixtures may be configured for use with flexible manufacturing system 106 and any number of other flexible manufacturing systems.

Additionally, the different couplings of mobile systems in plurality of mobile systems 134 may be performed autonomously in these illustrative examples. However, a coupling of one of plurality of mobile systems 134 to another one of plurality of mobile systems 134 may be performed manually in other illustrative examples.

Further, in other illustrative examples, one or more of plurality of mobile systems 134 may be drivable by, for example, without limitation, a human operator. For example, without limitation, in some cases, first tower 334 may be drivable with human guidance.

Figure 7:
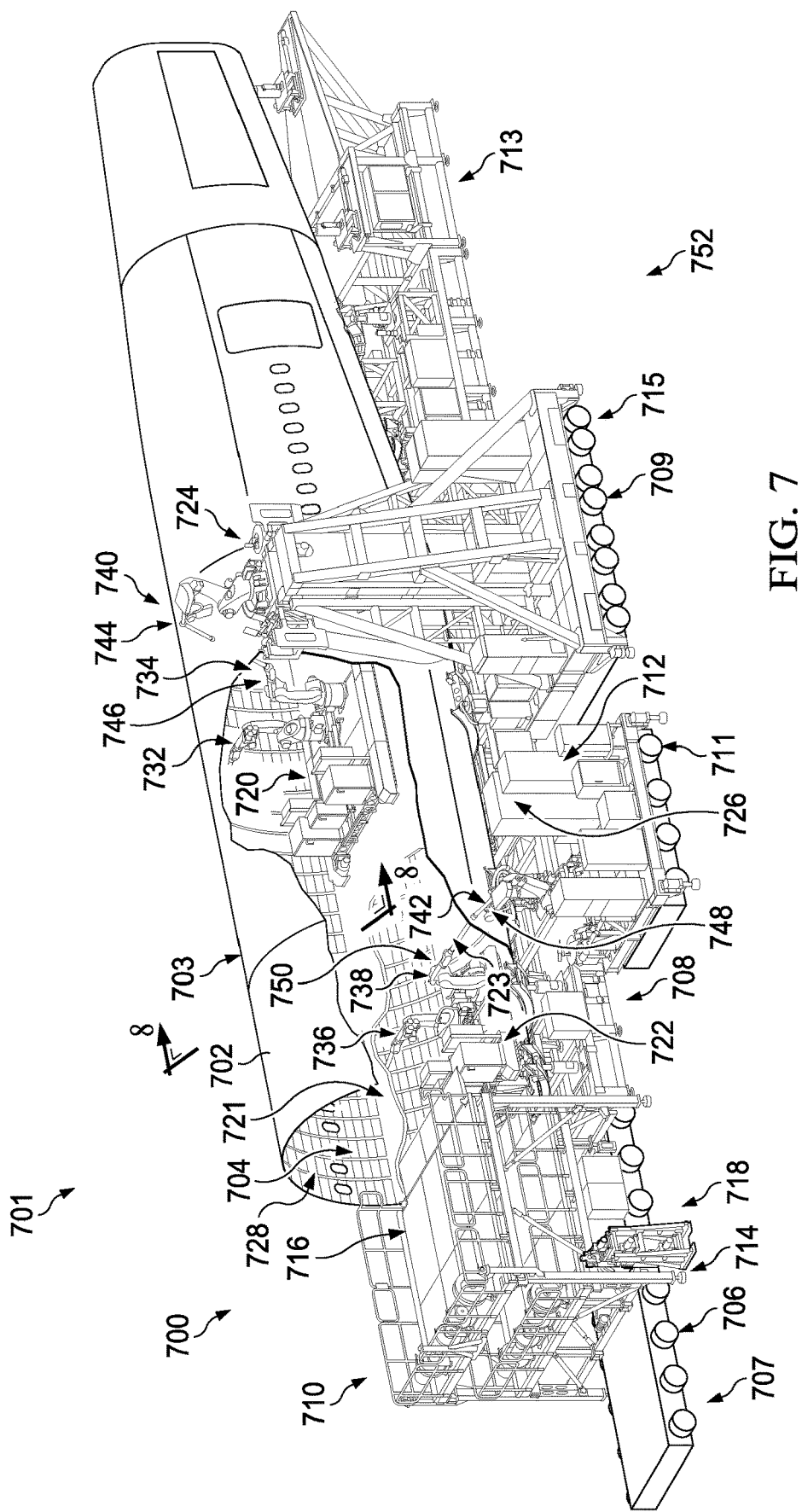
FIG. 7 is an illustration of an isometric cutaway view of a plurality of mobile platforms performing fastening processes within an interior of a fuselage assembly in a manufacturing environment in accordance with an illustrative embodiment.

With reference now to FIG. 7, an illustration of an isometric cutaway view of a plurality of mobile platforms performing fastening processes within an interior of a fuselage assembly in a manufacturing environment is depicted in accordance with an illustrative embodiment. In this illustrative example, manufacturing environment 701 may be an example of one implementation for manufacturing environment 100 in FIG. 1.

As depicted, flexible manufacturing system 700 may be present within manufacturing environment 701. Flexible manufacturing system 700 may be used to build fuselage assembly 702. Flexible manufacturing system 700 may be an example of one implementation for flexible manufacturing system 106 in FIG. 1. Fuselage assembly 702 may be an example of one implementation for fuselage assembly 114 in FIG. 1.

In this illustrative example, fuselage assembly 702 may be comprised of plurality of panels 703 and plurality of members 704. Plurality of panels 703 and plurality of members 704 may be examples of implementations for plurality of panels 120 and plurality of members 122 in FIGS. 1 and 2. Flexible manufacturing system 700 may be used to join plurality of panels 703 together, which may include joining members of plurality of members 704 to each other, to panels of plurality of panels 703, or both.

As depicted, flexible manufacturing system 700 may include plurality of autonomous vehicles 706, cradle system 708, tower system 710, autonomous tooling system 712, and utility system 714. Plurality of autonomous vehicles 706, cradle system 708, tower system 710, autonomous tooling system 712, and utility system 714 may be examples of implementations for plurality of autonomous vehicles 306 in FIG. 3, cradle system 308 in FIG. 3, tower system 310 in FIG. 3, autonomous tooling system 312 in FIG. 3, and utility system 138 in FIG. 1, respectively.

As depicted, plurality of autonomous vehicles 706 may include autonomous vehicle 707, autonomous vehicle 709, and autonomous vehicle 711, as well as other autonomous vehicles (not shown). Autonomous vehicles 707, 709, and 711 may have omnidirectional wheels. Plurality of autonomous vehicles 706 have been used to move cradle system 708, tower system 710, and autonomous tooling system 712 into selected positions relative to each other.

Cradle system 708 may form assembly fixture 713 for supporting fuselage assembly 702 during the building of fuselage assembly 702. Assembly fixture 713 may be an example of one implementation for assembly fixture 324 in FIG. 3.

Tower system 710 may include robotic tower 716, which may be an example of one implementation for second tower 336 in FIG. 3. Autonomous vehicle 707 is shown positioned under robotic tower 716. Autonomous vehicle 707 may be used to move robotic tower 716 into a selected tower position relative to utility fixture 718 of utility system 714.

In this illustrative example, robotic tower 716 may be coupled to utility fixture 718 of utility system 714. Cradle system 708 may be coupled to robotic tower 716. Further, autonomous tooling system 712 may be coupled to cradle system 708 and robotic tower 716. In this manner, a number of utilities may be distributed downstream from utility fixture 718 to robotic tower 716, to cradle system 708, and to autonomous tooling system 712.

In this illustrative example, autonomous tooling system 712 may include plurality of mobile platforms 715. Plurality of mobile platforms 715 may be used to perform fastening processes to join plurality of panels 703 together. Plurality of panels 703 may be joined to form at least one of lap joints, butt joints, or other types of joints. In this manner, plurality of panels 703 may be joined such that at least one of circumferential attachment, longitudinal attachment, or some other type of attachment is created between the various panels of plurality of panels 703.

As depicted, plurality of mobile platforms 715 may include internal mobile platform 720, internal mobile platform 722, external mobile platform 724, and external mobile platform 726. Internal mobile platform 720 and internal mobile platform 722 may be performing operations within interior 728 of fuselage assembly 702, while external mobile platform 724 and external mobile platform 726 are performing assembly operations along the exterior of fuselage assembly 702.

Internal mobile platform 720 and internal mobile platform 722 may be an example of one implementation for at least a portion of number of internal mobile platforms 402 in FIG. 4. External mobile platform 724 and external mobile platform 726 may be an example of one implementation for at least a portion of number of external mobile platforms 400 in FIG. 4.

Internal mobile platform 720 may be configured to move along passenger floor 721 while internal mobile platform 722 may be configured to move along cargo floor 723. Internal mobile platform 720 and internal mobile platform 722 may be coupled to robotic tower 716 to receive the number of utilities through robotic tower 716. External mobile platform 724 and external mobile platform 726 may be coupled to cradle system 708 to receive the number of utilities from cradle system 708.

As depicted, internal robotic device 732 and internal robotic device 734 may be associated with internal mobile platform 720 and internal robotic device 736 and internal robotic device 738 may be associated with internal mobile platform 722. Each of internal robotic device 732, internal robotic device 734, internal robotic device 736, and internal robotic device 738 may be an example of one implementation for internal robotic device 416 in FIG. 4.

External robotic device 740 may be associated with external mobile platform 724. External robotic device 742 may be associated with external mobile platform 726. Each of external robotic device 740 and external robotic device 742 may be an example of one implementation for external robotic device 408 in FIG. 4.

As depicted, external robotic device 740 and internal robotic device 734 may work collaboratively to install fasteners autonomously in fuselage assembly 702. Similarly, external robotic device 742 and internal robotic device 738 may work collaboratively to install fasteners autonomously in fuselage assembly 702.

In this illustrative example, end effector 744 of external robotic device 740 and end effector 746 of internal robotic device 734 may be positioned relative to a same location on fuselage assembly 702 to perform a fastening process, such as fastening process 424 in FIG. 4, at this location. In this illustrative example, the fastening process may include a two-stage riveting process, such as two-stage riveting process 444 described in FIGS. 4 and 6. Similarly, end effector 748 of external robotic device 742 and end effector 750 of internal robotic device 738 may be positioned relative to a same location on fuselage assembly 702 to perform a fastening process, which may include a two-stage riveting process, such as two-stage riveting process 444 in FIG. 4, at the location.

Although not shown, a first clamping device and a second clamping device may be attached to end effector 748 and end effector 750, respectively. These clamping devices (not shown) may be implemented in a manner similar to clamping device 611 in FIG. 6. These clamping devices may be used to perform at least a portion of a fastening process, such as fastening process 424 in FIG. 4.

In this illustrative example, autonomous vehicle 709 may be fixedly associated with external mobile platform 724. Autonomous vehicle 709 may be used to drive external mobile platform 724 autonomously. For example, autonomous vehicle 709 may be used to autonomously drive external mobile platform 724 across floor 752 of manufacturing environment 701 relative to assembly fixture 713.

Similarly, autonomous vehicle 711 may be fixedly associated with external mobile platform 726. Autonomous vehicle 711 may be used to drive external mobile platform 726 autonomously. For example, autonomous vehicle 711 may be used to autonomously drive external mobile platform 726 across floor 752 of manufacturing environment 701 relative to assembly fixture 713.

By being fixedly associated with external mobile platform 724 and external mobile platform 726, autonomous vehicle 709 and autonomous vehicle 711 may be considered integral to external mobile platform 724 and external mobile platform 726, respectively. However, these autonomous vehicles may be independent of the external mobile platforms in other illustrative examples.

In these illustrative examples, a metrology system (not shown) may be used to help position internal mobile platform 720, internal mobile platform 722, external mobile platform 724, and external mobile platform 726 relative to fuselage assembly 702. In particular, the metrology system (not shown) may be used to precisely position internal robotic device 732 of internal mobile platform 720, internal robotic device 734 of internal mobile platform 720, internal robotic device 736 of internal mobile platform 722, internal robotic device 738 of internal mobile platform 722, external robotic device 740 of external mobile platform 724, and external robotic device 742 of external mobile platform 726. In particular, these robotic devices may be precisely positioned relative to each other and to fuselage assembly 702.

Figure 8:
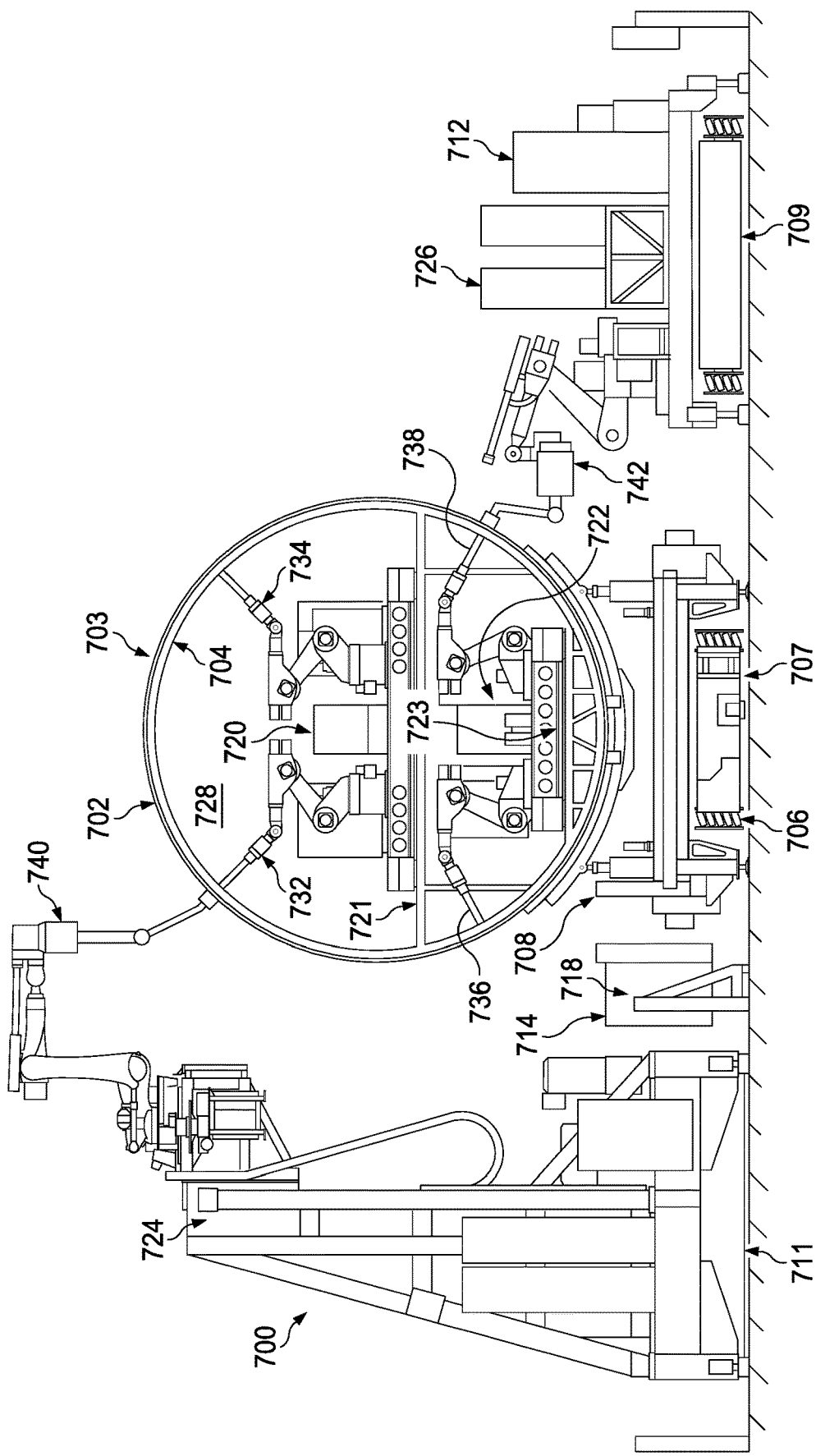
FIG. 8 is an illustration of a cross-sectional view of a flexible manufacturing system and a fuselage assembly in accordance with an illustrative embodiment.

With reference now to FIG. 8, an illustration of a cross-sectional view of flexible manufacturing system 700 and fuselage assembly 702 from FIG. 7 is depicted in accordance with an illustrative embodiment. In this illustrative example, a cross-sectional view of flexible manufacturing system 700 and fuselage assembly 702 from FIG. 7 is depicted taken in the direction of lines 8-8 in FIG. 7. As depicted, internal mobile platform 720 may move along passenger floor 721 within interior 728 of fuselage assembly 702, while internal mobile platform 722 may move along cargo floor 723 of fuselage assembly 702.

A metrology system (not shown) may be used to precisely position the various robotic devices associated with autonomous tooling system 712 relative to each other and to fuselage assembly 702 such that fasteners may be installed in fuselage assembly 702. In one illustrative example, rivets may be installed using a two-stage riveting process, such as two-stage riveting process 444 in FIG. 4. For example, without limitation, internal robotic device 732 associated with internal mobile platform 720 and external robotic device 740 associated with external mobile platform 724 may be positioned relative to a same location on fuselage assembly 702 to perform the two-stage riveting process.

Figure 9:
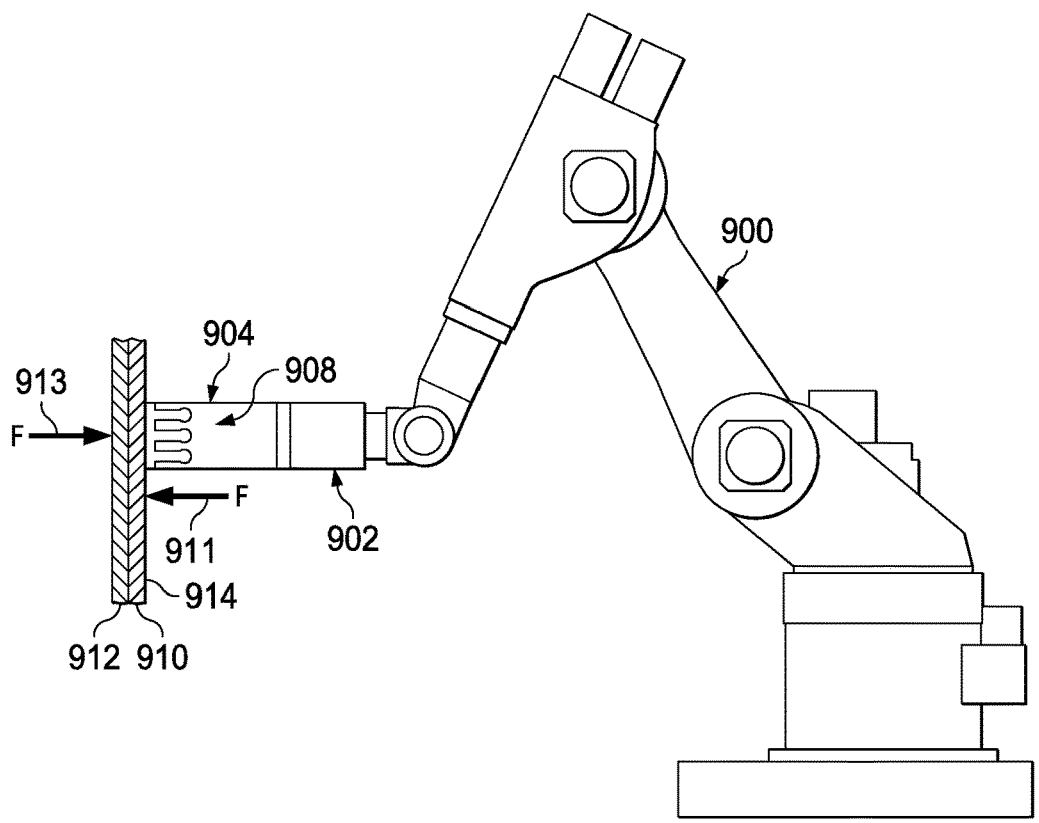
FIG. 9 is an illustration of a side view of a robotic device in accordance with an illustrative embodiment.

With reference now to FIG. 9, an illustration of a side view of a robotic device is depicted in accordance with an illustrative embodiment. Robotic device 900 may be an example of one implementation for robotic device 604 in FIG. 6. Robotic device 900 may have end effector 902, which may be an example of one implementation for end effector 602 in FIG. 6.

As depicted, attachment 904 is associated with end effector 902. Attachment 904 may be an example of one implementation for attachment 600 in FIG. 6. Further, attachment 904 may be an example of an attachment that may be used with other types of end effectors, including, but not limited to, end effector 746 in FIG. 7. In this illustrative example, attachment 904 may include clamping device 908, which may be an example of one implementation for clamping device 611 in FIG. 6.

In this illustrative example, clamping device 908 may press against first part 910. First part 910 is positioned adjacent to second part 912. Clamping device 908 may apply first force 911 to first part 910, while another clamping device (not shown) may apply second force 913 to second part 912. First force 911 and second force 913 may hold first part 910 and second part 912 together in place relative to each other.

Figure 10:
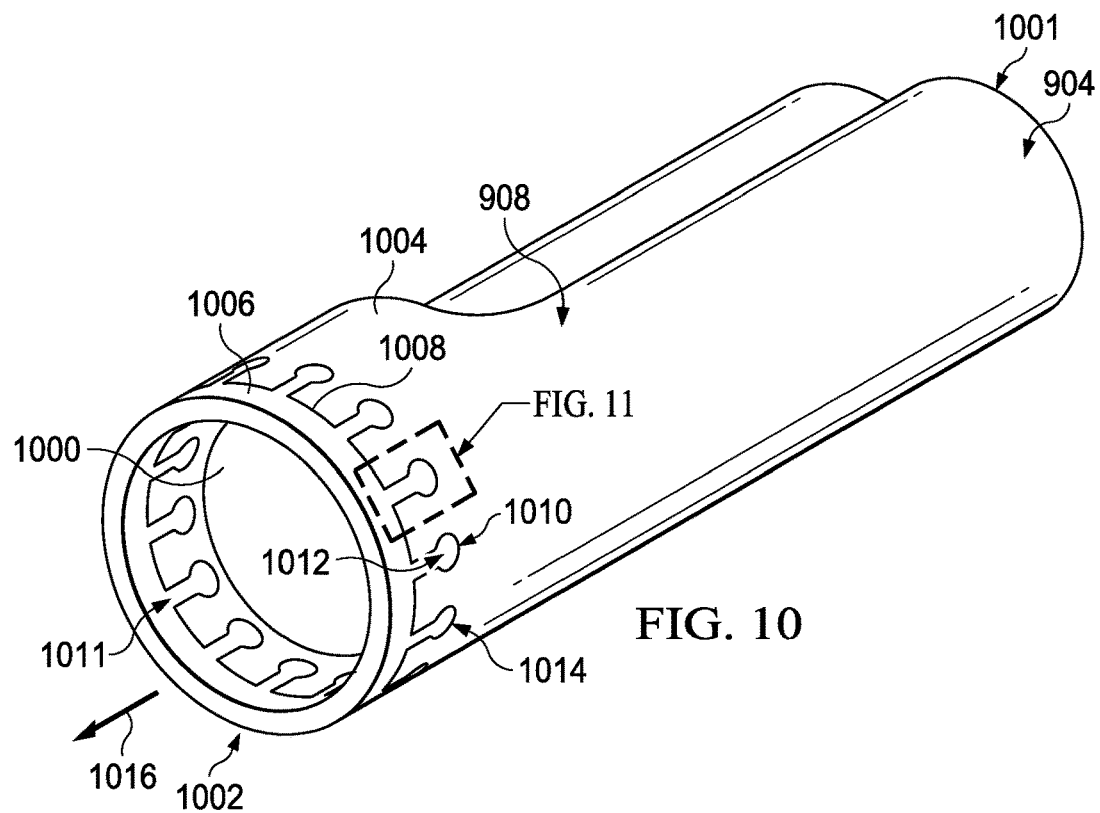
FIG. 10 is an illustration of an isometric view of a clamping device in accordance with an illustrative embodiment.

With reference now to FIG. 10, an illustration of an isometric view of clamping device 908 from FIG. 9 is depicted in accordance with an illustrative embodiment. As depicted in this example, attachment 904 may include clamping device 908 and bucking bar 1000. Clamping device 908 and bucking bar 1000 may be an example of one implementation for number of tools 606 in FIG. 6. In particular, clamping device 908 and bucking bar 1000 may be examples of implementations for first tool 608 and second tool 610, respectively, in FIG. 6. Further, bucking bar 1000 may be an example of one implementation for bucking bar 638 in FIG. 6.

In this illustrative example, clamping device 908 may have end 1001 and end 1002. Clamping device 908 may include clamp 1004 and foot 1006. Clamp 1004 may be an example of one implementation for first element 616 in FIG. 6 and, in particular, clamp 628 in FIG. 6. Foot 1006 may be an example of one implementation for second element 618 in FIG. 6 and, in particular, foot 630 in FIG. 6.

Clamp 1004 may be comprised of a metallic material. For example, without limitation, clamp 1004 may be comprised of steel. Foot 1006 may be comprised of a material that is soft and non-marring, such as plastic material 626 in FIG. 6. For example, without limitation, foot 1006 may be comprised of polyurethane. Of course, in other illustrative examples, clamp 1004 and foot 1006 may be comprised of other types of materials. In some illustrative examples, foot 1006 may be comprised of an elastomeric material.

Foot 1006 may be attached to clamp 1004 at edge 1008 of clamp 1004. As depicted, foot 1006 may have base portion 1011 and set of interlocking features 1010 that extend from base portion 1011. Set of interlocking features 1010 and base portion 1011 may be examples of implementations for set of interlocking features 642 and base portion 652, respectively, in FIG. 6.

Set of interlocking features 1010 may have geometric pattern 1012. Edge 1008 may have complementary geometric pattern 1014. Geometric pattern 1012 of set of interlocking features 1010 may be interlocked with complementary geometric pattern 1014 of edge 1008. Geometric pattern 1012 and complementary geometric pattern 1014 may be examples of implementations for geometric pattern 646 and complementary geometric pattern 647, respectively, in FIG. 6.

Set of interlocking features 1010 may mechanically interlock foot 1006 with clamp 1004 such that separation of foot 1006 from clamp 1004 in the direction of, for example, without limitation, arrow 1016 may be difficult. In other words, set of interlocking features 1010 may provide cohesive strength that resists separation of foot 1006 from clamp 1004.

Figure 11:
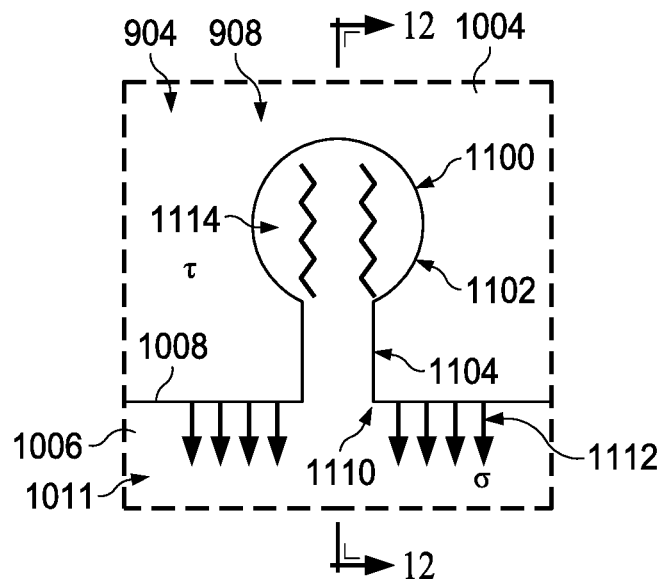
FIG. 11 is an illustration of an enlarged front view of an interlocking feature in accordance with an illustrative embodiment.

With reference now to FIG. 11, an illustration of an enlarged front view of an interlocking feature is depicted in accordance with an illustrative embodiment. In this illustrative example, an enlarged front view of interlocking feature 1100 of set of interlocking features 1010 from FIG. 10 is depicted. Interlocking feature 1100 may include circular portion 1102 and elongated portion 1104. Elongated portion 1104 extends from base portion 1011 of foot 1006. Circular portion 1102 and elongated portion 1104 may be examples of implementations for circular portion 665 and elongated portion 656, respectively, in FIG. 6.

Foot 1006 may be bonded to edge 1008 of clamp 1004. In particular, foot 1006 may be adhesively bonded to at least a portion of edge 1008 of clamp 1004. For example, without limitation, base portion 1011 of foot 1006 may be adhesively bonded to edge 1008 of clamp 1004. Further, elongated portion 1104 and circular portion 1102 may also be adhesively bonded to edge 1008 of clamp 1004. In other illustrative examples, only base portion 1011 of foot 1006 may be adhesively bonded to edge 1008 of clamp 1004.

Foot 1006 forms interface 1110 with clamp 1004. The adhesive bond that forms interface 1110 between foot 1006 and clamp 1004 may have an adhesive strength capable of withstanding a certain amount of bending forces. A portion of interface 1110 is formed by base portion 1011 of foot 1006. Another portion of interface 1110 is formed by elongated portion 1104 of interlocking feature 1100. Yet another portion of interface 1110 is formed by circular portion 1102 of interlocking feature 1100. Circular portion 1102 of interlocking feature 1100 may mechanically interlock this corresponding portion of foot 1006 with clamp 1004. In particular, circular portion 1102 of interlocking feature 1100 may create a portion of interface 1110 capable of withstanding a certain amount of cohesive stress.

As depicted, bending forces may act on clamping device 908 when clamping device 908 is used in performing at least a portion of a fastening process, such as fastening process 424 in FIG. 4. These bending forces may result in adhesive stress 1112, σ, and cohesive stress 1114, τ. Interlocking feature 1100 may increase the cohesive strength of interface 1110 between foot 1006 and clamp 1004.

In this example, the cohesive strength of interface 1110 may be greater than the adhesive strength of interface 1110. In this manner, interlocking feature 1100 may allow interface 1110 to resist greater bending forces than would be possible without interlocking feature 1100. Consequently, even when adhesive stress 1112 caused by bending forces surpasses the adhesive strength of interface 1110, the cohesive strength of interface 1110 may resist these bending forces within tolerances.

Figure 12:
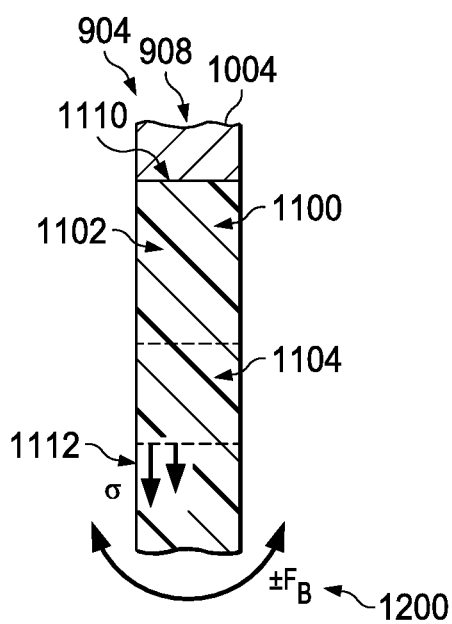
FIG. 12 is an illustration of a cross-sectional view of an interlocking feature of a foot in accordance with an illustrative embodiment.

With reference now to FIG. 12, an illustration of a cross-sectional view of interlocking feature 1100 of foot 1006 from FIG. 11 is depicted in accordance with an illustrative embodiment. In this illustrative example, a cross-sectional view of interlocking feature 1100 of foot 1006 may be seen taken in the direction of lines 12-12 in FIG. 11.

As depicted, bending force 1200 may cause adhesive stress 1112. The maximum bending force that may be withstood may be the sum of the adhesive strength of interface 1110 and the cohesive strength of interface 1110. In other words, the maximum bending force that may be withstood may be a combination of the maximum adhesive stress that may be withstood and the maximum cohesive force that may be withstood.

When adhesive stress 1112 overcomes the adhesive strength of interface 1110 such that the adhesive bonding between foot 1006 and clamp 1004 shown in FIGS. 10 and 11 separates, the cohesive strength of interface 1110 may hold foot 1006 in place relative to clamp 1004. In this manner, in the absence of adhesive strength, the maximum bending force that may be withstood may be equal to the maximum cohesive stress 1114 from FIG. 11 that may be withstood.

Figure 13:
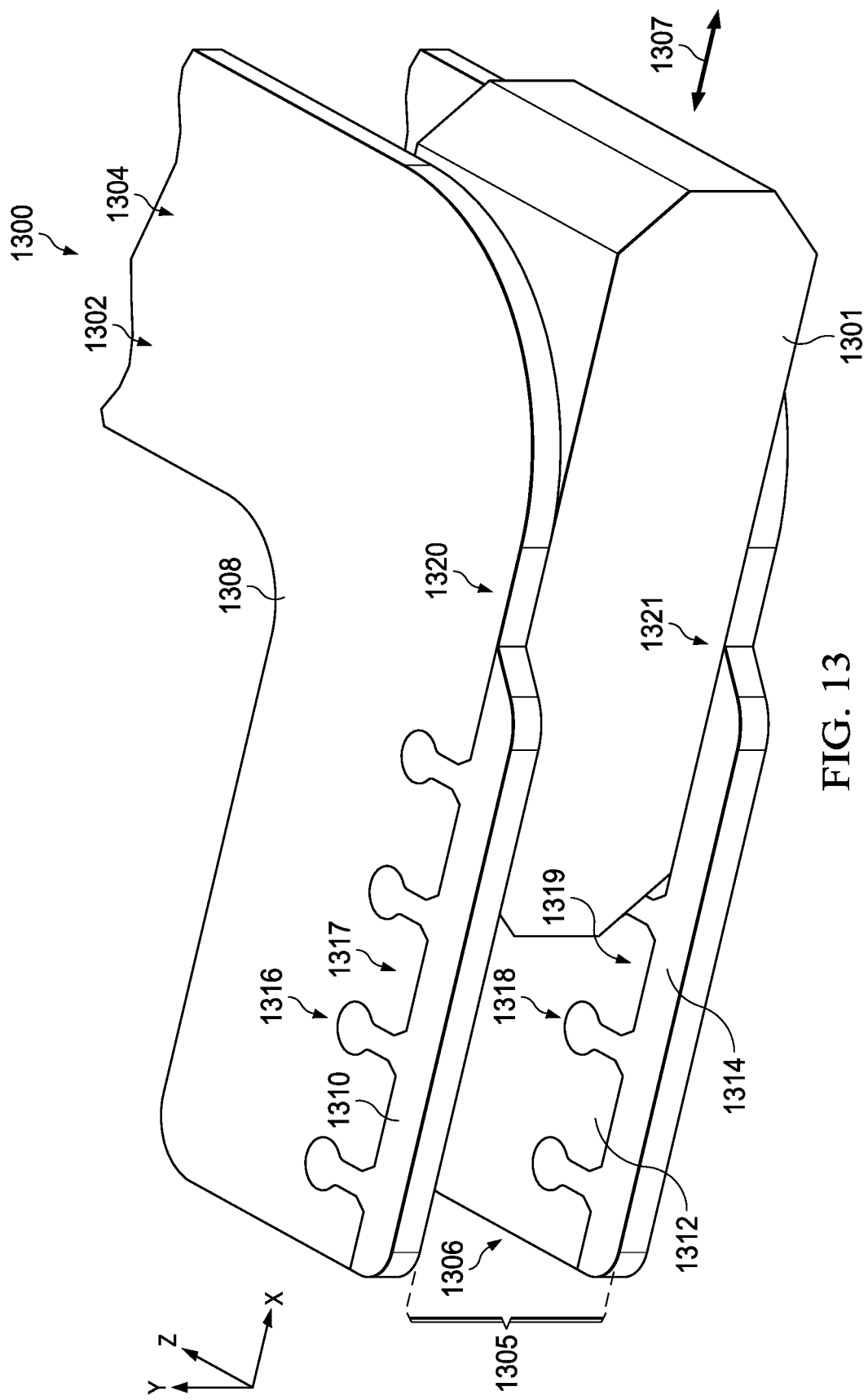
FIG. 13 is an illustration of an isometric view of another attachment in accordance with an illustrative embodiment.

With reference now to FIG. 13, an illustration of an isometric view of another attachment is depicted in accordance with an illustrative embodiment. In this illustrative example, attachment 1300 may be another example of one implementation for attachment 600 in FIG. 6. Attachment 1300 may be used with an end effector for a robotic device, such as end effector 902 for robotic device 900 shown in FIG. 9.

As depicted, attachment 1300 may include set of clamping devices 1302 and bucking bar 1301. Set of clamping devices 1302 may include clamping device 1304 and clamping device 1306. As depicted, clamping device 1304 and clamping device 1306 may be offset from each other by distance 1305 such that bucking bar 1301 may be positioned between these clamping devices. Bucking bar 1301 may be movable in a direction along axis 1307 relative to set of clamping devices 1302.

In this illustrative example, clamping device 1304 may include clamp 1308 and foot 1310. Similarly, clamping device 1306 may include clamp 1312 and foot 1314. Foot 1310 may have set of interlocking features 1316 that form geometric pattern 1317. Foot 1314 may have set of interlocking features 1318 that form geometric pattern 1319. As depicted, foot 1310 may be attached to edge 1320 of clamp 1308 and foot 1314 may be attached to edge 1321 of clamp 1312.

Set of interlocking features 1316 may mechanically interlock foot 1310 with clamp 1308. Similarly, set of interlocking features 1318 may mechanically interlock foot 1314 with clamp 1312. This type of mechanical interlocking may increase the forces stabilizing foot 1310 on clamp 1308 and foot 1314 on clamp 1312. In particular, this type of mechanical interlocking may provide cohesive strength that resists separation of foot 1310 from clamp 1308 and foot 1314 from clamp 1312.

Figure 14:
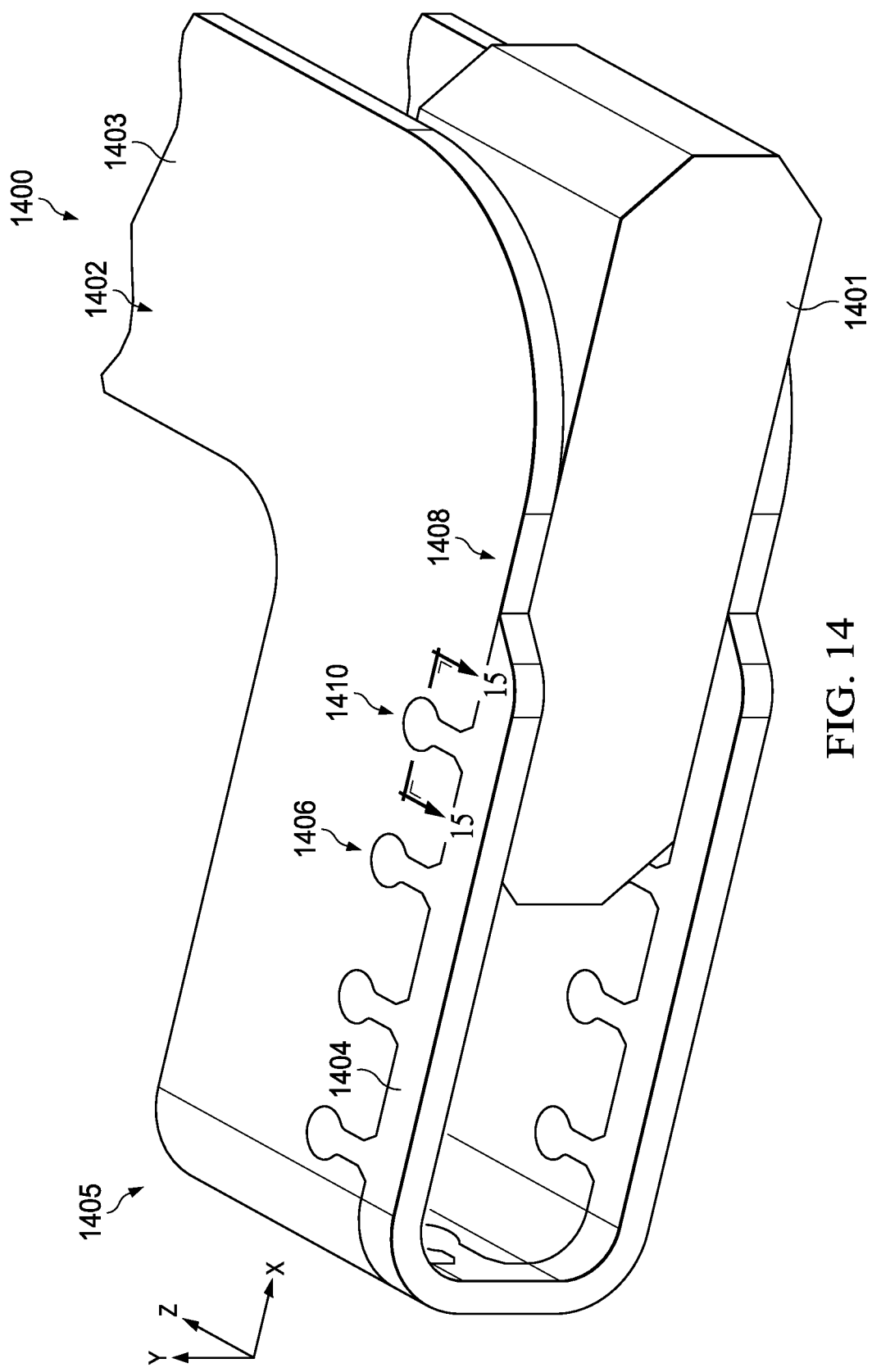
FIG. 14 is an illustration of yet another type of attachment in accordance with an illustrative embodiment.

With reference now to FIG. 14, an illustration of yet another type of attachment is depicted in accordance with an illustrative embodiment. In this illustrative example, attachment 1400 may be another example of one implementation for attachment 600 in FIG. 6. Attachment 1400 may be used with an end effector for a robotic device, such as end effector 902 for robotic device 900 shown in FIG. 9.

In this illustrative example, attachment 1400 may include bucking bar 1401 and clamping device 1402. Clamping device 1402 may have U-shape 1405 in this illustrative example. Clamping device 1402 may include clamp 1403 and foot 1404. Foot 1404 may be adhesively bonded to and mechanically interlocked with clamp 1403. In particular, foot 1404 may be adhesively bonded to edge 1408 of clamp 1403.

Set of interlocking features 1406 may mechanically interlock foot 1404 with clamp 1403. Interlocking feature 1410 may be an example of one of set of interlocking features 1406. In particular, this type of mechanical interlocking may provide cohesive strength that resists separation of foot 1404 from clamp 1403.

Figure 15:
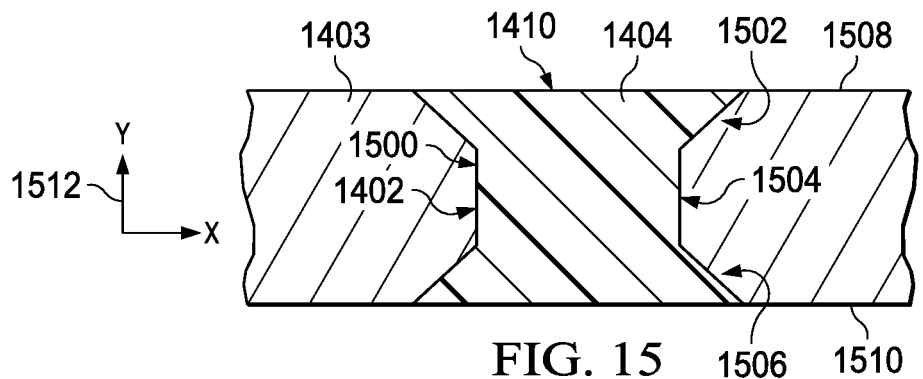
FIG. 15 is an illustration of a cross-sectional view of an interlocking feature in accordance with an illustrative embodiment.

With reference now to FIG. 15, an illustration of a cross-sectional view of interlocking feature 1410 from FIG. 14 is depicted in accordance with an illustrative embodiment. In this illustrative example, a cross-sectional view of interlocking feature 1410 from FIG. 14 is taken in the direction of lines 15-15 in FIG. 14.

As depicted, interlocking feature 1410 may fill hole 1500 in clamp 1403. Interlocking feature 1410 may include countersink portion 1502, elongated portion 1504, and countersink portion 1506. Countersink portion 1502 may be present at first side 1508 of clamp 1403 and countersink portion 1506 may be present at second side 1510 of clamp 1403. Countersink portion 1502 and countersink portion 1506 may provide cohesive strength in the direction of Y-axis 1512.

Figure 16:
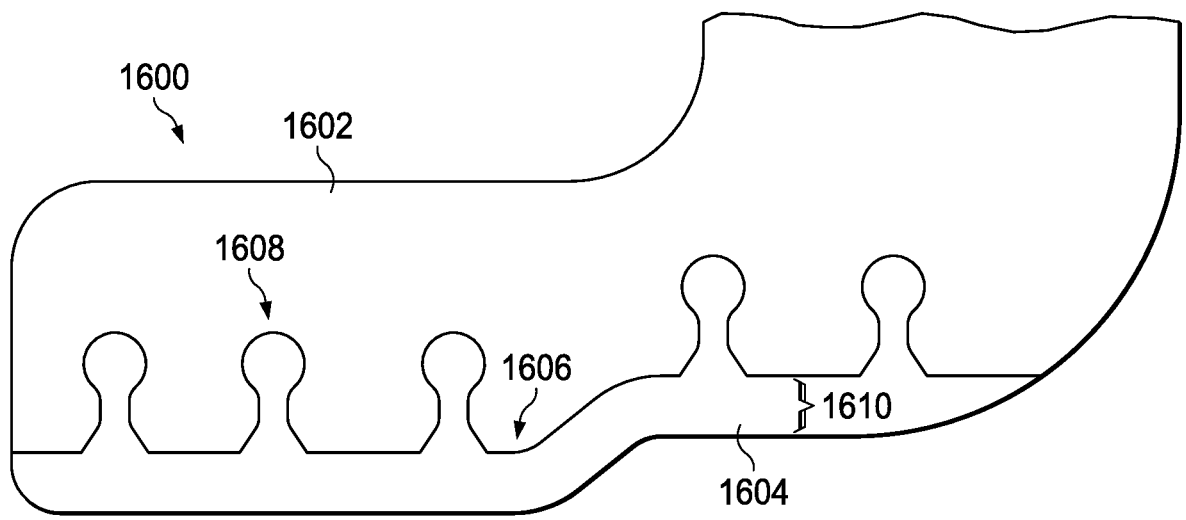
FIG. 16 is an illustration of a clamping device in accordance with an illustrative embodiment.

With reference now to FIG. 16, an illustration of a clamping device is depicted in accordance with an illustrative embodiment. In this illustrative example, clamping device 1600 includes clamp 1602 and foot 1604. Foot 1604 may include set of interlocking features 1608 and base portion 1610. Foot 1604 may be adhesively bonded to edge 1606 of clamp 1602. Further, foot 1604 may be mechanically interlocked with clamp 1602 through set of interlocking features 1608. Set of interlocking features 1608 may provide cohesive strength to help resist separation of foot 1604 from clamp 1602.

Figure 17:
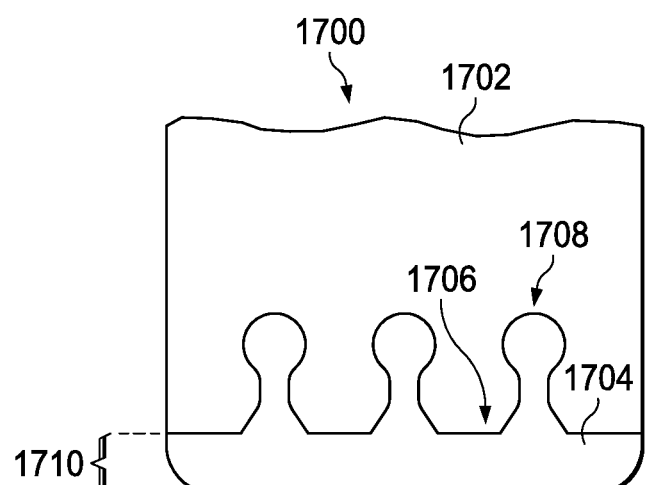
FIG. 17 is an illustration of a clamping device in accordance with an illustrative embodiment.

With reference now to FIG. 17, an illustration of a clamping device is depicted in accordance with an illustrative embodiment. In this illustrative example, clamping device 1700 may be smaller than clamping device 1600 in FIG. 16, which may enable clamping device 1700 to be used in hard-to-reach areas.

Clamping device 1700 includes clamp 1702 and foot 1704. Foot 1704 may include set of interlocking features 1708 and base portion 1710. Foot 1704 may be adhesively bonded to edge 1706 of clamp 1702. Further, foot 1704 may be mechanically interlocked with clamp 1702 through set of interlocking features 1708. Set of interlocking features 1708 may provide cohesive strength to help resist separation of foot 1704 from clamp 1702.

Figure 18:
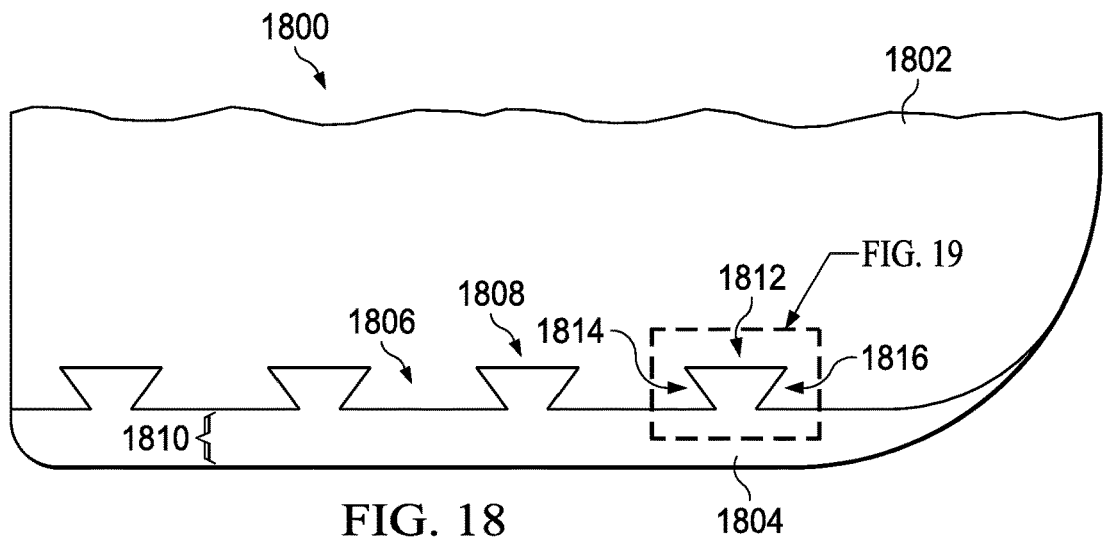
FIG. 18 is an illustration of a clamping device in accordance with an illustrative embodiment.

With reference now to FIG. 18, an illustration of a clamping device is depicted in accordance with an illustrative embodiment. In this illustrative example, clamping device 1800 includes clamp 1802 and foot 1804. Foot 1804 may include set of interlocking features 1808 and base portion 1810. Foot 1804 may be adhesively bonded to edge 1806 of clamp 1802. Further, foot 1804 may be mechanically interlocked with clamp 1802 through set of interlocking features 1808.

Interlocking feature 1812 may be an example of one of set of interlocking features 1808. Interlocking feature 1812 may be comprised entirely of locking portion 1814. Locking portion 1814 may have dove-tail shape 1816 that mechanically interlocks interlocking feature 1812 with clamp 1802. Set of interlocking features 1808 may provide cohesive strength to help resist separation of foot 1804 from clamp 1802.

Figure 19:
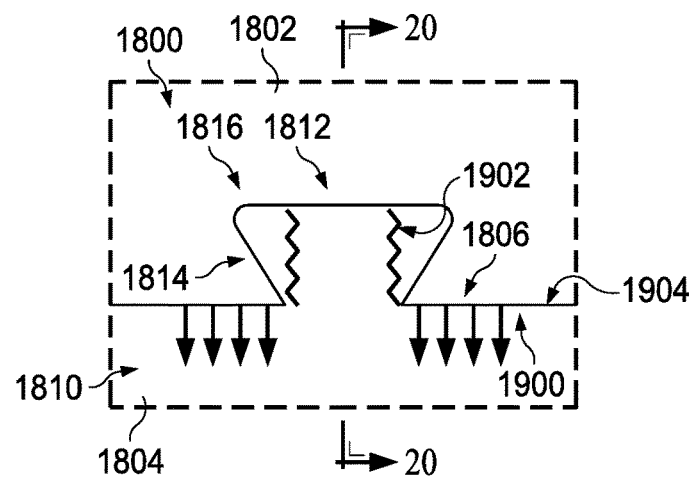
FIG. 19 is an illustration of an enlarged front view of an interlocking feature in accordance with an illustrative embodiment.

With reference now to FIG. 19, an illustration of an enlarged front view of interlocking feature 1812 from FIG. 18 is depicted in accordance with an illustrative embodiment. An enlarged front view of interlocking feature 1812 from FIG. 18 is depicted.

In this illustrative example, bending forces may result in adhesive stress 1900 and cohesive stress 1902. The adhesive bonding of foot 1804 to edge 1806 of clamp 1802 and the mechanical interlocking of interlocking feature 1812 with clamp 1802 may resist these bending forces. In this manner, interlocking feature 1812 may help resist separation of foot 1804 from clamp 1802.

In some cases, bending forces may produce adhesive stress 1900 greater than the adhesive strength of interface 1904 formed between foot 1804 and clamp 1802. However, cohesive strength provided by interlocking feature 1812 may be greater than adhesive strength provided by the adhesive bonding of foot 1804 to edge 1806 of clamp 1802. Consequently, the cohesive strength of interface 1904 provided by interlocking feature 1812 may be sufficiently high to resist these bending forces.

Figure 20:
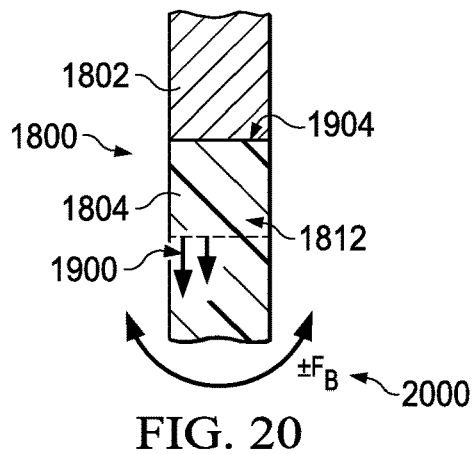
FIG. 20 is an illustration of a cross-sectional view of an interlocking feature of a foot in accordance with an illustrative embodiment.

With reference now to FIG. 20, an illustration of a cross-sectional view of interlocking feature 1812 of foot 1804 from FIG. 19 is depicted in accordance with an illustrative embodiment. In this illustrative example, a cross-sectional view of interlocking feature 1812 of foot 1804 may be seen taken in the direction of lines 20-20 in FIG. 19.

As depicted, bending force 2000 may cause adhesive stress 1900. The maximum bending force that may be withstood may be the sum of the adhesive strength of interface 1904 and the cohesive strength of interface 1904. When adhesive stress 1900 overcomes the adhesive strength of interface 1904 such that the adhesive bonding between foot 1804 and clamp 1802 separates, the cohesive strength of interface 1904 may hold foot 1804 in place relative to clamp 1802. In this manner, in the absence of adhesive strength, the maximum bending force that may be withstood may be equal to the maximum cohesive stress 1902 from FIG. 19 that may be withstood.

Figure 21:
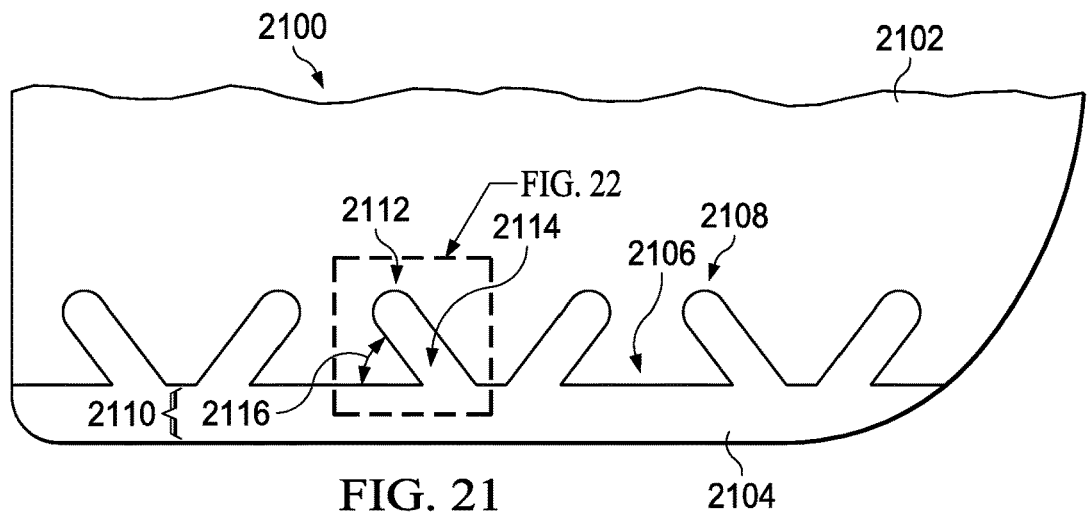
FIG. 21 is an illustration of a clamping device in accordance with an illustrative embodiment.

With reference now to FIG. 21, an illustration of a clamping device is depicted in accordance with an illustrative embodiment. In this illustrative example, clamping device 2100 includes clamp 2102 and foot 2104. Foot 2104 may include set of interlocking features 2108 and base portion 2110. Foot 2104 may be adhesively bonded to edge 2106 of clamp 2102. Further, foot 2104 may be mechanically interlocked with clamp 2102 through set of interlocking features 2108.

Interlocking feature 2112 may be an example of one of set of interlocking features 2108. Interlocking feature 2112 may be comprised entirely of elongated portion 2114. Elongated portion 2114 may have angle 2116 relative to base portion 2110. Set of interlocking features 2108 may provide cohesive strength to help resist separation of foot 2104 from clamp 2102.

Figure 22:
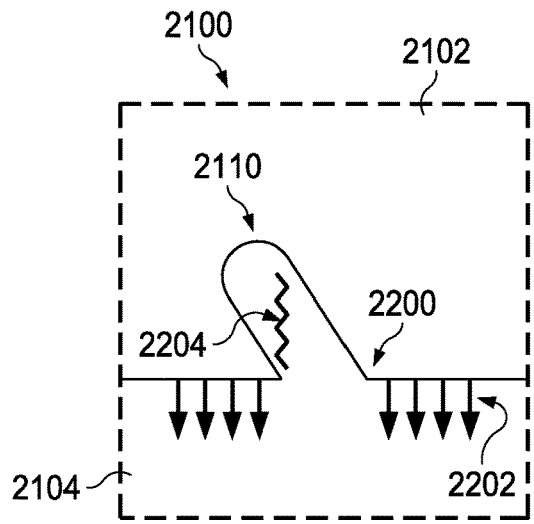
FIG. 22 is an illustration of an enlarged front view of an interlocking feature in accordance with an illustrative embodiment.

With reference now to FIG. 22, an illustration of an enlarged front view of interlocking feature 2112 from FIG. 21 is depicted in accordance with an illustrative embodiment. In this illustrative example, an enlarged front view of interlocking feature 2112 from FIG. 21 is depicted. As depicted, foot 2104 may be bonded to clamp 2102 such that interface 2200 is formed.

In this illustrative example, interlocking feature 2112 may mechanically interlock with clamp 2102 in a manner that provides cohesive strength to resist bending forces that cause adhesive stress 2202 and cohesive stress 2204. In this illustrative example, interlocking feature 2112 may enable interface 2200 to withstand higher levels of cohesive stress 2204 than the levels of adhesive stress 2202 that may be withstood based on the adhesive bonding of foot 2104 to clamp 2102.

Figure 23:
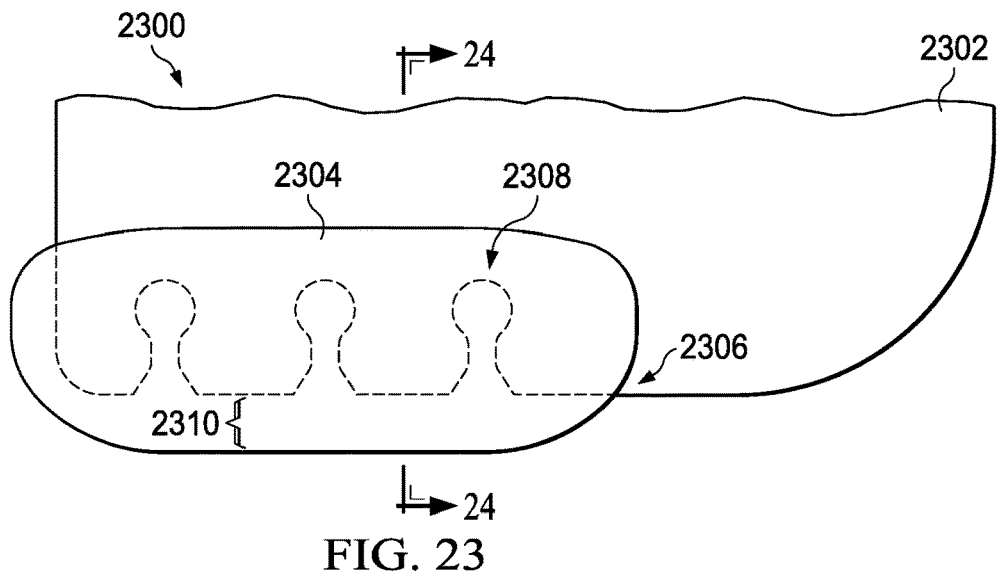
FIG. 23 is an illustration of a clamping device in accordance with an illustrative embodiment.

With reference now to FIG. 23, an illustration of a clamping device is depicted in accordance with an illustrative embodiment. In this illustrative example, clamping device 2300 includes clamp 2302 and foot 2304. Foot 2304 may include set of interlocking features 2308 (shown in phantom) and base portion 2310. Foot 2304 may be adhesively bonded to edge 2306 of clamp 2302. Further, foot 2304 may be mechanically interlocked with clamp 2302 through set of interlocking features 2308.

Figure 24:
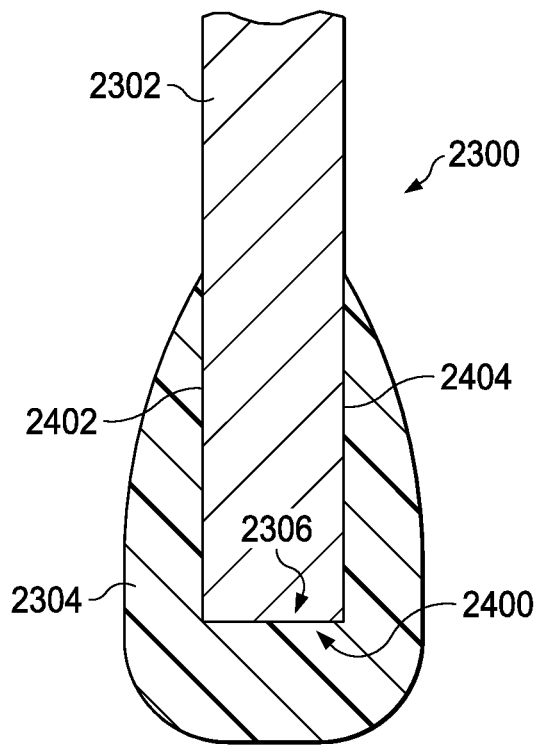
FIG. 24 is an illustration of a cross-sectional view of a clamping device in accordance with an illustrative embodiment.

With reference now to FIG. 24, an illustration of a cross-sectional view of clamping device 2300 from FIG. 23 is depicted in accordance with an illustrative embodiment. In this illustrative example, a cross-sectional view of clamping device 2300 from FIG. 23 may be depicted taken in the direction of lines 24-24 in FIG. 23. As depicted, foot 2304 may be comprised of material that substantially surrounds end 2400, side 2402, and side 2404 of clamp 2302.

Figure 25:
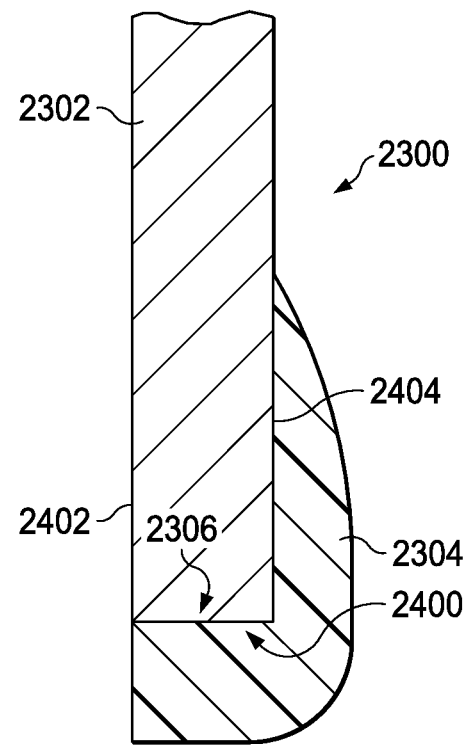
FIG. 25 is an illustration of a cross-sectional view of a clamping device in accordance with an illustrative embodiment.

With reference now to FIG. 25, an illustration of a cross-sectional view of clamping device 2300 from FIGS. 23-24 is depicted in accordance with an illustrative embodiment. In this illustrative example, a different configuration for foot 2304 may be shown as compared to foot 2304 in FIG. 24. In this illustrative example, foot 2304 may be comprised of a material that substantially surrounds end 2400 and side 2404 of clamp 2302 but not side 2402 of clamp 2302.

Figure 26:
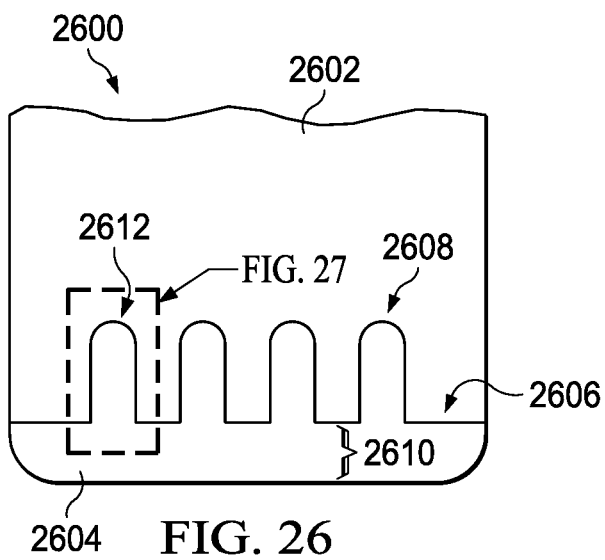
FIG. 26 is an illustration of a clamping device in accordance with an illustrative embodiment.

With reference now to FIG. 26, an illustration of a clamping device is depicted in accordance with an illustrative embodiment. In this illustrative example, clamping device 2600 includes clamp 2602 and foot 2604. Foot 2604 may include set of interlocking features 2608 and base portion 2610. Foot 2604 may be adhesively bonded to edge 2606 of clamp 2602. Further, foot 2604 may be interlocked with clamp 2602 through set of interlocking features 2608. Interlocking feature 2612 may be an example of one of set of interlocking features 2608.

Figure 27:
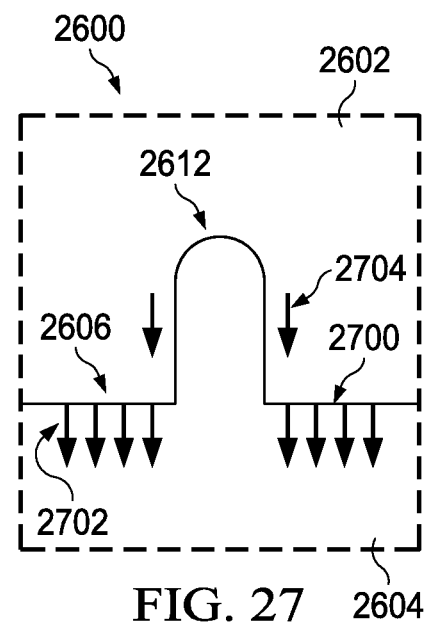
FIG. 27 is an illustration of an enlarged front view of an interlocking feature in accordance with an illustrative embodiment.

With reference now to FIG. 27, an illustration of an enlarged front view of interlocking feature 2612 from FIG. 26 is depicted in accordance with an illustrative embodiment. In this illustrative example, an enlarged front view of interlocking feature 2612 from FIG. 26 is depicted. As depicted, foot 2604 may be bonded to clamp 2602 such that interface 2700 is formed.

In this illustrative example, interlocking feature 2612 may provide additional adhesive strength. In particular, interlocking feature 2612 may provide adhesive strength greater than the adhesive strength provided by the adhesive bonding between base portion 2610 and edge 2606 of clamp 2602 in FIG. 26.

The illustrations of flexible manufacturing system 700 in FIGS. 7-8 and the various types of attachments and clamps in FIGS. 9-27 are not meant to imply physical or architectural limitations to the manner in which an illustrative embodiment may be implemented. Other components in addition to or in place of the ones illustrated may be used. Some components may be optional.

The different components shown in FIGS. 7-27 may be illustrative examples of how components shown in block form in FIGS. 1-6 can be implemented as physical structures. Additionally, some of the components in FIGS. 7-27 may be combined with components in FIGS. 1-6, used with components in FIG. 1-6, or a combination of the two.

Figure 28:
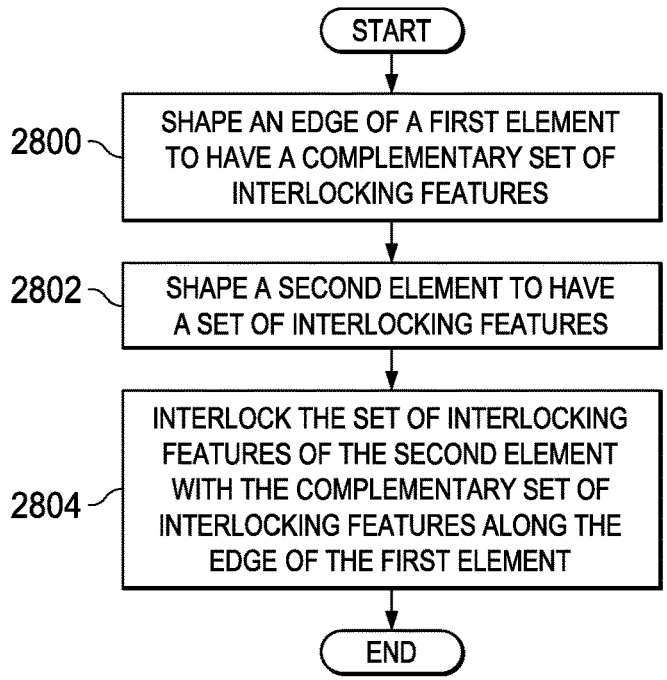
FIG. 28 is an illustration of a process for interfacing a first element with a second element in the form of a flowchart in accordance with an illustrative embodiment.

With reference now to FIG. 28, an illustration of a process for interfacing a first element with a second element is depicted in the form of a flowchart in accordance with an illustrative embodiment. The process illustrated in FIG. 28 may be performed to interface, for example, without limitation, first element 616 with second element 618 in FIG. 6.

The process may begin by shaping edge 640 of first element 616 to have complementary set of interlocking features 641 (operation 2800). In one illustrative example, operation 2800 may be performed by, for example, without limitation, machining complementary set of interlocking features 641 having complementary geometric pattern 647 along edge 640 of first element 616.

Next, second element 618 may be shaped to have set of interlocking features 642 (operation 2802). In one illustrative example, second element 618 may be cast using a mold positioned at edge 640 of first element 616 such that the casting material fills the mold and contacts complementary set of interlocking features 641. The casting material may be, for example, plastic material 626 in liquid form.

Thereafter, set of interlocking features 642 of second element 618 may be interlocked with complementary set of interlocking features 641 along edge 640 of first element 616 (operation 2804), with the process terminating thereafter. Operation 2804 may result in first element 616 and second element 618 being both mechanically interlocked and adhesively bonded to each other.

Figure 29:
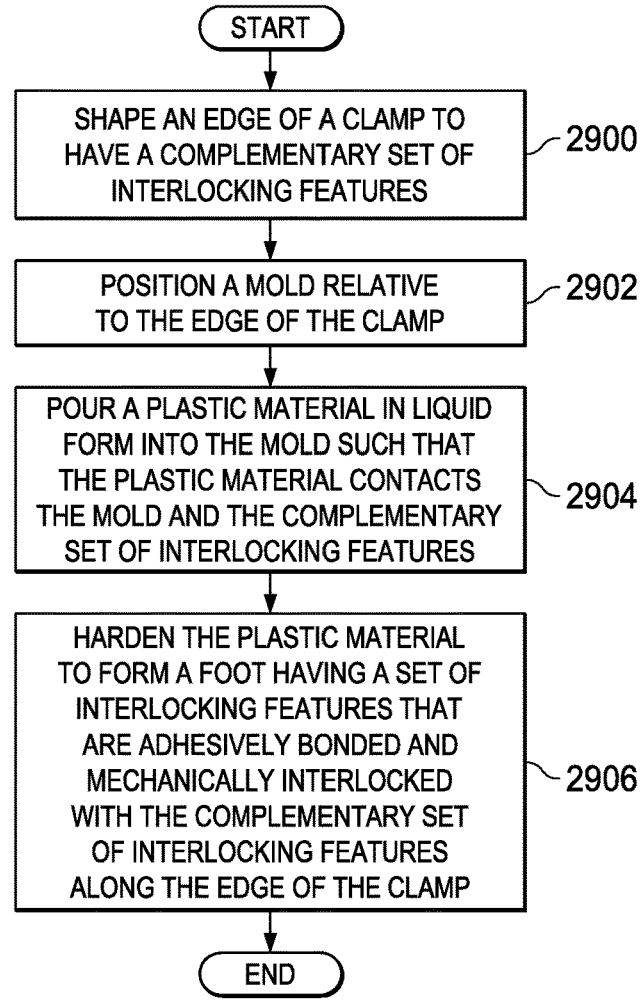
FIG. 29 is an illustration of a process for attaching a foot to a clamp in the form of a flowchart in accordance with an illustrative embodiment.

With reference now to FIG. 29, an illustration of a process for attaching a foot to a clamp is depicted in the form of a flowchart in accordance with an illustrative embodiment. The process illustrated in FIG. 29 may be implemented to attach, for example, without limitation, foot 630 to clamp 628 in FIG. 6.

The process may begin by shaping edge 640 of clamp 628 to have complementary set of interlocking features (operation 2900). In one illustrative example, operation 2902 may be performed by machining edge 640 of clamp 628 to have complementary set of interlocking features 641 with complementary geometric pattern 647.

Next, a mold may be positioned relative to edge 640 of clamp 628 (operation 2902). Plastic material 626 may then be poured in liquid form into the mold such that plastic material 626 contacts the mold and complementary set of interlocking features 641 (operation 2904). Then, plastic material 626 may be hardened to form foot 630 having set of interlocking features 642 that is adhesively bonded and mechanically interlocked with complementary set of interlocking features 641 along edge 640 of clamp 628 (operation 2906), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 30:
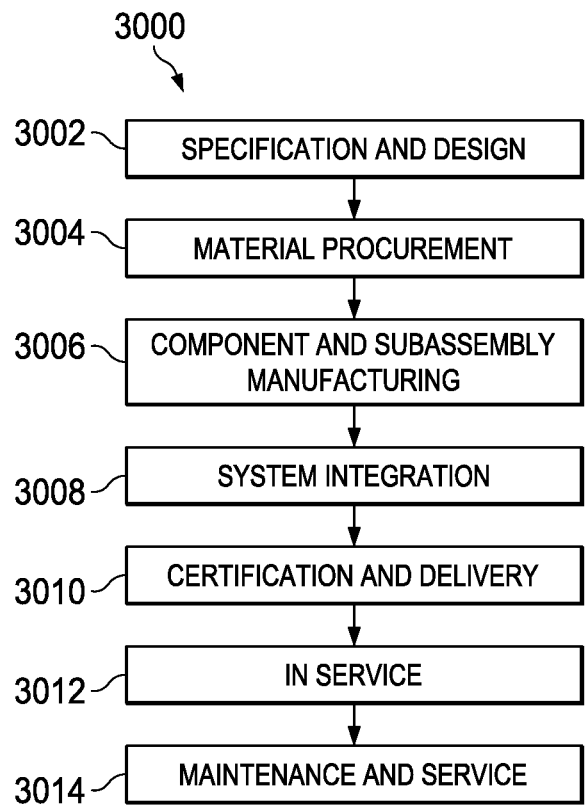
FIG. 30 is an illustration of an aircraft manufacturing and service method in the form of a block diagram in accordance with an illustrative embodiment.
Figure 31:
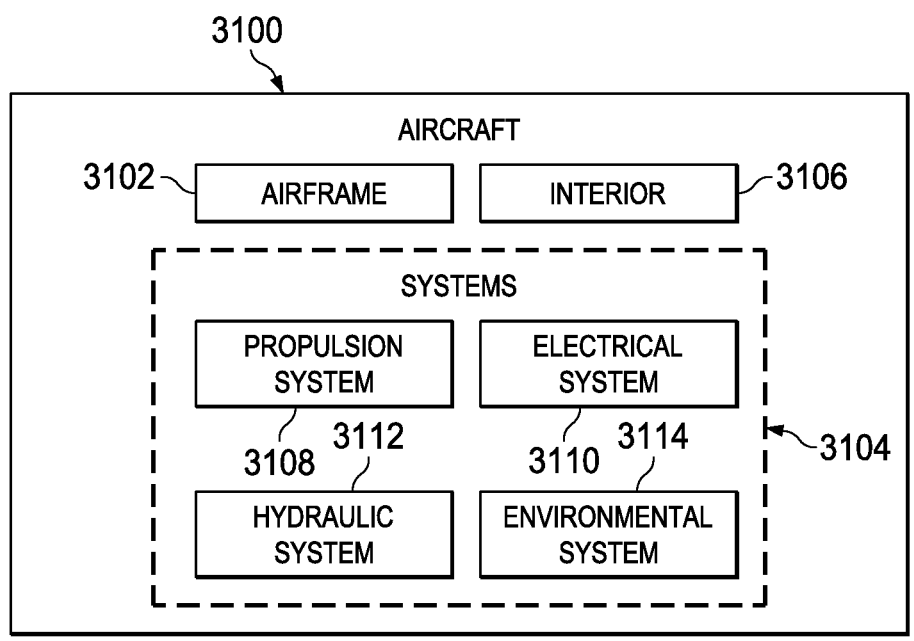
FIG. 31 is an illustration of an aircraft in the form of a block diagram in which an illustrative embodiment may be implemented.

The illustrative embodiments of the disclosure may be described in the context of aircraft manufacturing and service method 3000 as shown in FIG. 30 and aircraft 3100 as shown in FIG. 31. Turning first to FIG. 30, an illustration of an aircraft manufacturing and service method is depicted in the form of a block diagram in accordance with an illustrative embodiment. During pre-production, aircraft manufacturing and service method 3000 may include specification and design 3002 of aircraft 3100 in FIG. 31 and material procurement 3004.

During production, component and subassembly manufacturing 3006 and system integration 3008 of aircraft 3100 in FIG. 31 takes place. Thereafter, aircraft 3100 in FIG. 31 may go through certification and delivery 3010 in order to be placed in service 3012. While in service 3012 by a customer, aircraft 3100 in FIG. 31 is scheduled for routine maintenance and service 3014, which may include modification, reconfiguration, refurbishment, and other maintenance or service.

Each of the processes of aircraft manufacturing and service method 3000 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 31, an illustration of an aircraft is depicted in the form of a block diagram in which an illustrative embodiment may be implemented. In this example, aircraft 3100 is produced by aircraft manufacturing and service method 3000 in FIG. 30 and may include airframe 3102 with plurality of systems 3104 and interior 3106. Examples of systems 3104 include one or more of propulsion system 3108, electrical system 3110, hydraulic system 3112, and environmental system 3114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3000 in FIG. 30. In particular, flexible manufacturing system 106 from FIG. 1 may be used to build at least a portion of airframe 3102 of aircraft 3100 during any one of the stages of aircraft manufacturing and service method 3000. For example, without limitation, flexible manufacturing system 106 from FIG. 1 may be used during at least one of component and subassembly manufacturing 3006, system integration 3008, or some other stage of aircraft manufacturing and service method 3000 to form a fuselage for aircraft 3100.

In one illustrative example, components or subassemblies produced in component and subassembly manufacturing 3006 in FIG. 30 may be fabricated or manufactured in a manner similar to components or subassemblies produced while aircraft 3100 is in service 3012 in FIG. 30. As yet another example, one or more apparatus embodiments, method embodiments, or a combination thereof may be utilized during production stages, such as component and subassembly manufacturing 3006 and system integration 3008 in FIG. 30. One or more apparatus embodiments, method embodiments, or a combination thereof may be utilized while aircraft 3100 is in service 3012, during maintenance and service 3014 in FIG. 30, or both. The use of a number of the different illustrative embodiments may substantially expedite the assembly of and reduce the cost of aircraft 3100.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for mating a clamp with a foot, the method comprising:
shaping an edge of the clamp to have a complementary set of interlocking features;
shaping the foot to have a set of interlocking features; and
interfacing the set of interlocking features of the foot with the complementary set of interlocking features of the clamp along the edge of the clamp by:
adhesively bonding the foot to the edge of the clamp such that the set of interlocking features of the foot form a mechanical interlock with the complementary set of interlocking features of the clamp, wherein an interlocking feature in the set of interlocking features comprises an elongated portion that extends from a base portion of the foot at an angle relative to an interface between the base portion and the edge of the clamp.

2. The method of claim 1, wherein the set of interlocking features give the interface between the clamp and the foot cohesive strength to resist bending forces.

3. The method of claim 1, wherein the interlocking feature further comprises:
a locking portion located at an end of the elongated portion and having a first width greater than a second width of the elongated portion.

4. The method of claim 3, wherein the locking portion is a circular portion having a diameter greater than the second width of the elongated portion.

5. The method of claim 1, wherein the angle is between about 5 degrees and about 85 degrees relative to the interface.

6. The method of claim 1, wherein the elongated portion extends substantially perpendicularly from the base portion into the clamp.

7. The method of claim 1, wherein the clamp is a clamp of a clamping device for an attachment for an end effector.

8. The method of claim 7, wherein the foot acts as a shock absorber when the clamp with the foot is placed on a part.

9. The method of claim 8, wherein the part is a panel for a fuselage assembly.

10. The method of claim 1, wherein a cross-sectional area of the foot taken along an axis substantially parallel to the edge of the clamp has a width that changes along a length of the cross-sectional area.

11. The method of claim 1, wherein the clamp is comprised of a first material and the foot is comprised of a second material different from the first material.

12. The method of claim 11, wherein the first material is a metallic material and the second material is a plastic material comprising at least one of a thermosetting plastic or a thermoplastic material.

13. The method of claim 12, wherein the second material is polyurethane.

14. A method for mating a first element with a second element, the method comprising:
shaping an edge of the first element to have a complementary set of interlocking features;
shaping the second element to have a set of interlocking features by pouring a plastic material in liquid form into a mold positioned relative to the edge of the first element such that the plastic material contacts the mold and the complementary set of interlocking features; and
interfacing the set of interlocking features of the second element with the complementary set of interlocking features along the edge of the first element.

15. The method of claim 14, wherein shaping the edge comprises:
machining the edge of the first element to have the complementary set of interlocking features.

16. The method of claim 14, wherein interfacing the set of interlocking features of the second element with the complementary set of interlocking features comprises:
hardening the plastic material to form the set of interlocking features such that the second element is adhesively bonded to the edge of the first element and such that the set of interlocking features is mechanically interlocked with the complementary set of interlocking features along the edge of the first element.

17. A method for mating a foot to a clamp, the method comprising:
shaping an edge of the clamp to have a complementary set of interlocking features; and
shaping the foot to have a set of interlocking features and interfacing the set of interlocking features of the foot with the complementary set of interlocking features of the clamp along the edge of the clamp by:
positioning a mold relative to the edge of the clamp;
pouring a plastic material in liquid form into the mold such that the plastic material contacts the mold and the complementary set of interlocking features; and
hardening the plastic material to form the foot having the set of interlocking features that are adhesively bonded and mechanically interlocked with the complementary set of interlocking features along the edge of the clamp.

18. The method of claim 17, wherein shaping the edge of the clamp comprises:
machining the edge of the clamp to have the complementary set of interlocking features.

19. A method for mating a first element with a second element, the method comprising:
shaping an edge of the first element to have a complementary set of interlocking features;
shaping the second element by casting the second element to have a set of interlocking features; and
interfacing the set of interlocking features of the second element with the complementary set of interlocking features along the edge of the first element.

20. The method of claim 19, wherein shaping the edge comprises:
machining the edge of the first element to have the complementary set of interlocking features.

* * * * *